(12) United States Patent
Tanabe et al.

(10) Patent No.: US 6,714,529 B1
(45) Date of Patent: Mar. 30, 2004

(54) VARIABLE TRANSMISSION RATE DIGITAL MODEM WITH MULTI-RATE FILTER BANK

(75) Inventors: Kazuhiro Tanabe, Yokohama (JP); Kiyoshi Kobayashi, Yokosuka (JP); Hiroshi Kazama, Yokohama (JP)

(73) Assignee: Nippon Telegraph and Telephone Corp., Tokyo (JP)

( * ) Notice: Subject to any disclaimer, the term of this patent is extended or adjusted under 35 U.S.C. 154(b) by 0 days.

(21) Appl. No.: 09/517,850

(22) Filed: Mar. 2, 2000

(30) Foreign Application Priority Data

Mar. 4, 1999 (JP) .......................... 11-056772
Aug. 5, 1999 (JP) .......................... 11-222053

(51) Int. Cl.[7] ................................ H04J 1/00
(52) U.S. Cl. ................ 370/343; 370/481; 370/485
(58) Field of Search ................ 370/343, 480, 370/481, 485; 375/222

(56) References Cited

U.S. PATENT DOCUMENTS

| 4,131,764 A | 12/1978 | Claasen et al. |
| 4,412,325 A | 10/1983 | Molo |
| 5,699,363 A | * 12/1997 | Wishart et al. ............. 370/497 |

FOREIGN PATENT DOCUMENTS

WO          98/58471          12/1998

OTHER PUBLICATIONS

K. Yamano et al., "Fast Frequency Search and Demodulation with Complex Multi-rate Filter," ITE Technical Report vol. 20, No. 10, pp. 45-48, ROFT '96-46, Feb. 1996.

K. Tanabe et al., "Seamless Multi-rate Filter Bank," Technical Report of IEICE, A P99-23, SAT 99-15 (May 1999), Mar. 1999.

K. Tanabe et al., "Seamless Multi-rate Filter Bank-Digital Filter Bank for Frequency Demultiplexer-," Proceedings of the 1999 IEICE General Conference, B-5-88, p. 439, Mar. 1999.

K. Tanabe et al., A Study of Multi-rate Digital Modulator/Demodulator Employing Seamless Multi-rate Filter Bank, Proceedings of the 1999 Communications Society Conference of IEICE, B-3-29, p. 178, Sep. 1999.

* cited by examiner

*Primary Examiner*—Chau Nguyen
*Assistant Examiner*—Nittaya Juntima
(74) *Attorney, Agent, or Firm*—Thelen Reid & Priest, LLP; Robert E. Krebs

(57) ABSTRACT

A signal demultiplexer includes serially-connected 2-demultiplexing filter banks, including band-stop filters and down-samplers for culling sampling frequencies of output signals from filters to 1/2. When the 2-demultiplexing filter bank operates on four types of filters, first to fourth filters in an ascending order of frequencies, 2-demultiplexing filter bank is arranged in one of two configurations so that a first filter bank contains at least the first filter or the second filter, or a second filter bank contains at least the third filter or the fourth filter. The filter banks are connected in such a way that signals processed through the first filter are processed by the first 2-demultiplexing filter bank in a next-stage; signals processed through the second filter are processed by the second 2-demultiplexing filter bank in a next-stage. Signals processed through the third filter are processed by the first 2-demultiplexing filter bank in a next-stage; and signals processed through the fourth filter are processed by the second 2-demultiplexing filter bank in a next-stage.

33 Claims, 58 Drawing Sheets

(g)

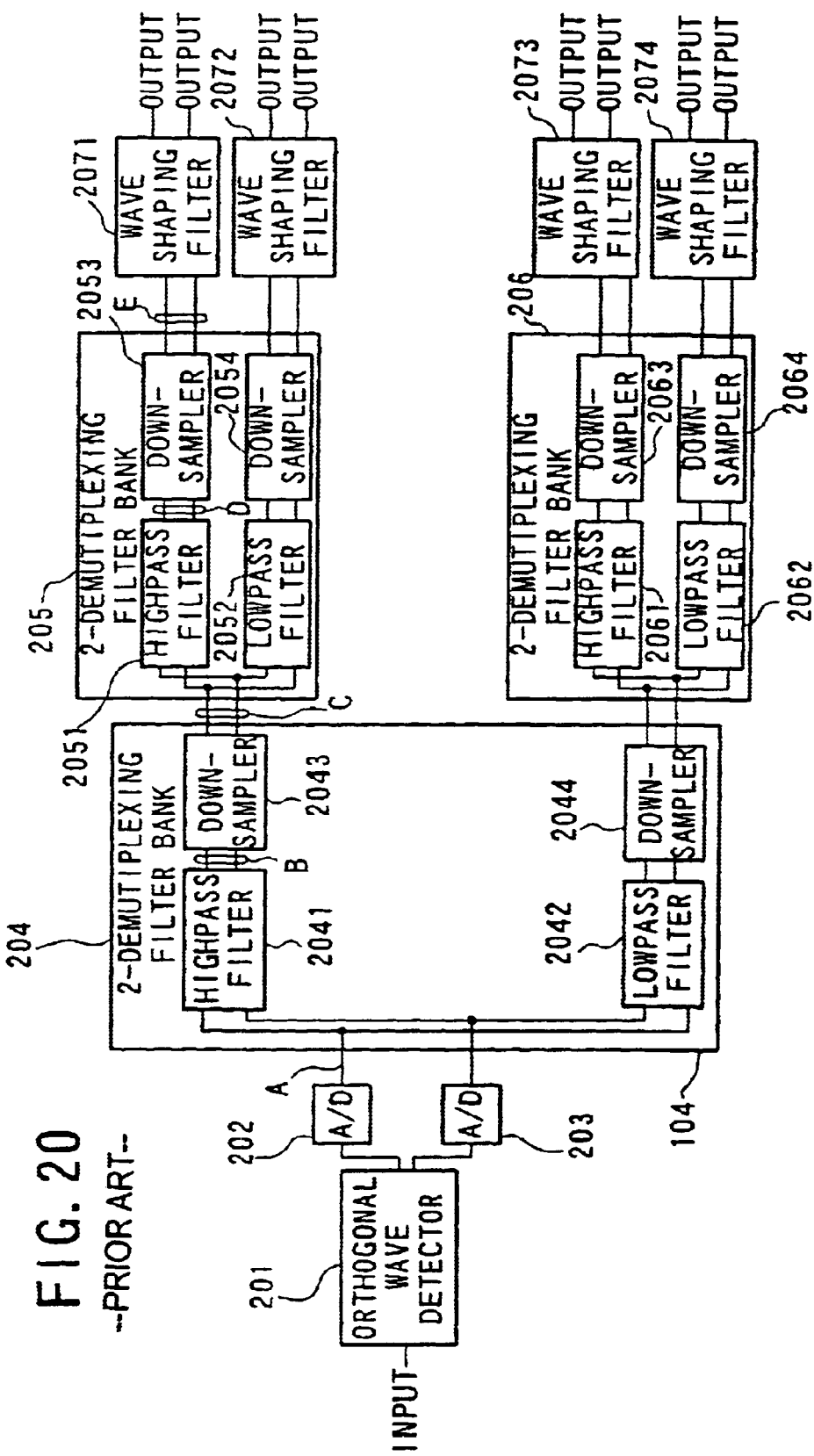

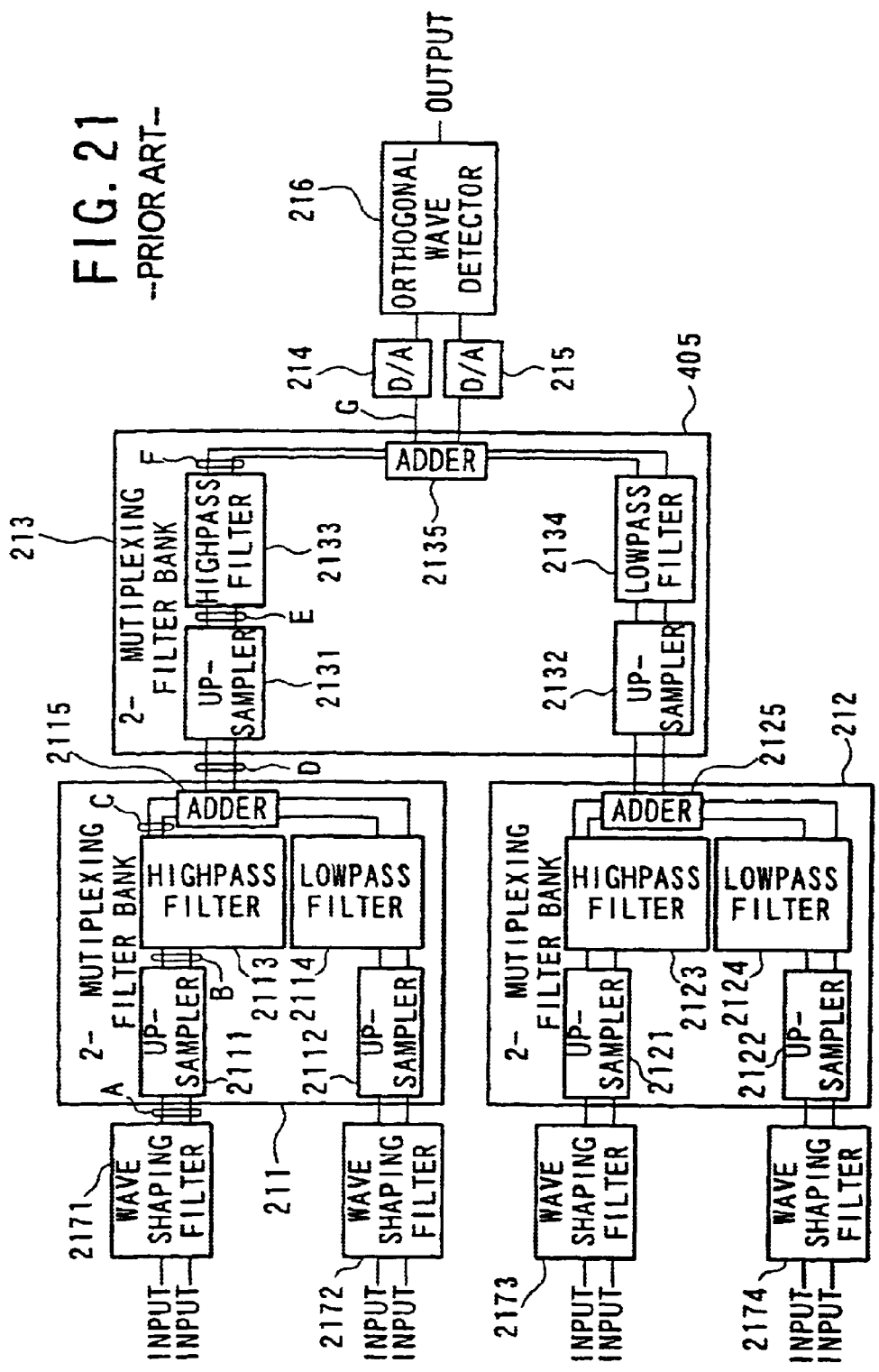
FIG. 21 —PRIOR ART—

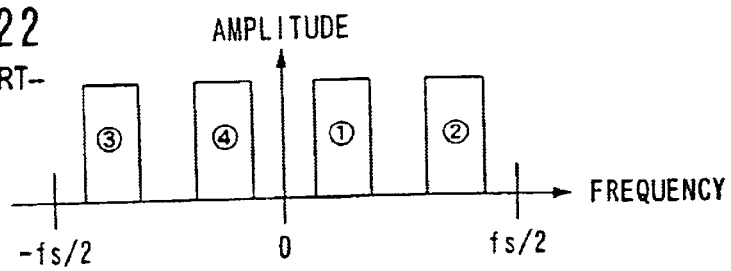
FIG. 22 —PRIOR ART—
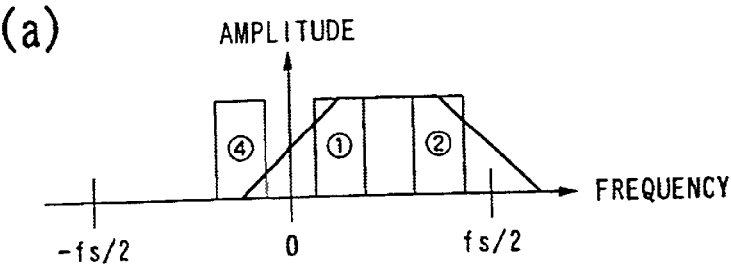
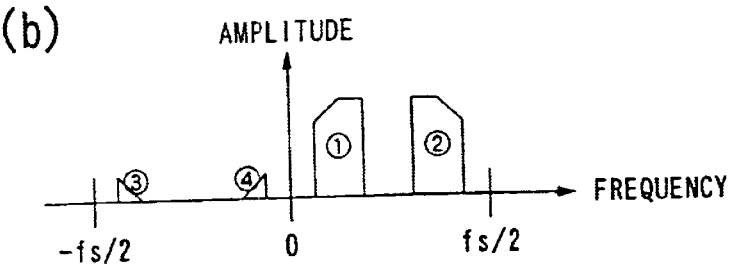
FIG. 23 —PRIOR ART—
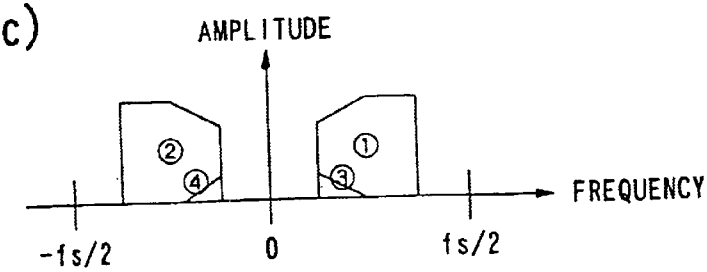

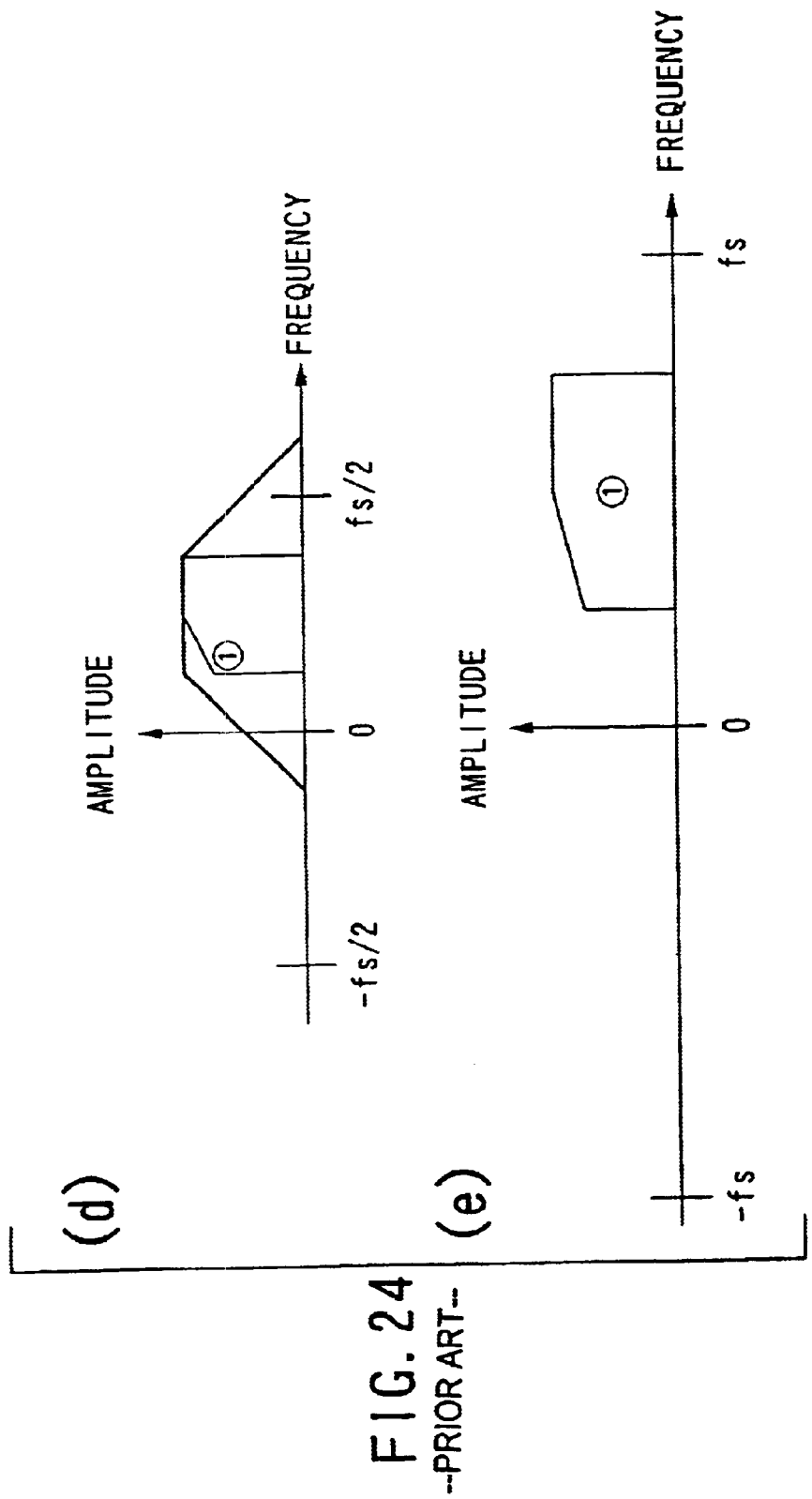
FIG. 24 —PRIOR ART—

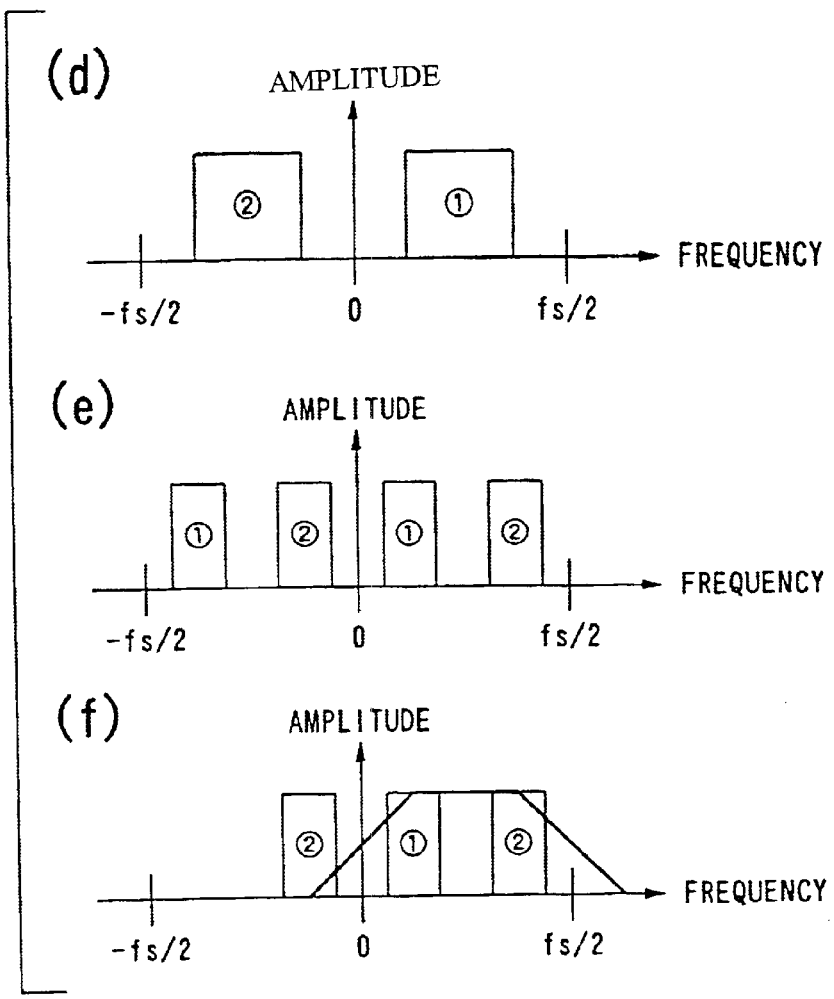
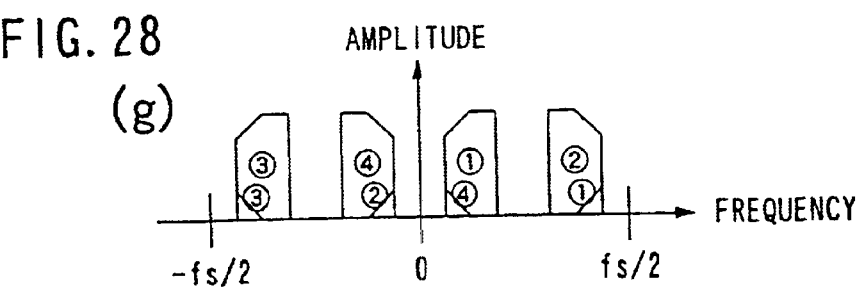

VARIABLE TRANSMISSION RATE DIGITAL MODEM WITH MULTI-RATE FILTER BANK

BACKGROUND OF THE INVENTION

1. Field of the Invention

The present invention relates to a digital demultiplexer, a digital multiplexer, and a digital modem used in radio communication and the like, and relates in particular to a digital modem whose transmission speed can be varied readily.

This application is based on patent applications Nos. Hei 11-056772 and Hei 11-222053 filed in Japan, the contents of which are incorporated herein by reference.

2. Description of the Related Art

First, conventional digital multiplexer and demultiplexer will be explained.

When a device for multiplexing or demultiplexing a number of frequency-multiplexed channels is made using analogue circuits, it is necessary to employ as many local oscillators and band-stop filters as there are channels such that the scale of the device and power consumption are inevitably increased. In the meanwhile, with the widespread use of digital signal processing technologies, digital multi/demultiplexers have been made possible, resulting in miniaturization and low power consumption of such devices.

In particular, digital multi/demultiplexers based on multi-rate signal processing theory is an effective construction method for such devices because of the high degree of freedom in providing channel separation and selecting bandwidths.

FIG. 20 shows an example of the structure of a 4-digital signal demultiplexer for demultiplexing frequency-multiplexed signals, such as those shown in FIG. 22. This structure is the same as one reported in a reference, K. Yamano, "Fast Frequency Search and Demodulation with Complex Multi-Rate Filter Banks", ITE Technical Report, ROFT96-46.

The device shown in FIG. 20 is comprised by: an orthogonal detector 201; A/D converters 202, 203; 2-demultiplexing filter banks 204, 205, 206; high pass filters 2041, 2051, 2061; low pass filters 2042, 2052, 2062; down-samplers 2043, 2044, 2053, 2054, 2063, 2064; and wave shaping filters 2072, 2073, 2074.

The properties of each high pass filter 2041, 2051, 2061 are the same when standardized by the sampling frequency, and can be expressed as in the part (a) in FIG. 30. In this graph, fs relates to a sampling speed at the input of split filters. Similarly, the properties of low pass filters 2042, 2052, 2062 can be shown by the part (b) in FIG. 30.

Received signals are input in the orthogonal detector 201, and are converted to in-phase components and orthogonal components. Analogue signals of in-phase and orthogonal components output from the orthogonal detector 201 are respectively converted to digital signals in the A/D converters 202, 203, and are input in the split filter bank 204. The signals are separated into two groups in the split filter bank 204, and are respectively input in the high pass bank 2041 and the low pass filter 2042 for limiting the bandwidths.

Bandwidth-limited signals are input into respective down-samplers 2043, 2044 and are culled to 1/2 by down-sampling. Signals output from the down-sampler are input in the serially-connected split filter banks 205, 206. Signals are split into two groups in the split filter banks 205, 206 are input into high pass filters 2051, 2061 and low pass filters 2052, 2062, respectively.

Bandwidth-limited signals are respectively input in the down-samplers 2053, 2054, 2063, 2064, and are down-sampled to 1/2 at the timing shown in FIG. 6, and are wave shaped in 2071, 2072, 2073, 2074, and are output as four independent signal groups shown in FIG. 22.

Signal spectra at the points A, B, C, D of the signal processed through the components 2041, 2043, 2051, 2053 indicated in FIG. 20 are shown, respectively, in the parts (a)~(e) in FIGS. 23~24. Circled numbers refer to separate source signals and are used throughout in the same manner in the following presentation.

Next, an example of the structure of 4-wave digital multiplexer with input of four separate signal groups is shown in FIG. 21. The vectors for each signal are shown in FIG. 25. The device is comprised by: 2-multiplexing filter banks 212, 213; up-samplers 2111, 2112, 2121, 2122, 2131, 2132; high pass filters 2113, 2123, 2133; low pass filters 2114, 2124, 2134; low pass filters 2114, 2124, 2134; adders 2115,2125, 2135; A/D converters 214, 215; orthogonal modulator 216; and wave shaping filters 2171, 2172, 2173, 2174.

Four groups of different baseband signals are input in filters 2171, 2172, 2173, 2174 in two separate groups. The output from the wave shaping filters are input in the 2-multiplexing filter banks 211, 212, and are up-sampled in the up-samplers 2111, 2112, 2121, 2122 to double the sampling speed at the timing shown in FIG. 12.

Signals output from the up-samplers 2111, 2112 are input in the high pass filter 2113 and the low pass filter 2114, respectively, and are added in the adder 2115. Similarly, signals output from the up-samplers 2121, 2122 are input in the high pass filter 2123 and the low pass filter 2124, respectively, and are added in the adder 2125. Signals output from the 2-multiplexing filter banks 211, 212 are input in the 2-multiplexing filter bank 213.

Input signals are input in the up-sampler 2131, 2132 that interpolates to twice the size at the timing shown in FIG. 12. Signals output from the up-samplers 2131, 2132 are input in the highpass filter 2133 and the low pass filter 2134, respectively, and are added in the adder 2135. Signals output from the 2-multiplexing filter bank 213 is input in the D/A converters 214, 215 and are then converted to desired radio frequencies in the orthogonal converter 216.

Signal spectra at the points A, B, C, D, E, F, G of the signals processed through the components 2111, 2113, 2115, 2131, 2133, 2135 indicated in FIG. 21 are shown, respectively, in the parts (a)~(g) in FIGS. 26~28.

Next, conventional digital modem and its operation will be explained.

FIG. 40 shows a construction of a conventional digital modem, and shows the transmitter side of the device for providing different transmission speeds based on a frequency division multiple access (FDMA) system.

The device is comprised by: serial-parallel conversion circuit 7001; modulation circuits 7002~7009; low pass filters 7010~7017; local oscillator circuits 7018~7025; sending circuit 7026; control circuit 7027; and frequency conversion circuits 7028~7035.

In the configuration shown in FIG. 40, maximum number of carrier frequencies is eight. In the device shown in FIG. 40, input digital signals are input in the serial-parallel conversion circuit 7001 and are converted to a maximum of eight parallel data under the control of the control circuit 7027 according to the signal inputting speed.

The parallel data are all transmitted at the same speed represented by Fb. Output signals from the serial-parallel conversion circuit 7001 are input into a maximum of eight groups in the eight modulation circuits, and are output as a maximum of eight groups of complex modulated signals.

Complex modulated signals output from the modulation circuits 7002~7009 are input in the low pass filters 7010~7017 to limit the bandwidth, and are converted to respective signals of different frequencies by the local oscillators 7018~7025, are multiplexed by the multiplexer 7036, and are input in the sending circuit to be transmitted from the antennae.

FIG. 41 shows an example of the structure of the conventional digital signal receiver, and shows the receiver side of the device for providing different transmission speeds based on a frequency division multiple access (FDMA) system. The device is comprised by: receive circuit 7101; local oscillators 7102~7109; low pass filters 7110~7117; demodulation circuit 7118~7125; parallel-serial conversion circuit 7126; control circuit 7127; and frequency conversion circuits 7128~7135.

Signals received by the antennae are frequency converted in the frequency conversion circuits 7128~7135 to baseband signals, using respective different frequencies produced in the local oscillator circuits 7102~7109. Convert baseband signals output from the low pass filters 7110~7117 so as to limit the bandwidth.

Bandwidth-limited signals are input in the demodulation circuits 7118~7125 to demodulate signals in respective channels. Demodulated signals are input in the parallel-serial conversion circuit 7126, and are converted from a maximum of eight groups of parallel data to serial data and are output under the control of the control section. This structure can produce variable speeds from Fb to eight Fbs.

However, in the digital signal multi/demultiplexer described above, as can be seen by examining FIGS. 20, 21, when the high pass and low pass filters used in the 2-demultiplexing filter banks and 2-multiplexing filter banks are ordinary half-band filters, it becomes difficult to process signals with fidelity because they are affected by interference from aliasing components and distortion effects caused by signal attenuation at the filter joints.

On the other hand, if an ideal filter shown in FIG. 29 is used, it is possible to process the signals without interference and distortion effects. However, impulse response characteristics having such ideal square wave is impossible to realize within a finite time region.

Also, in the conventional variable transmission speed modem described above, input or output signals are frequency-multiplexed or demultiplexed using analogue circuits, so that as many local oscillators and low pass filters are necessary as there are parallel data groups, requiring large-scale circuits and high power consumption.

SUMMARY OF THE INVENTION

It is an object of the present invention to provide a digital signal demultiplexer and a digital signal multiplexer, in a convenient configuration and having desirable properties of not being affected by interferences due to aliasing components and signal distortions caused by signal attenuation in the filter joints.

It is another object of the present invention to provide a digital signal transmitter, a receiver and a modem, in a convenient configuration, to enable the modem to operate at variable speed while preventing lowering in frequency utilization.

The present invention relates to a digital signal demultiplexer having means for separating an input signal into two signals by using two types of filters having different passbands, and a band-separation filter comprised by serially-connected 2-demultiplexing filter banks having down-sampling means for culling sampling frequencies of divided groups of signals to 1/2; wherein a 2-demultiplexing filter bank includes either one type of filter or other type of filter, so that one type of filter is a filter A having a lower limit of band-pass frequency of not less than $-fs/4$ (where fs is the sampling frequency in the 2-demultiplexing filter bank) and an upper limit of band-pass frequency of not more than $fs/2$; and other type of filter is a filter B having a lower limit of band-pass frequency of not less than 0 and an upper limit of band-pass frequency of not more than $3fs/4$; or one type of filter is a filter C having a lower limit of band-pass frequency of not less than $-3fs/4$ and an upper limit of band-pass frequency of not more than 0; and other type of filter is a filter D having a lower limit of band-pass frequency of not less than $-fs/2$ and an upper limit of band-pass frequency of not more than $fs/4$; and these filters are arranged in series so that a 2-demultiplexing filter bank that follows filter A includes filter A and/or filter B, and a next-stage 2-demultiplexing filter bank that follows filter B includes filter C and/or filter D; and a next-stage 2-demultiplexing filter bank that follows filter C includes filter A and/or filter B; a next-stage 2-demultiplexing filter bank that follows filter D includes filter C and/or filter D.

Here, "band-pass" or "pass-band" refers to properties of a filter such as those shown in FIG. 5 to indicate the bandwidths of filtered signals. The upper edge (maximum frequency) of the pass-band is referred to as the "upper limit of band-pass" and the lower edge (minimum frequency) of the pass-band is referred to as the "lower limit of band-pass".

The digital signal multiplexer according to the structure described above is different from the conventional digital signal multiplexers because of the feature that the multiplexer is free from interference caused by aliasing components and distortions caused at the filter joints.

Also, the present digital demultiplexer is provided with a fist-stage in the band-separation filter bank comprising not less than one filter selected from the group consisting of filter A, filter B, filter C and filter D.

Accordingly, the present demultiplexer is different from the conventional digital multiplexers because the entire region of sampled bandwidths is free from interferences caused by aliasing components and distortions caused at the filter joints.

The present invention relates to a digital signal multiplexer having band-multiplexing filter means comprised by serially-connected 2-multiplexing filter banks comprised by up-sampling means for doubling sampling frequencies of each input signal, two types of filters for processing output signals from the up-sampling means, and multiplexing means for combining output signals from the two types of filters; wherein a 2-multiplexing filter bank includes either one type of filter or other type of filter, so that one type of filter is a filter E having a lower limit of band-pass frequency of not less than $-fs/4$ and an upper limit of band-pass frequency of not more than $fs/2$; and other type of filter is a filter F having a lower limit of band-pass frequency of not less than 0 and an upper limit of band-pass frequency of not more than $3fs/4$; or one type of filter is a filter G having a lower limit of band-pass frequency of not less than −3fs/4 and an upper limit of band-pass frequency of not more than 0; and other type of filter is a filter H having a lower limit of band-pass frequency of not less than −fs/2 and an upper limit of band-pass frequency of not more than fs/4; and these filters are arranged in series so that output signals from a 2-multiplexing filter bank that includes filter E and/or filter F are processed through up-sampling means to be input into filter E and/or filter G; and output signals from a 2-multiplexing filter bank that includes filter G and/or filter H are processed through up-sampling means to be input into filter F and/or filter H.

Accordingly, the present multiplexer is different from the conventional digital multiplexers because the signals can be multiplexed free from interferences caused by aliasing components and distortions caused at the filter joints, by arranging the filters having four type of filters having different pass-bands in a serial configuration described above.

Also, the present signal multiplexer is provided with a last-stage in the band-separation filter bank comprising not less than one filter selected from the group consisting of filter E, filter F, filter G and filter H.

The present digital signal multiplexer having above composition is different from the conventional digital multiplexers because the signals can be multiplexed free from interferences caused by aliasing components and distortions caused at the filter joints.

Also, the present digital signal multiplexer exhibits impulse responses A(n), B(n), C(n), D(n), E(n), F(n), G(n) and H(n) of said filters, A, B, C, D, E, F, G and H, respectively, satisfy equations:

$$I(n) \times e^{-j\frac{k}{4}\pi n}, \quad (k = 1, 3, 5, 7) \qquad \text{Equation (3)}$$

$$I(n) = 0 \ \left(n \neq \frac{N}{2} \text{ and } n \text{ is an odd number}\right) \qquad \text{Equation (4)}$$

where n is an integer and $1 \leq n \leq N$, and I(n) represents an impulse response of a source filter having a tap length N.

Because the volume of computation required becomes too high when complex filters are used in the digital signal demultiplexers and multiplexers, in the present devices, frequency conversion is carried out using the source filters in equation (3).

By adopting such an approach, the present devices offer advantages compared with the conventional devices, because the filter coefficients of every filter are real numbers, excepting the center tap, or imaginary numbers only, so that computation can be carried out within about the same volume as conventional real number filters. For example, when the source filter has seven taps, tap coefficients are obtained as shown in Table 2, by calculating the source tap coefficients as shown in Table 1 with Equation (3) in the case of k=1.

TABLE 1

| Number | Coefficient |
|---|---|
| 0 | a0 |
| 1 | 0 |
| 2 | a2 |
| 3 | a3 |
| 4 | a4 |
| 5 | 0 |
| 6 | a6 |

TABLE 2

| | Coefficient | |
|---|---|---|
| Number | Real part | Imaginary part |
| 0 | a0 | 0 |
| 1 | 0 | 0 |
| 2 | 0 | a2 |
| 3 | −a3/(2½) | a3/(2½) |
| 4 | −a4 | 0 |
| 5 | 0 | 0 |
| 6 | 0 | −a6 |

The present invention relates to a digital modem having at least a transmitter and a receiver, wherein:

a transmitter is comprised by:
  serial-parallel conversion means for converting serial signals to a plurality of parallel slow speed signals; a plurality of modulation means for modulating each signal in parallel-converted signals; and
  channel multiplexing means for frequency multiplexing modulated signals and a sending circuit; wherein a channel multiplexing means is comprised by not less than one 2-multiplexing filter bank containing: up-sampling means for doubling sampling frequencies of each signal in two input signals; two types of filters having different pass-bands for filtering output signals-from said up-sampling means, and multiplexing means for multiplexing output signals from the two types of filters; and
  when there are more than two 2-multiplexing filter banks, a channel multiplexing means is constructed by serially connecting a plurality of 2-multiplexing filter banks in a multi-stage configuration such that two groups of output signals from two modulation means are successively input into first 2-demultiplexing filter banks in next-stages so that output signals from one 2-demultiplexing filter bank is further input into another 2-multiplexing filter bank in a next-stage; so that, ultimately, output signals from two preceding 2-multiplexing filter banks are input into a last 2-multiplexing filter bank in a final-stage so that signals are input into the sending circuit, and produce output signals from the digital signal transmitter; and
the receiver is comprised by: a receiving circuit; a plurality of channel demultiplexing means for separating frequency multiplexed signals into two groups of signals; a plurality of demodulation circuits for demodulating output signals from the channel demultiplexing means; and parallel-serial conversion means for receiving output signals from each demodulation means; wherein a channel demultiplexing means is comprised by not less than one 2-multiplexing filter bank having: separating means for dividing input signals into two groups of signals by using two types of filters having different pass-bands; and
down-sampling means for culling sampling frequencies of two separated signals to 1/2; and when there are more than two 2-demultiplexing filter banks, 2-demultiplexing filter banks are connected serially so that output signals from the receiving circuit are input in successive 2-demultiplexing filter banks so that
  two groups of signals output from one 2-demultiplexing filter bank are input respectively into another 2-demultiplexing filter bank in a next-stage, so that ultimately signals output from a last 2-demultiplexing filter bank in a final-stage are input into respective demodulation means so that output signals from demodulation means are input in the parallel-serial conversion means so that signals output from the parallel-serial conversion means are produced as digital receiver output signals.

The present digital modem according to the structure presented above enables to produce the entire devices using digital circuits so as to obtain a compact device, which is different from the conventional digital modems.

The present digital modem includes at least either a transmitter and a receiver, and the transmitter is comprised by:

serial-parallel conversion means for converting serial signals to a plurality of parallel slow speed signals; a plurality of modulation means for modulating each signal of parallel-converted signals; and channel multiplexing means for frequency multiplexing modulated signals and a sending circuit; wherein the channel multiplexing means is comprised by not less than one 2-multiplexing filter bank containing: up-sampling means for doubling sampling frequencies of each signal in two groups of input signals; and two types of filters having different pass-bands for filtering output signals from the up-sampling means, and multiplexing means for multiplexing output signals from said two types of filters; and, when there are more than two 2-multiplexing filter banks, the 2-multiplexing filter banks are serially connecting in a multi-stage configuration such that, when there are not less than two 2-demultiplexing filter banks;

output signals from the two modulation means in the sending circuit are frequency multiplexed by using one of the 2-multiplexing filter banks, and the output signals from the 2-multiplexing filter bank and output from other modulation means connected to the serial-parallel conversion means, or output signals from a different 2-multiplexing filter bank having a common sampling frequency are multiplexed in a next 2-multiplexing filter bank in a next-stage, further, output signals from the 2-multiplexing filter bank and output signals from other modulation means connected to the serial-parallel conversion means, or output signals from 2-multiplexing filter banks having different sampling rates, are successively input into 2-demultiplexing filter banks in succeeding-stages so that output signals from one 2-demultiplexing filter bank is further input into another 2-multiplexing filter bank in a next-stage; so that, output signals from two preceding 2-multiplexing filter banks are input ultimately into a last 2-multiplexing filter bank in a final-stage so that signals are input into the sending circuit, and produce output signals from the digital signal transmitter; and the receiver is comprised by: a receiving circuit and a plurality of channel demultiplexing means for separating frequency multiplexed signals; a plurality of demodulation means for demodulating received signals; and parallel-serial conversion means for receiving output signals from the demodulation circuits, and the channel demultiplexing means is comprised by not less than one 2-demultiplexing filter bank having: a circuit for separating input signals into two groups of signals by using two types of filters having different pass-bands; and down-sampling means for culling sampling frequencies of two separated signals to 1/2; and, when there are more than two 2-demultiplexing filter banks, the 2-multiplexing filter banks are connected in series such that output signals from the receiving circuit are demultiplexed in the 2-demultiplexing filter bank in succeeding stages, and one output signals from the 2-demultiplexing filter bank or the demodulation circuit while other output signals are input in another 2-demultiplexing filter bank in a next-stage; so that output signals from a last-stage 2-demultiplexing filter bank are ultimately input into the parallel-serial conversion means so as to output signals from the conversion means as digital signal receiver signals.

In the present invention, the digital modem according to the structure presented above enables to produce variable transmission rates according to input transmission rates, by selecting suitable demodulation circuits.

The present invention relates to a digital modem having at least one of either a transmitter or a receiver, and the transmitter is comprised by: modulation means for time-division processing of input signals; channel multiplexing means for frequency multiplexing signals; and a sending circuit; and the channel multiplexing means is comprised by up-sampling means to double sampling frequencies of each signal in two groups of input signals; and the channel multiplexing means is comprised by not less than one 2-multiplexing filter bank including two kinds of filters having two different pass-bands for filtering output signals from the up-sampling means and multiplexing means for multiplexing two groups of signals output from the two types of filters, and when there are more than two 2-multiplexing filter banks, the 2-multiplexing filter banks are connected in series so that two output groups of time-division processed signals are input into one 2-multiplexing filter bank, and output signals from the one 2-multiplexing filter bank is further input into another 2-multiplexing filter bank in a next-stage and one group of modulated signals by time-division processing is input directly into a next-stage 2-multiplexing filter bank, so that output signals are ultimately input into a last 2-multiplexing filter bank in a final-stage so that signals are input into the sending circuit; and the receiver is comprised by: a receiving circuit and a plurality of channel demultiplexing means for separating frequency multiplexed signals; a plurality of demodulation means for time-division demodulating output signals from the channel demultiplexing means; and the channel demultiplexing means is comprised by not less than one 2-multiplexing filter bank having: a circuit for separating input signals into two groups of signals by using two types of filters having different pass-bands and down-sampling means for culling sampling frequencies of two separated signals to 1/2; and, when there are more than two 2-demultiplexing filter banks, the 2-demultiplexing filter banks are connected in series such that output signals from the receiving circuit are input in the 2-demultiplexing filter bank, and one group of signals output from the 2-demultiplexing filter bank are input in the time-division processing demodulation means, and other group of signals are input in another 2-demultiplexing filter bank in a next-stage; and, one group of signals in the two groups of signal output from the 2-demultiplexing filter bank are input into another 2-demultiplexing filter bank in a next-stage, and other group of signals are input another demodulation means in a time-division processing mode, so that output signals are ultimately produced from a final-stage time-division processed demodulation means.

In the present invention, digital modem according to the structure presented above enables to produce variable transmission rates according to the input transmission speed, by selecting suitable demodulation circuits.

Also, the present invention relates to the digital modem described above where one type of filter in the 2-multiplexing filter bank of the channel multiplexing means is a filter A having a lower limit of band-pass frequency of not less than −fs/4 (where fs is the sampling frequency in the 2-demultiplexing filter.bank) and an upper limit of band-pass frequency of not more than fs/2; and other type of filter is a filter B having a lower limit of band-pass frequency of not less than 0 and an upper limit of band-pass frequency of not more than 3fs/4; or one type of filter is a filter C having a lower limit of band-pass frequency of not less than −3fs/4 and an upper limit of band-pass frequency of not more than 0; and other type of filter is a filter D having a lower limit of band-pass frequency of not less than −fs/2 and an upper limit of band-pass frequency of not more than fs/4; so that these filters are arranged in series so that output signals processed through a 2-multiplexing filter bank containing one or both of filters A, B are input into filter A and/or filter C through the up-sampling means; and output signals processed through a 2-multiplexing filter bank containing one or both of filters C, D are input into filter B and/or filter D through the up-sampling means are processed by yet another filter bank that includes filter B and/or filter D.

Also, the present invention relates to the digital modem described above where 2-demultiplexing filter bank of the channel demultiplexing means is comprised by either of the two filter configurations so that:

one type of filter in the 2-demultiplexing filter bank of the channel demultiplexing means is a filter A having a lower limit of band-pass frequency of not less than −fs/4 (where fs is the sampling frequency in the 2-demultiplexing filter bank) and an upper limit of band-pass frequency of not more than fs/2; and other type of filter is a filter B having a lower limit of band-pass frequency of not less than 0 and an upper limit of band-pass frequency of not more than 3fs/4; or one type of filter is a filter C having a lower limit of band-pass frequency of not less than −3fs/4 and an upper limit of band-pass frequency of not more than 0; and other type of filter is a filter D having a lower limit of band-pass frequency of not less than −fs/2 and an upper limit of band-pass frequency of not more than fs/4; and a 2-demultiplexing filter bank in the next-stage for processing the signals output from the filter A contains filter A or /and B; a 2-demultiplexing filter bank in the next-stage for processing the signals output from the filter B contains filter C or /and D; a 2-demultiplexing filter bank in the next-stage for processing the signals output from the filter C contains filter A or /and B; and a 2-demultiplexing filter bank in the next-stage for processing the signals output from the filter D contains filter C or/and D.

The digital modem having the above construction enables to frequency multiplex signals in each channel without suffering from interference caused by aliasing components and detrimental effects caused by amplitude distortions.

Also, the present invention relates to a digital modem for processing input signals comprised by different slow speed signals.

The present digital modem is different from the conventional digital modem because it is provided with complex demodulation circuits having different modulation speeds. Accordingly, compared with the modem based on single speed demodulation circuit, the scale of the demodulation circuit can be reduced in the present digital modem.

The present invention relates to the digital signal transmitter in which a plurality of slow speed signals have different speeds.

According to the present digital modem, the number of demodulation means for obtaining a: uniform transmission speed can be minimized.

Also, the present invention relates to the digital modem in which at least parts of the demodulation means, modulation means, multiplexing means and demultiplexing means are operated on a time-division mode.

The digital modem of the construction described above provides different sampling speeds for the modulations means, 2-multiplexing filter banks, 2-demultiplexing filter banks and demodulation means, and utilizing the fact that the slower the sampling speed the higher the number of signal groups, the scale of the device is reduced by operating one group of higher speed processing means in a time-division mode.

Also, the present invention relates to the digital modem described above is provided with means for varying the operating speed of digital transmission and reception signals.

The digital modem having the construction described above is different from the conventional digital modems because of its capability for processing signals of different operating speeds.

BRIEF DESCRIPTION OF THE DRAWINGS

FIG. 20 is a block diagram of a first example of the conventional digital signal demultiplexer.

FIG. 21 is a block diagram of a second example of the conventional digital signal demultiplexer.

FIG. 22 is an illustration of frequency-multiplexed signals.

FIG. 23 illustrates part 1 of a series signal spectra in the various stages shown in FIG. 20.

FIG. 24 illustrates part 2 of a series of signal spectra in the various stage shown in FIG. 20.

FIG. 27 is an illustration of part 2 of a series of signal spectra in the various stages shown in FIG. 21.

FIG. 28 is an illustration of part 3 of a series of signal spectra in the various stages shown in FIG. 21.

DESCRIPTION OF THE PREFERRED EMBODIMENTS

The following embodiments are provided for illustrative purposes only, and are not meant to limit the scope of the claims in any manner. Also, it should be noted that all the combinations of all the features explained in the embodiments are not always required in some applications.

In the following explanations, Embodiments 1-1 to 1-4 relate to digital signal demultiplexers and multiplexers. Embodiment 2-1 to 2-4 relate to digital signal transmitters and receivers, and digital modems incorporating such devices.

Embodiment 1-1

Figure 1:
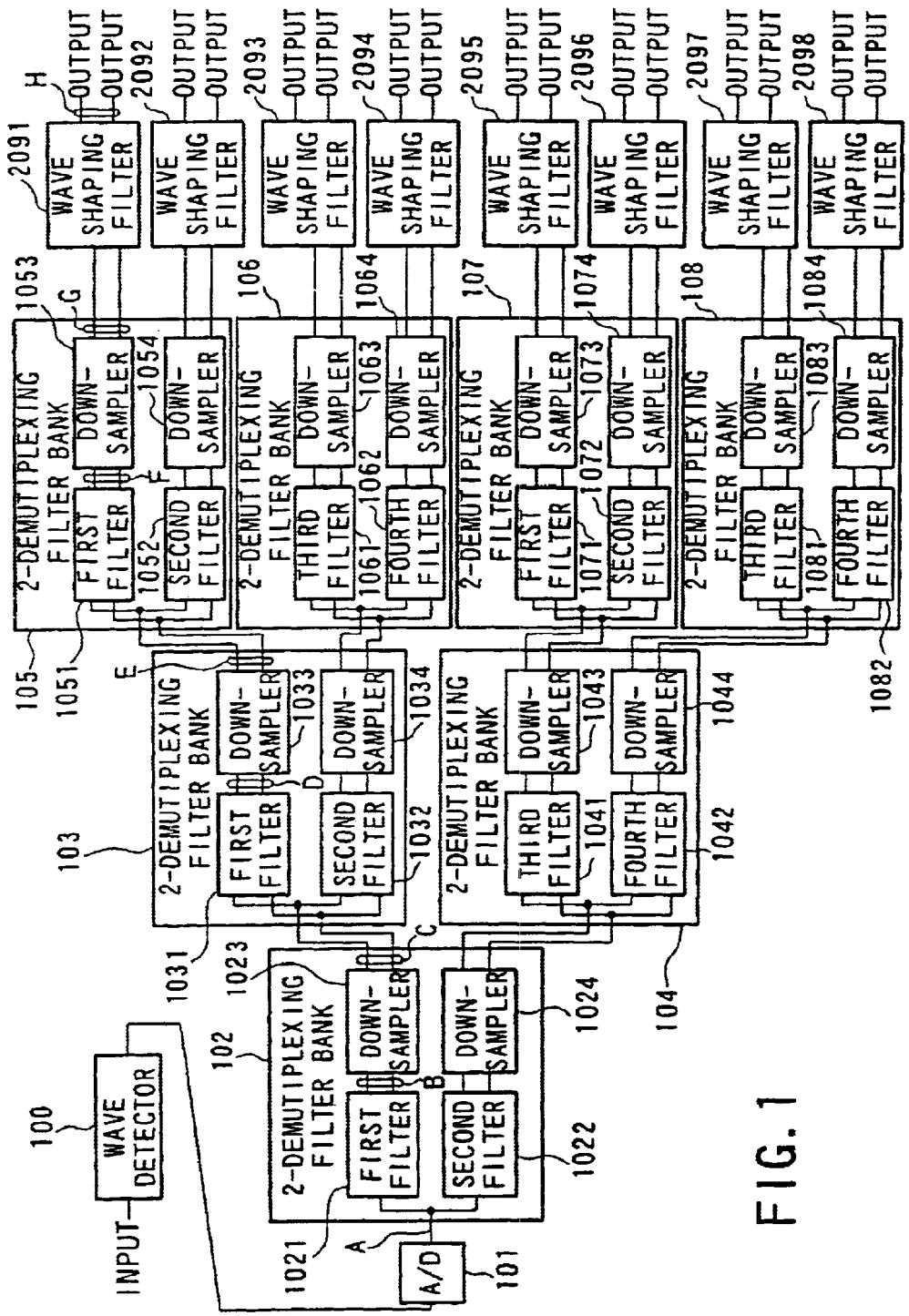
FIG. 1 is a block diagram of an example of the structure of digital signal demultiplexer in Embodiment 1-1.

FIG. 1 shows a demultiplexer in Embodiment 1-1.

The demultiplexer is comprised by: wave detector 100; A/D converter 101; 2-demultiplexing filter banks 102~108 inclusively; first filters 1021, 1031, 1051, 1071; second filters 1022, 1032, 1052, 1072.

The device also includes third filters 1041, 1061, 1081; fourth filters 1042, 1062, 1082; down-samplers 1023, 1024, 1033, 1034, 1043, 1044, 1053, 1054, 1063, 1064, 1073, 1074, 1083, 1084; and wave shaping filters 2091~2098 inclusively.

Figure 5:
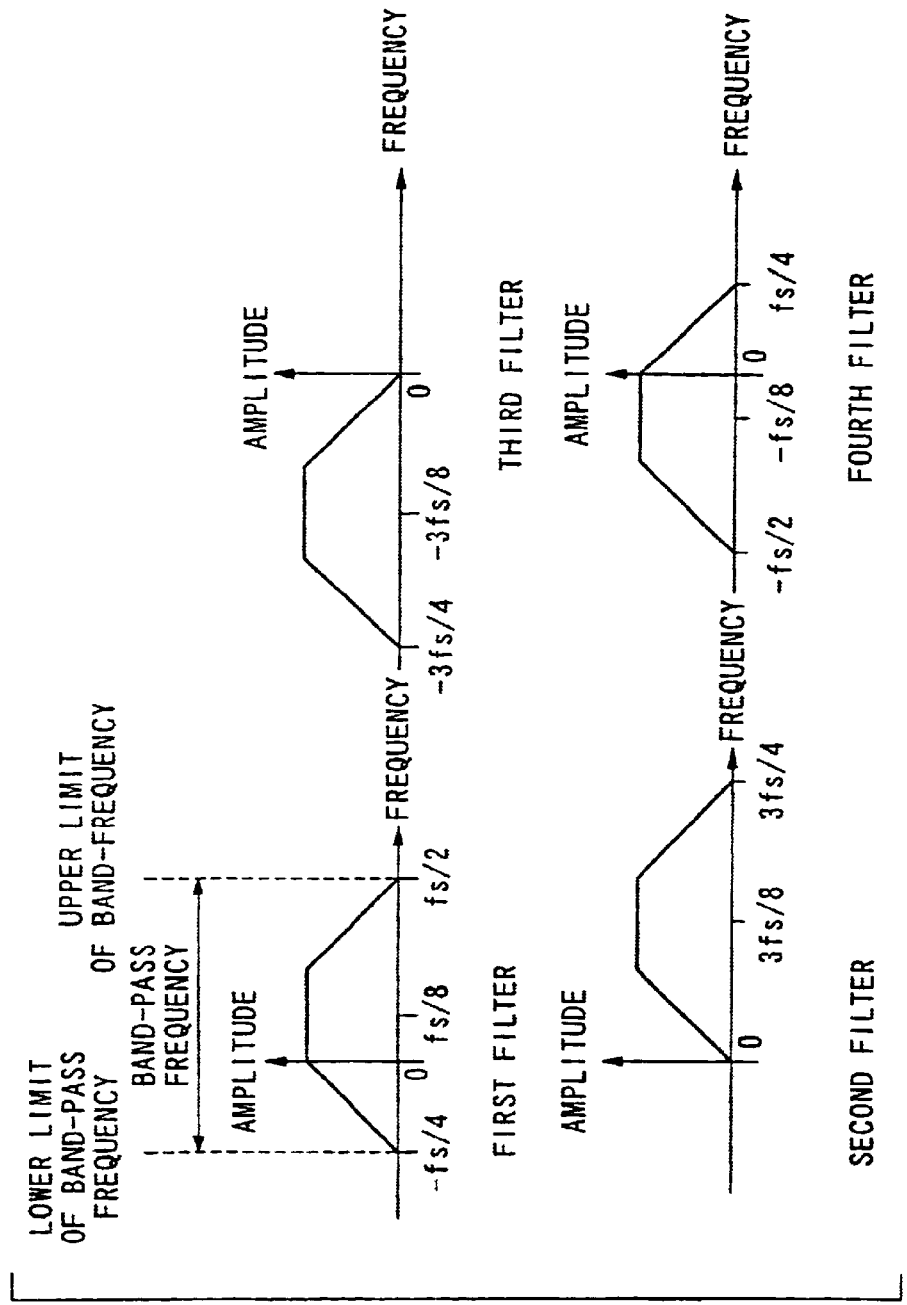
FIG. 5 is an illustration of performance characteristics of filters.

The frequency response characteristics for the first, second, third and fourth filters are as shown in FIG. 5 and the source filter has seven taps and their tap coefficients are as shown in Tables 2~5 inclusively.

The characteristics shown in FIG. 5 are those obtained when the sampling frequency for the filters in the filter banks is fs, and signals are sampled over a range of –fs/2 to fs/2. When the pass region is regulated within fs, filtering characteristics are as shown in Table 5 for the first, second, third and fourth filters in the ascending order of frequencies.

TABLE 3

| | Coefficient | |
|---|---|---|
| Number | Real part | Imaginary part |
| 0 | 0 | a0 |
| 1 | 0 | 0 |
| 2 | a2 | 0 |
| 3 | –a3/(2½) | a3/(2½) |
| 4 | 0 | –a4 |
| 5 | 0 | 0 |
| 6 | 0 | a6 |

TABLE 4

| | Coefficient | |
|---|---|---|
| Number | Real part | Imaginary part |
| 0 | –a0 | 0 |
| 1 | 0 | 0 |
| 2 | 0 | –a2 |
| 3 | –a3/(2½) | a3/(2½) |
| 4 | a4 | 0 |
| 5 | 0 | 0 |
| 6 | 0 | a6 |

TABLE 5

| | Coefficient | |
|---|---|---|
| Number | Real part | Imaginary part |
| 0 | 0 | –a0 |
| 1 | 0 | 0 |
| 2 | –a2 | a2 |
| 3 | –a3/(2½) | a3/(2½) |
| 4 | 0 | a4 |
| 5 | 0 | 0 |
| 6 | a6 | 0 |

Signals received in the digital signal demultiplexer are input in the wave detector 100, and then input in the A/D converter 101. Signals input in the A//D converter 101 are digitized and input in the 2-demultiplexing filter bank 102. Signals are split into two groups in the 2-multiplexing filter bank 102, and are input into first filter 1021 and second filter 1022 having different pass regions to limit the bandwidth.

Figure 6:
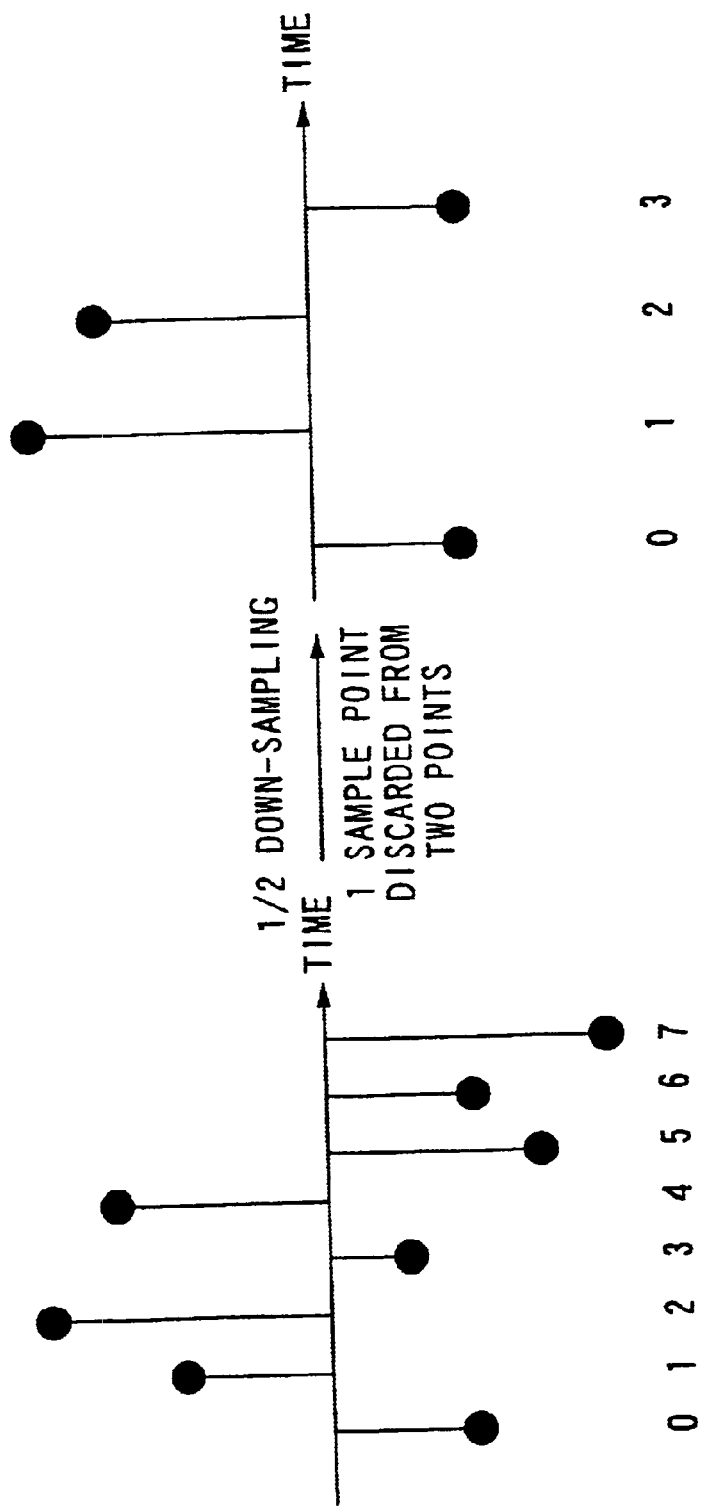
FIG. 6 is a timing chart for 1/2 down-sampling.

Bandwidth-limited signals are input in the down-samplers 1023, 1024 connected to the respective groups, and are culled to 1/2 by down-sampling at the timing shown in FIG. 6. Signals output from the down-sampler 1023 are input in the serially-connected demultiplexing filter bank 103, and those output from the down-sampler 1024 are input in the 2-demultiplexing filter bank 104.

The 2-demultiplexing filter bank 103 is comprised by a first filter, a second filter and two down-samplers, and similarly, the 2-demultiplexing filter bank 104 are comprised by a third filter, a fourth filter and two down-samplers. The signals are split into two groups in the 2-demultiplexing filter banks 203, 104, and are input in half-band filters 1031, 1032, 1041, 1042, respectively. Bandwidth-limited signals are input in the down-samplers 1033, 1034, 1043, 1044 that are connected to respective groups.

The signals are down-sampled at the timing shown in FIG. 6 so as to cull the number to 1/2. Signals output from the down-sampler 1033 are input in the serially-connected 2-demultiplexing filter bank 105, those output from the down-sampler 1034 are input in the serially-connected 2-demultiplexing filter bank 106, those output from the down-sampler 1043 are input in the serially-connected 2-demultiplexing filter bank 107, and those output from the down-sampler 1044 are input in the serially-connected 2-demultiplexing filter bank 108.

The 2-demultiplexing filter bank 105 is comprised by a first filter, a second filter and two down-samplers, and similarly, the 2-demultiplexing filter bank 106 is comprised by a third filter, a fourth filter and two down-samplers. Similarly, the 2-demultiplexing filter bank 107 is comprised by a first filter, a second filter and two down-samplers, and similarly, the 2-demultiplexing filter bank 108 is comprised by a third filter, a fourth filter and two down-samplers.

The signals are split into two groups in the 2-demultiplexing filter banks 105; 106, 107, 108, and are input in the half-band filters 1051, 1052, 1061, 1062, 1071, 1072, 1081, 1082 respectively.

Bandwidth-limited signals are input in the down-samplers 1053, 1054, 1063, 1064, 1073, 1074, 1083, 1084 connected to respective groups, and are down-sampled to cull the number to 1/2, and are input in the wave shaping filters 2091~2098 inclusively, and are output as eight independent group of signals.

Figure 7:
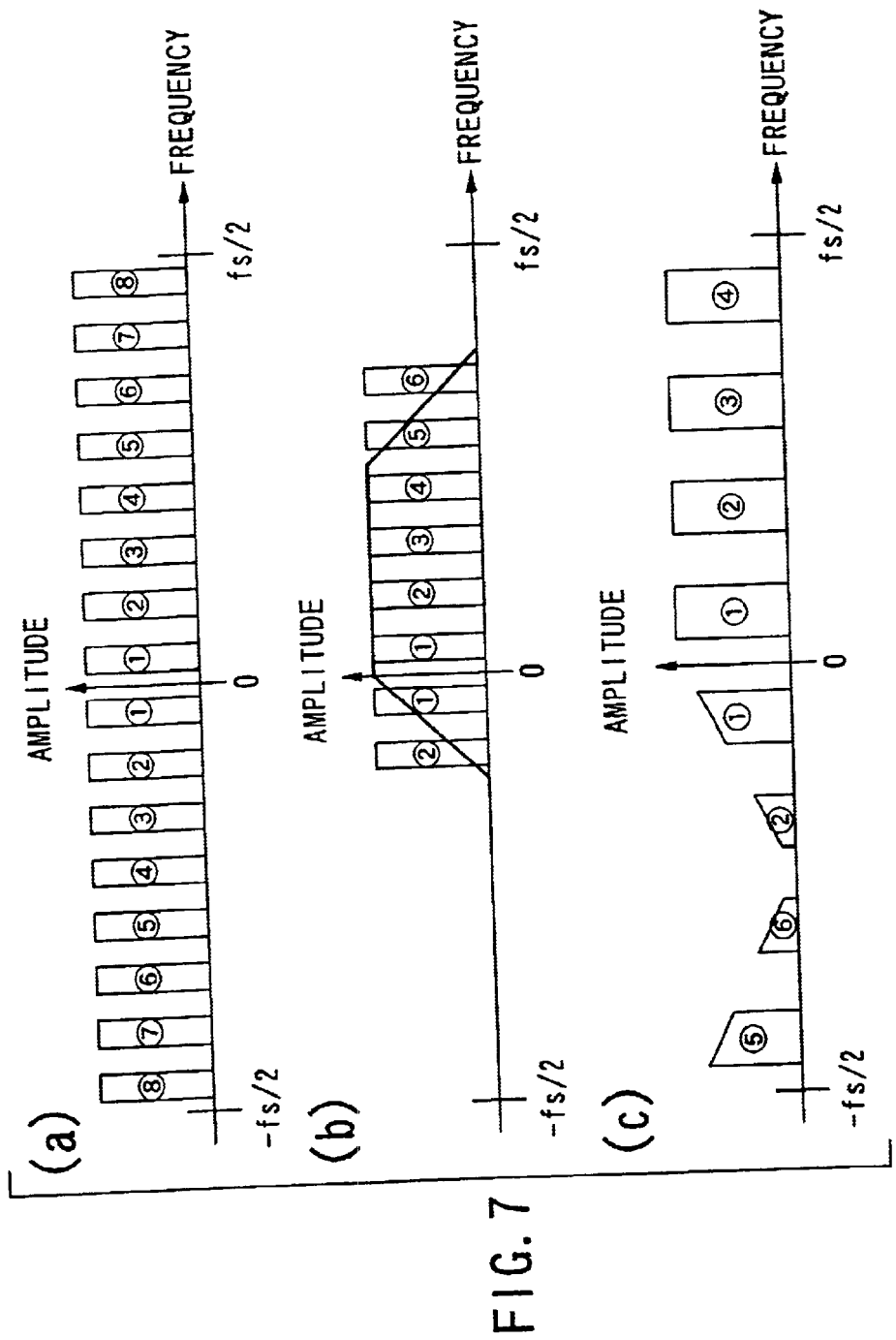
FIG. 7 illustrates part 1 of a series of signal s in the various stages shown in FIG. 1.
Figure 8:
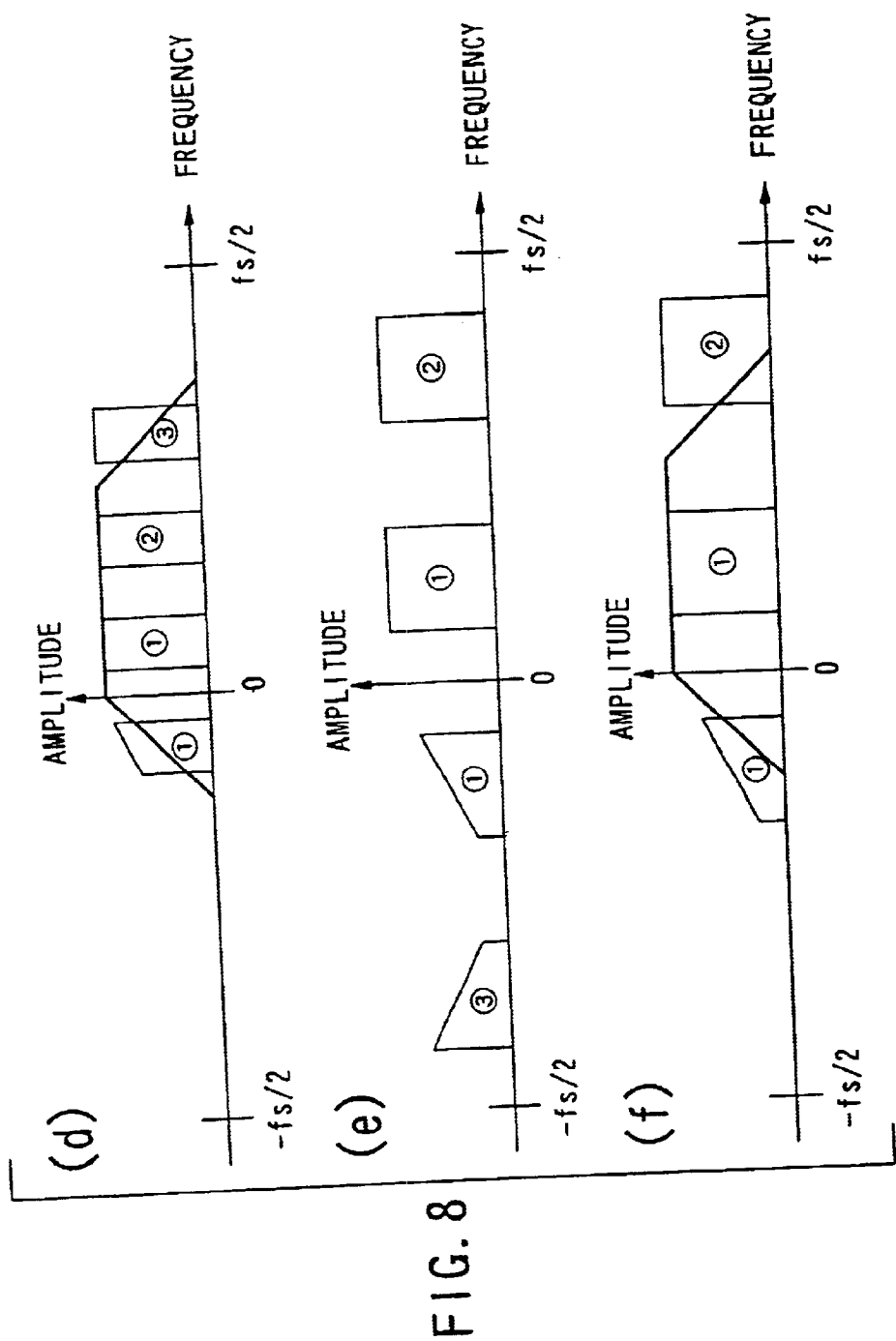
FIG. 8 illustrates part 2 of a series of signal spectra in the various stages shown in FIG. 1.
Figure 9:
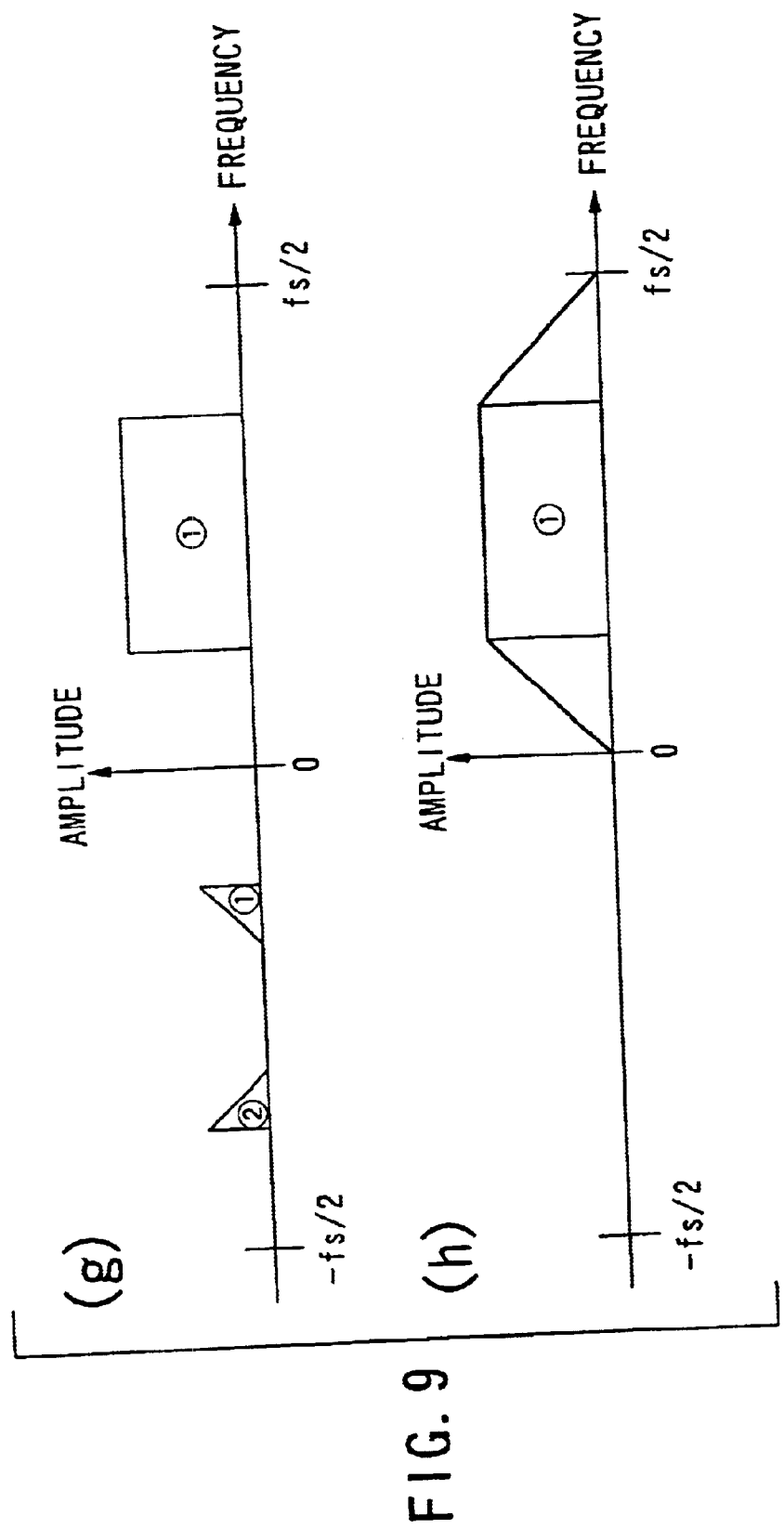
FIG. 9 illustrates part 3 of a series of signal spectra in the various stages shown in FIG. 1.

Signal spectra at the points A, B, C, D, E, F, G, H of the signals processed through the components 1021, 1023, 1031, 1033, 1051, 1053 in FIG. 1 are shown, respectively, in the parts (a)~(h) in FIGS. 7~9.

Embodiment 1-2

Figure 2:
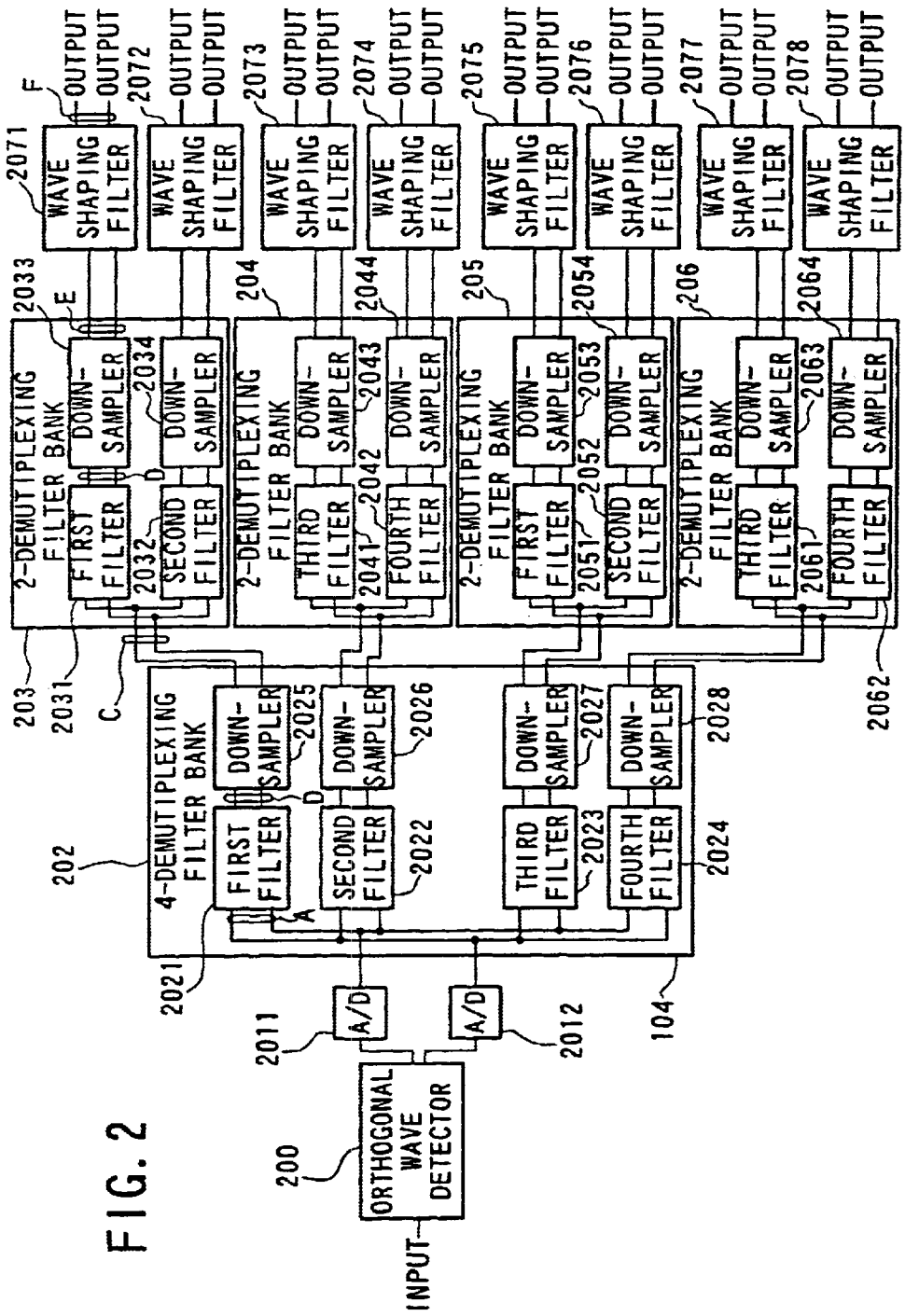
FIG. 2 is a block diagram of an example of the structure of digital signal demultiplexer in Embodiment 1-2.

The demultiplexer in Embodiment 1-2 is shown in FIG. 2. The demultiplexer is comprised by: orthogonal wave detector 200; A/D converters 2011, 2012; 4-demultiplexing filter bank 202; 2-demultiplexing filter banks 203~206 inclusively; first filters 2021, 2031, 2051; second filters 2022, 2032, 2052; third filters 2023, 2041, 2061.

The device also includes fourth filters 2024, 2042, 2062; down-samplers 2025, 2026, 2027, 2028, 2033, 2034, 2043, 2044, 2053, 2054, 2063, 20644; and wave shaping filters 2071~2078 inclusively.

The frequency performance characteristics for the first, second, third and fourth filters are shown in FIG. 5, and the source filter has seven taps and their tap coefficients are shown in Tables 2~5 inclusively. The signals received in the digital signal demultiplexer are input in the orthogonal wave detector 200 and are converted to orthogonal components. Output signals from the orthogonal wave detector 200 are input in the A/D converters 2111, 2012, and in-phase components and orthogonal components are converted to digital signals in the respective A/D converters.

Output signals from the A/D converters 2011, 2012 are input in the 4-demultiplexing filter bank 202. Signals in the 4-demultiplexing filter bank 202 are divided into four groups, and are input into first, second, third and fourth filters 2021, 2022, 2023, 2024, respectively, having different pass regions to limit the bandwidths. Bandwidth-limited signals are input in the down-samplers 2025, 1026, 2027, 2028 connected to the respective group of signals, and are culled to 1/2 by down-sampling at the timing shown in FIG. 6.

Signals output from the down-sampler 2025 are input in the serially-connected 2-demultiplexing filter bank 203, those output from the down-sampler 2026 are input in the 2-demultiplexing filter bank 204, those output from the down-sampler 2027 are input in the 2-demultiplexing filter bank 205, and those output from the down-sampler 2028 are serially-connected 2-demultiplexing filter 206.

The 2-demultiplexing filter banks 203, 205 are comprised by a first filter, a second filter and two down-samplers, and similarly, the 2-demultiplexing filter bank 204, 206 are comprised by a third filter, a fourth filter and two down-samplers. The signals are split into two groups in the 2-demultiplexing filter banks 203, and are input in first filter 2031 and a second filter 2032.

Bandwidth-limited signals are input in the down-samplers 2033, 2034 that are connected to respective groups, and the signals are down-sampled at the timing shown in FIG. 6 so as to cull the number to 1/2. Similarly, signals are split into two groups in the 2-demultiplexing filter bank 204, and are input in the third bank 2041 and the fourth filter 2042.

Bandwidth-limited signals are input in the down-samplers 2043, 2044 that are connected to respective groups, and the signals are down-sampled at the timing shown in FIG. 6 so as to cull the number to 1/2. Similarly, signals are split into two groups in the 2-demultiplexing filter bank 205, and are input in the first filter 2051 and the second filter 2052, respectively.

Bandwidth-limited signals are input in the down-samplers 2053, 2054 that are connected to respective groups, and the signals are down-sampled at the timing shown in FIG. 6 so as to cull the number to 1/2. Similarly, signals are split into two groups of signals in the 2-demultiplexing filter bank 206, and are input in the third filter 2061 and the fourth filter 2062, respectively.

Bandwidth-limited signals are input in the down-samplers 2063, 2064 that are connected to respective groups, and the signals are down-sampled at the timing shown in FIG. 6 so as to cull the number to 1/2, and are input in the wave shaping filters 2071~2078 respectively, and are output as eight independent group of signals.

Figure 10:
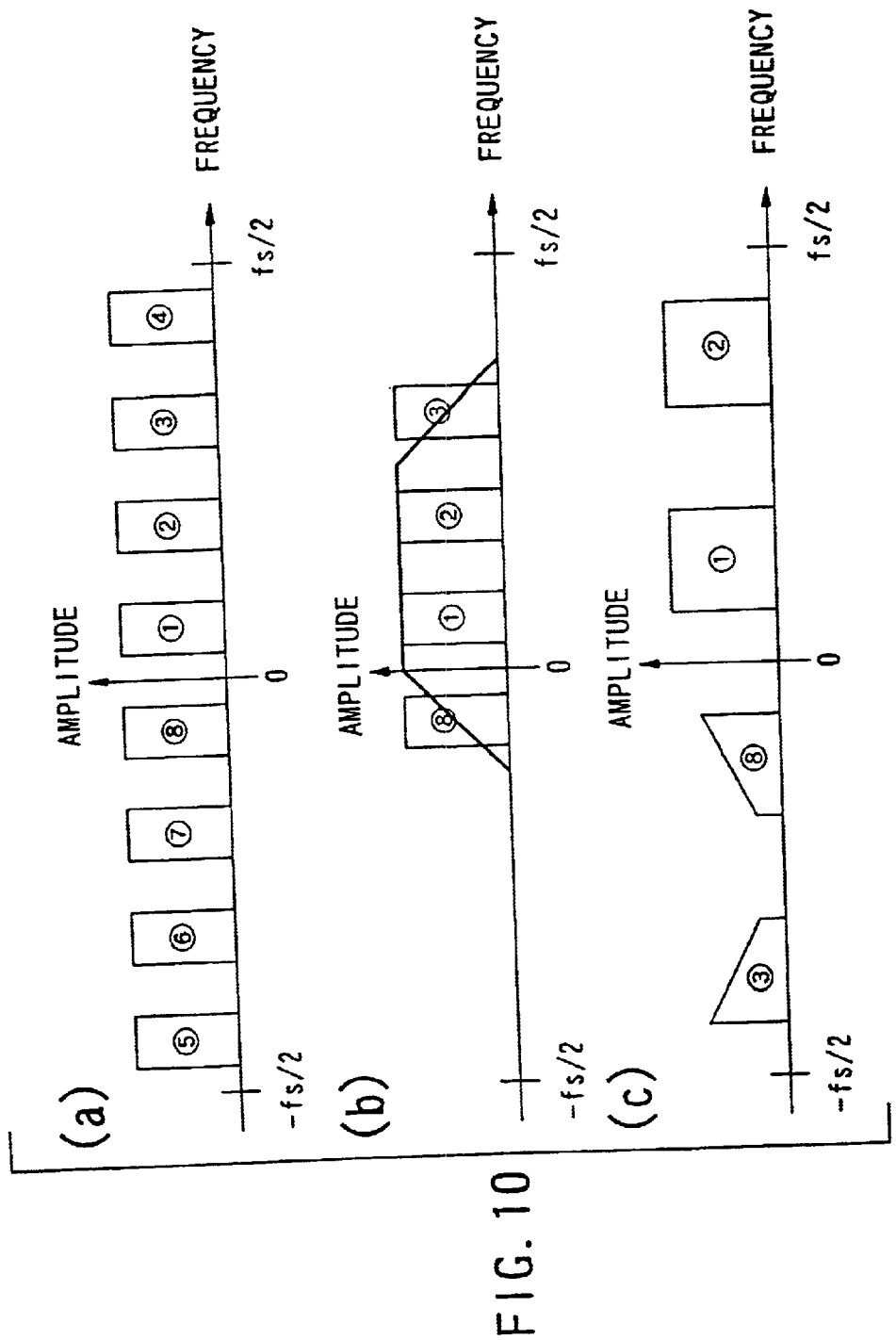
FIG. 10 illustrates part 1 of a series of signal spectra in the various stages shown in FIG. 2.
Figure 11:
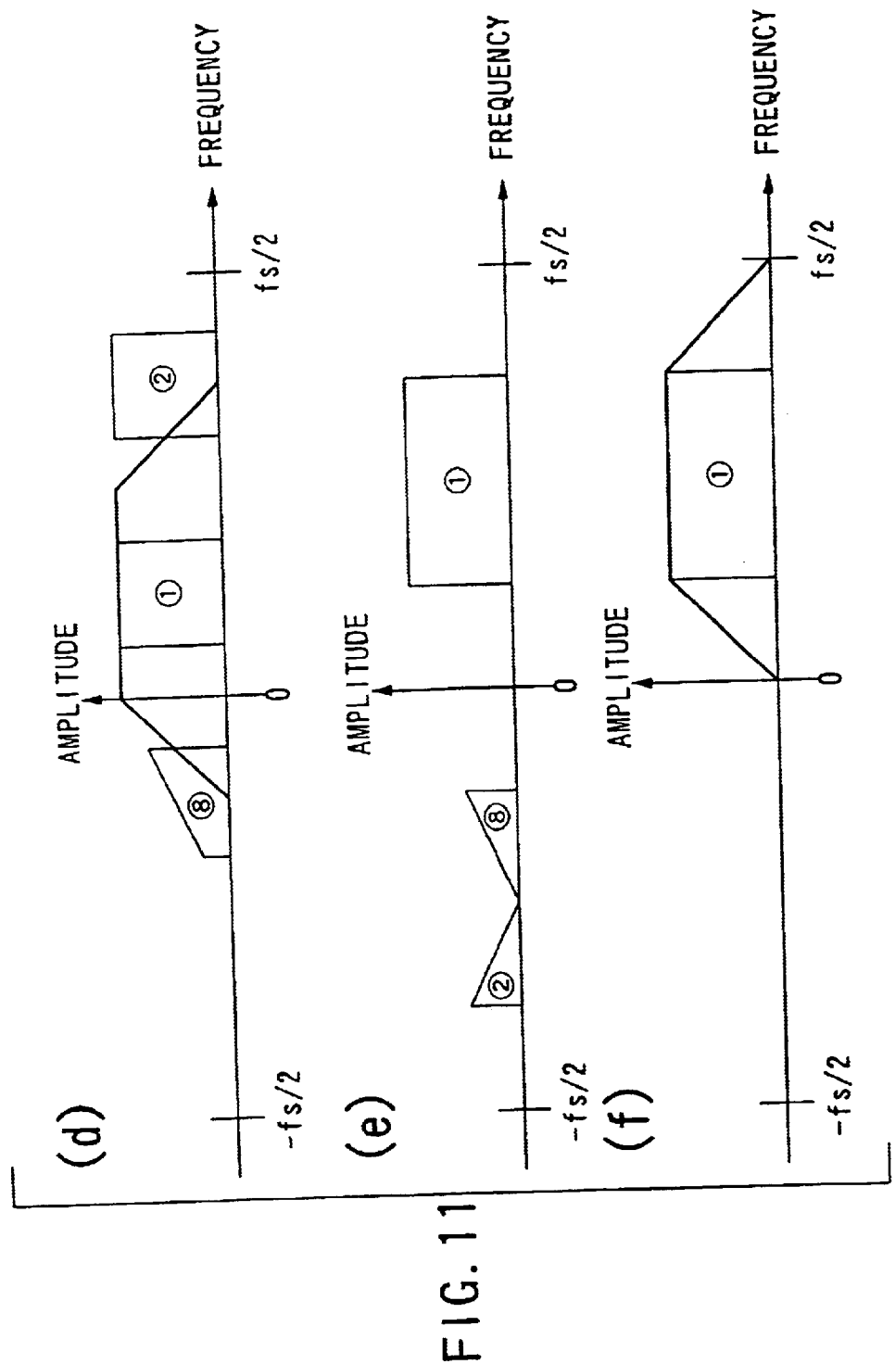
FIG. 11 illustrates part 2 of a series of signal spectra in various stages in FIG. 2.

Signal spectra at the points A, B, C, D, E, F, G, H of the signals processed through the components 2021, 2025, 2031, 2033 indicated in FIG. 2 are shown, respectively, in the parts (a)~(f) in FIGS. 10~11.

Embodiment 1-3

Figure 3:
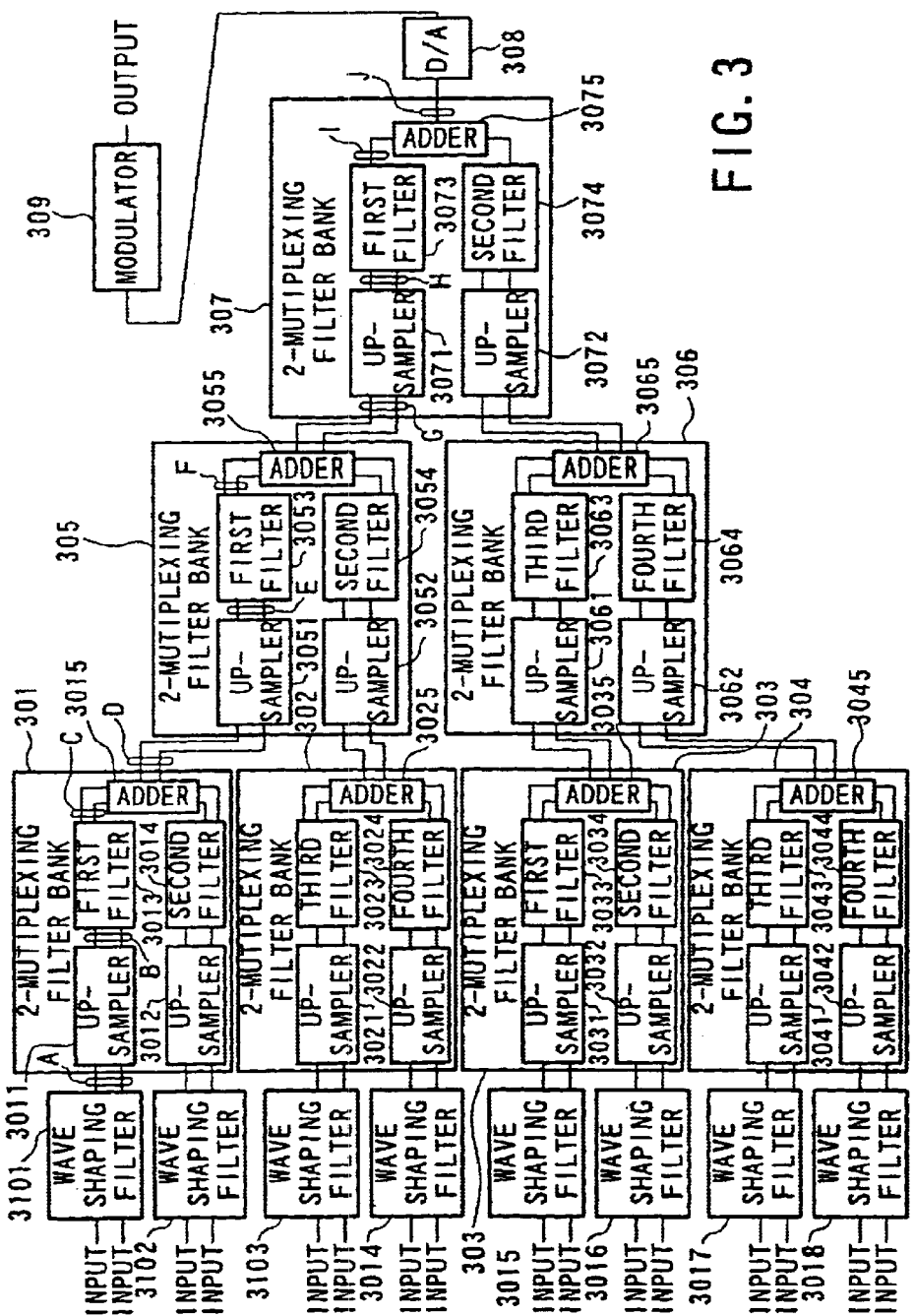
FIG. 3 is a block diagram of an example of the structure of digital signal demultiplexer in Embodiment 1-3.

The multiplexer in Embodiment 1-3 is shown in FIG. 3.

The frequency response characteristics are shown in FIG. 5 for the first, second, third and fourth filters, and the source filter has seven taps and their tap coefficients are shown in Tables 2~5 inclusively.

The multiplexer includes: 2-multiplexing filter banks 301~307 inclusively; up-samplers 3011, 3012, 3021, 3022, 3031, 3032, 3041, 3042, 3051, 3052, 3061, 3062, 3071, 3072; and first filters 3013, 3033, 3053, 3073.

The device also includes: second filter banks 3014, 3034, 3054, 3074; third filters 3023, 3043, 3063; fourth filters 3024, 3044, 3064; adders 3015, 3025, 3035, 3045, 3055, 3065, 3075; D/A converter 308; modulator 309; and wave shaping filters 3101~3108 inclusively.

Eight different groups of sending signals input in the digital signal multiplexer are input in the wave shaping filters 3101~3108 respectively. Every two groups of signals output from the wave shaping filters are combined, and each grouping is input in the respective 2-multiplexing filter banks 301, 302, 303, 304.

Figure 12:
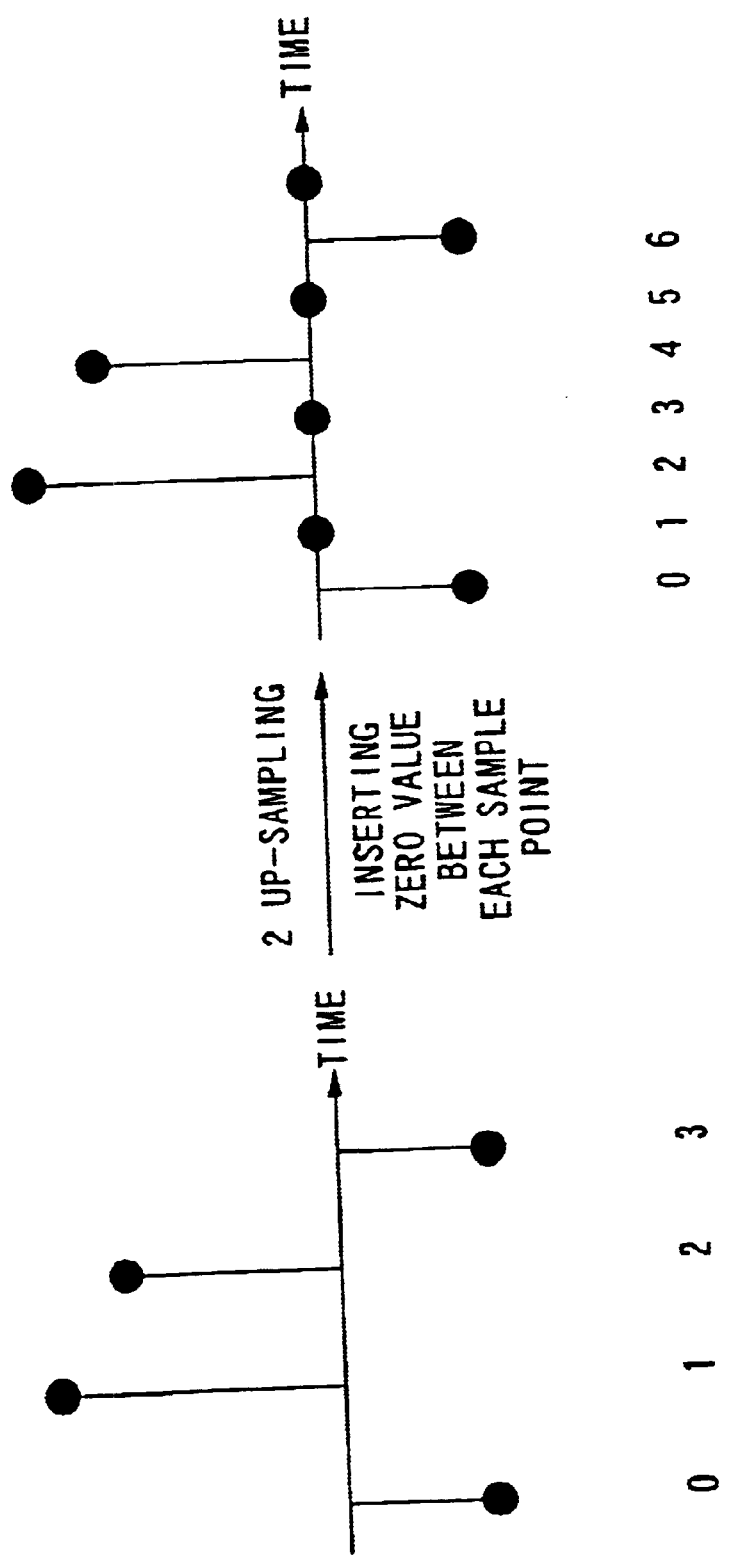
FIG. 12 is a timing chart for ×2 up-sampling.
Figure 13:
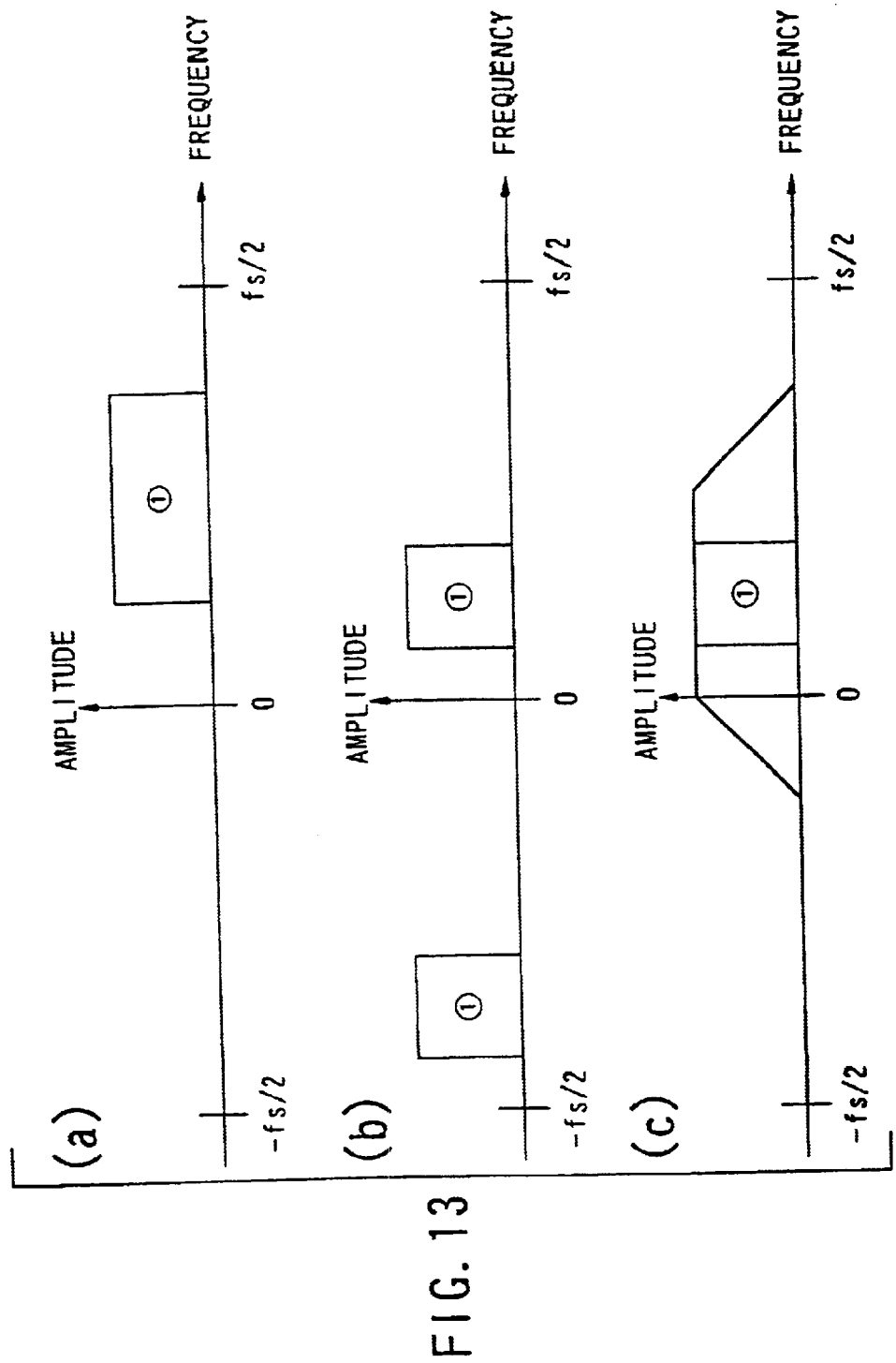
FIG. 13 illustrates part 1 of a series of signal spectra in the various stages shown in FIG. 3.
Figure 14:
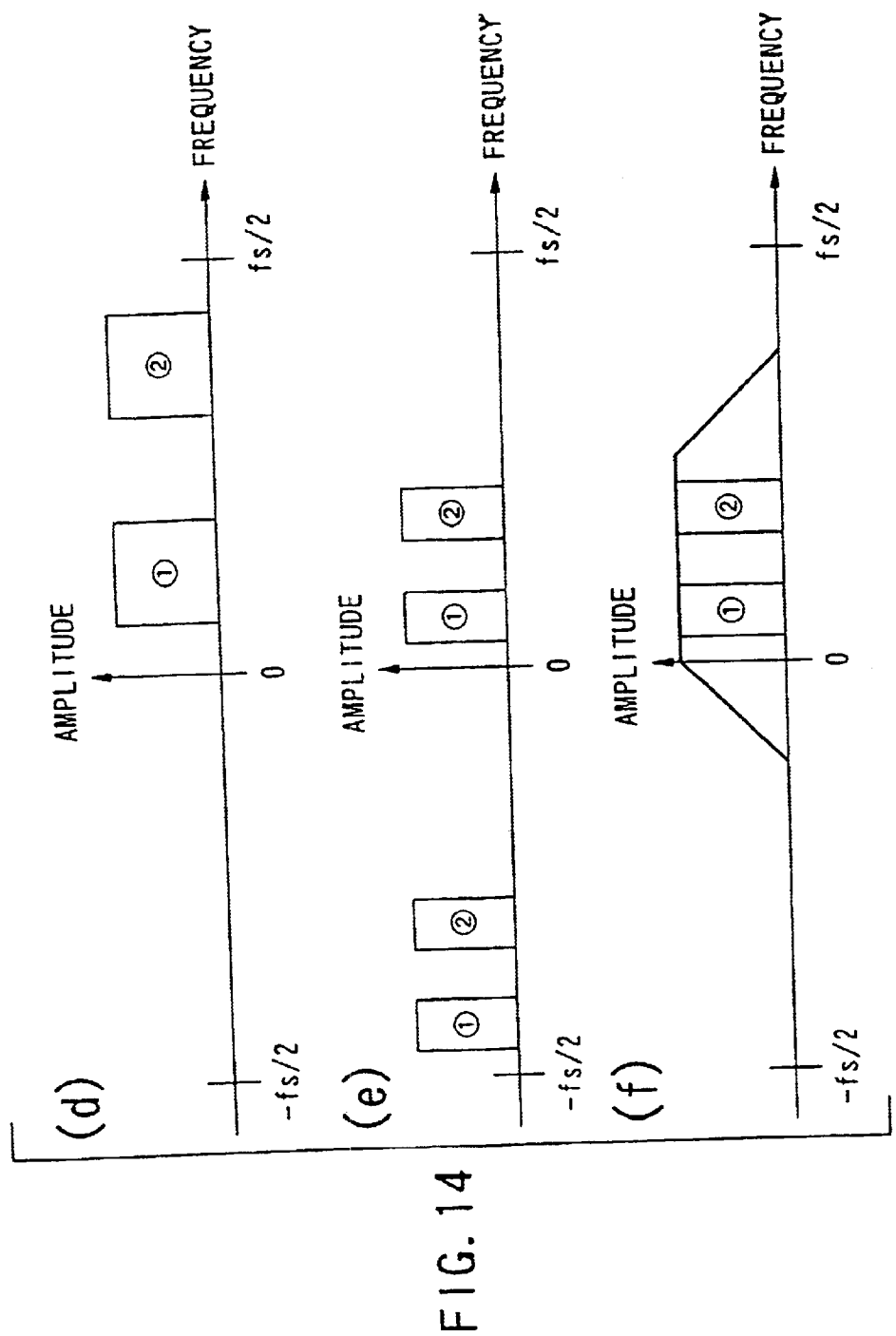
FIG. 14 illustrates part 2 of a series of signal spectra in the various stages shown in FIG. 3.
Figure 15:
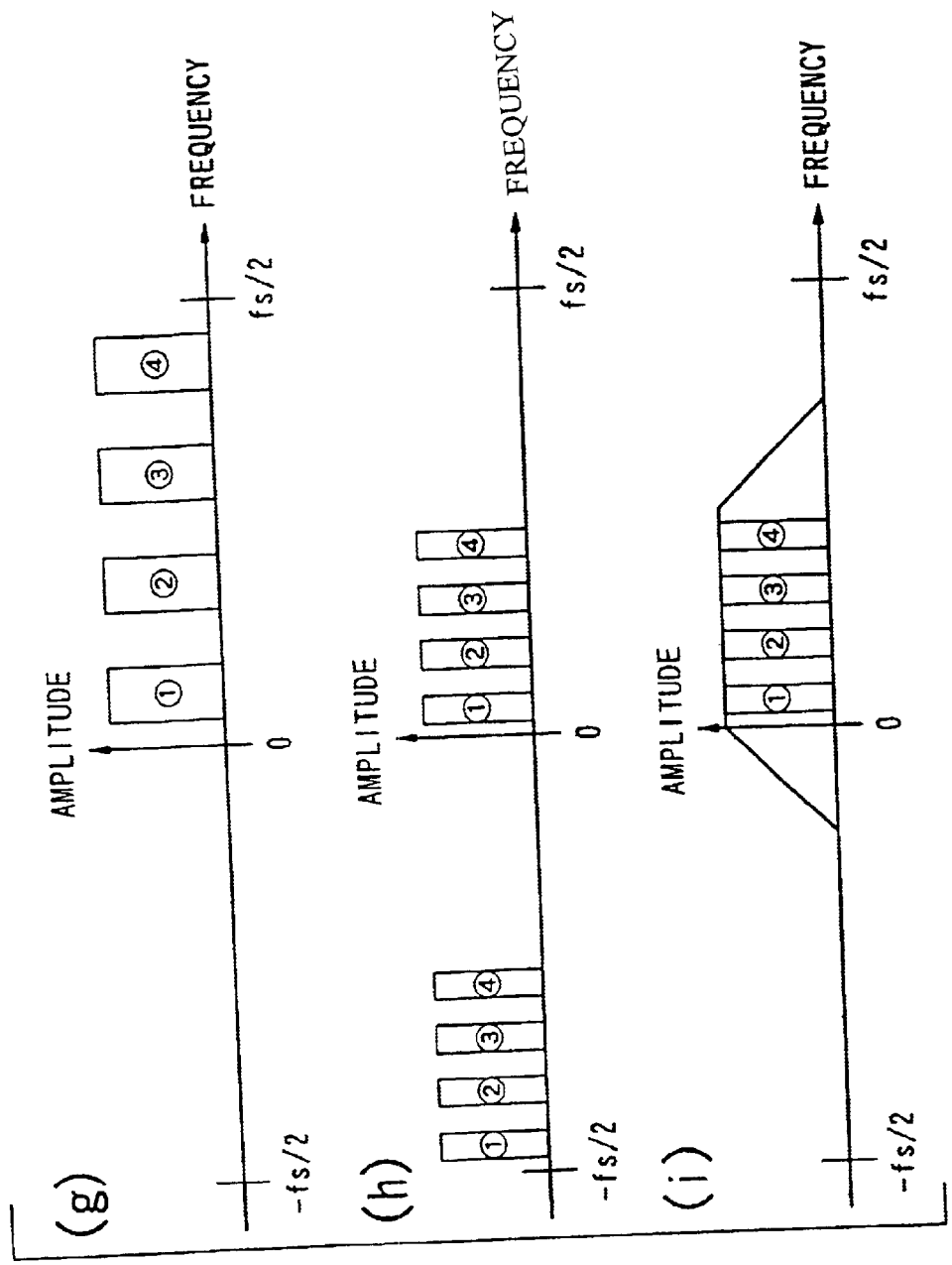
FIG. 15 illustrates part 3 of a series of signal spectra in the various stages in FIG. 3.
Figure 16:
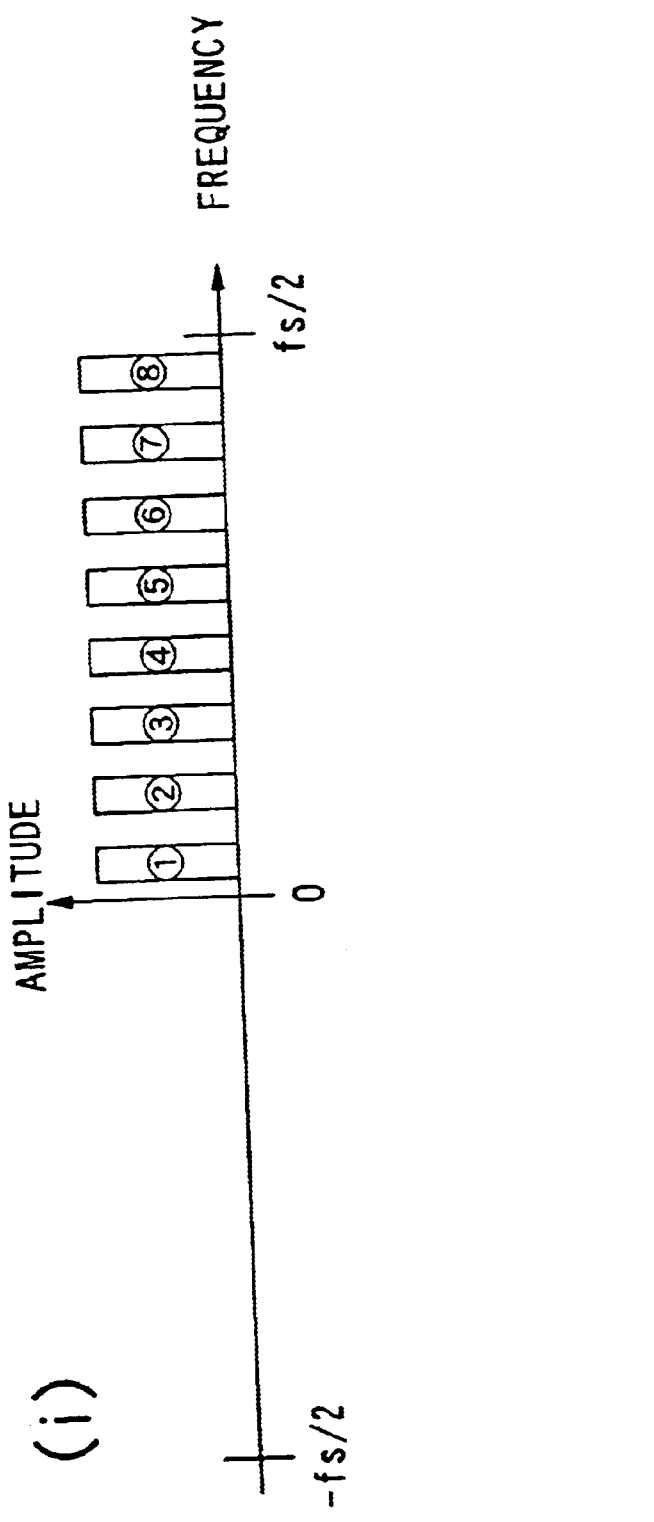
FIG. 16 illustrates part 4 of a series signal spectra in the various stages shown in FIG. 3.

Signals are input in the serially-connected up-samplers 3011 and 3012 in the 2-multiplexing filter bank 301, and are subjected to ×2 up-sampling at the timing shown in FIG. 12. Output signals from the up-samplers 3011, 3012 are input in the first filter 3013 and second filter 3014 to limit the bandwidth.

Output signals from the first filter 3013 and second filter 2014 are added in the complex adder 3015. Similarly, output signals are input in the up-sampler 3021 and 3022 in the 2-multiplexing filter bank 302 and are subjected to ×2 up-sampling at the timing shown in FIG. 12.

Output signals from the up-samplers 3021, 3022 are input in the third filter 3023, fourth filter 3024 to limit the bandwidth. Output signals from the third filter 3023 and the fourth filter 3024 are input in the complex adder 3025 and added. Similarly, signals are input in the up-samplers 3031, 3032 in the 2-multiplexing filter bank 303, and are subjected to ×2 up-sampling at the timing shown in FIG. 12.

Output signals from the up-samplers 3031, 3032 are input in the first filter 3033, second filter 3034 to limit the bandwidth. Output signals from the first filter 3033 and the second filter 3034 are input in the complex adder 3035 and added. Similarly, signals are input in the up-samplers 3041, 3042 in the 2-multiplexing filter bank 304, and are subjected to ×2 up-sampling at the timing shown in FIG. 12.

Output signals from the up-samplers 3041, 3042 are input in the third filter 3043, fourth filter 3044 to limit the bandwidth. Output signals from the third filter 3043 and the fourth filter 3044 are input in the complex adder 3045 and added. Signals from the 2-multiplexing filter bank 301, 302 are input in the 2-demultiplexing filter bank 305.

Signals are input in the serially-connected up-samplers 3051 and 3052 in the 2-multiplexing filter bank 305, and are subjected to ×2 up-sampling at the timing shown in FIG. 12. Output signals from the up-samplers 3051, 3052 are input in the first filter 3053 and second filter 3054, respectively, to limit the bandwidth.

Output signals from the first filter 3053 and second filter 3054 are input in the complex adder 3055 and added.

Similarly, output signals from the 2-multiplexing filter banks 303, 304 are input in the 2-multiplexing filter bank 306. Signals are input in the serially-connected up-samplers 3061 and 3062 in the 2-multiplexing filter bank 306 and are subjected to ×2 (or 2 times) up-sampling at the timing shown in FIG. 12.

Output signals from the up-samplers 3061, 3062 are input in the third filter 3063, fourth filter 3064 to limit the bandwidth. Output signals from the third filter 3063 and the fourth filter 3064 are input in the complex adder 3065 and added. Signals from the 2-multiplexing filter banks 305, 306 are input in the 2-demultiplexing filter bank 307.

Signals are input in the serially-connected up-samplers 3071 and 3072 in the 2-multiplexing filter bank 307, and are subjected to ×2 up-sampling at the timing shown in FIG. 12. Output signals from the up-samplers 3071, 3072 are input in the first filter 3073 and second filter 3074 to limit the bandwidth.

Output signals from the first filter 3073 and second filter 3074 are input in the complex adder 3075 and added. Output signals from the 2-multiplexing filter bank 307 are input in the A/D converter 308 and converted analogue signals and are input in the modulator 309 to be transmitted.

Signal spectra at the points A, B, C, D, E, F, G, H, I, J of the signals processed through the components 3011, 3013, 3015, 3051, 3053, 3055, 3071, 3073, 3075 indicated in FIG. 3 are shown, respectively, in the parts (a)~(j) in FIGS. 13~16.

Embodiment 1-4

Figure 4:
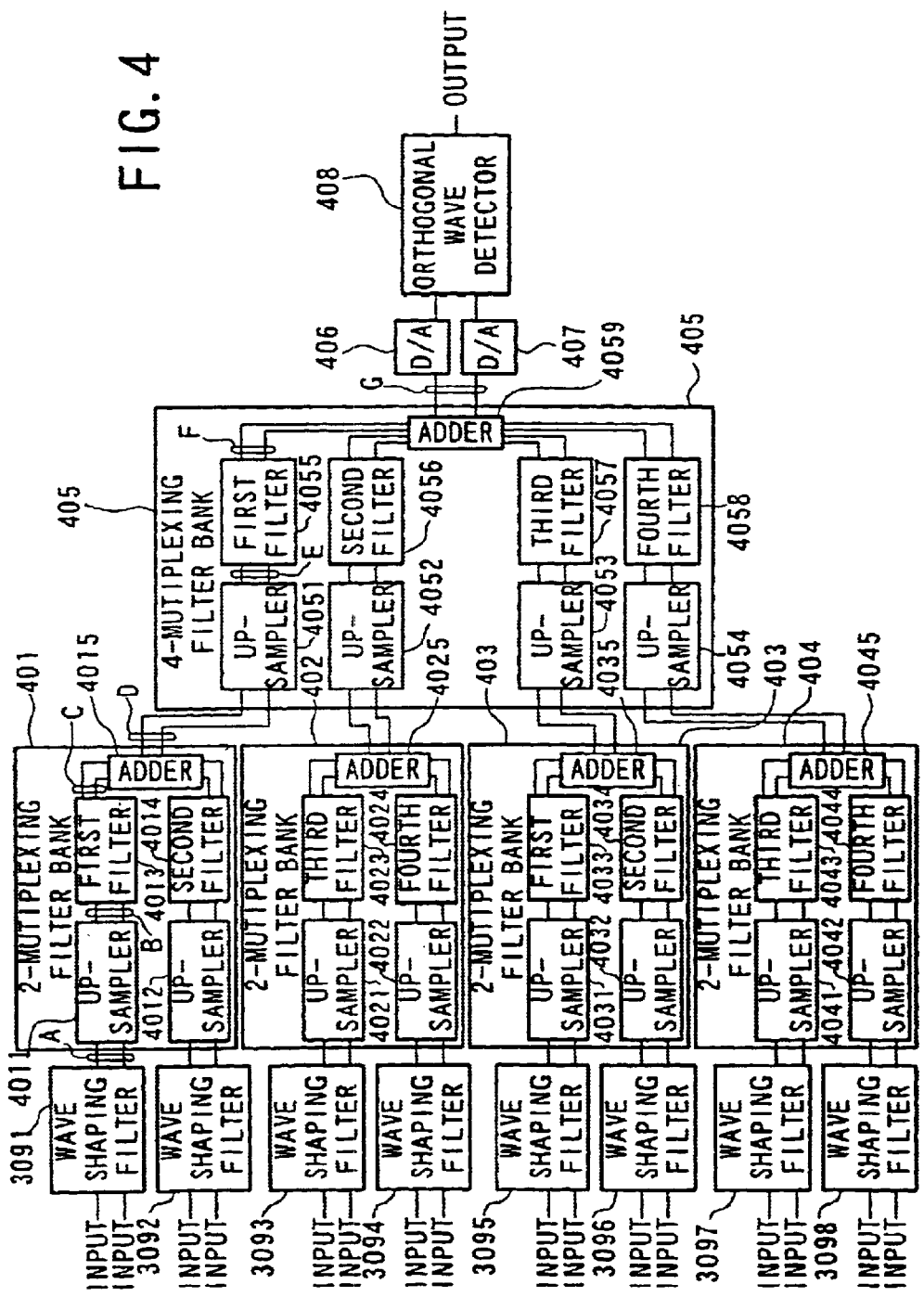
FIG. 4 is a block diagram of an example of the structure of digital signal demultiplexer in Embodiment 1-4.

The multiplexer in Embodiment 1-4 is shown in FIG. 4.

The frequency response characteristics are shown in FIG. 5 for the first, second, third and fourth filters, and the source filter has seven taps and their tap coefficients are shown in Tables 2~5 inclusively.

The multiplexer includes: 4-multiplexing filter banks 401~404 inclusively; up-samplers 4011, 4012, 4021, 4022, 4031, 4032, 4041, 4042, 4051, 4052, 4053, 4054; and first filters 4013, 4033, 4053.

The device also includes: second filter banks 4014, 4034, 4056; third filters 4023, 4043, 4057; fourth filters 4024, 4044, 4058; adders 4015, 4025, 4035, 4045, 4059; D/A converters 406. 407; orthogonal modulator 408; and wave shaping filters 3091~309 inclusively.

Eight different groups of sending signals input in the digital signal multiplexer are input in the wave shaping filters 3091~3098 respectively. Every two groups of signals output from the wave shaping filters are combined, and each grouping is input in the 2-multiplexing filter banks 401, 402, 403, 404.

Signals are input in the serially-connected up-samplers 4011 and 4012 in the 2-multiplexing filter bank 401, and are subjected to ×2 up-sampling at the timing shown in FIG. 12. Output signals from the up-samplers 4011, 4012 are input in the first filter 4013 and second filter 4014 to limit the bandwidth.

Output signals from the first filter 4013 and second filter 4014 are added in the complex adder 4015 and added. Similarly, output signals are input in the up-samplers 4021 and 4022 in the 2-multiplexing filter bank 402 and are subjected to ×2 up-sampling at the timing shown in FIG. 12.

Output signals from the up-samplers 4021, 4022 are input in the third filter 4023, fourth filter 4024 to limit the bandwidth. Output signals from the third filter 4023 and the fourth filter 4024 are input in the complex adder 4025 and added. Similarly, signals are input in the up-samplers 4041, 4042 in the 2-multiplexing filter bank 404, and are subjected to ×2 up-sampling at the timing shown in FIG. 12.

Output signals from the up-samplers 4031, 4032 are input in the first filter 4033, second filter 4034 to limit the bandwidth. Output signals from the first filter 4033 and the second filter 3034 are input in the complex adder 4035 and added. Similarly, signals are input in the up-samplers 4041, 4042 in the 2-multiplexing filter bank 403, and are subjected to ×2 up-sampling at the timing shown in FIG. 12.

Output signals from the up-samplers 4041, 4042 are input in the third filter 4043, fourth filter 4044 to limit the bandwidth. Output signals from the third filter 4043 and output signals from the fourth filter 4044 are input in the complex adder 4045 and added. Signals from the 2-multiplexing filter banks 401, 402, 403, 404 are input in the 4-demultiplexing filter bank 405.

Signals are input in the serially-connected up-samplers 4051, 4052, 4053, 4054 in the 4-multiplexing filter bank 405, and are subjected to ×2 up-sampling at the timing shown in FIG. 12. Output signals from the up-samplers 4051~4054 are input in the first filter 4055, second filter 4056, third filter 4057, fourth filter 4058 to limit the bandwidth.

Output signals from the first, second, third and fourth filters 4055, 4056, 4057, 4058 are input in the complex adder 4059 and added. Output signals from the 4-multiplexing filter bank 405 are input in the D/A converters 406, 407 and converted to analogue signals and are input in the orthogonal modulator 408 to be transmitted.

Figure 17:
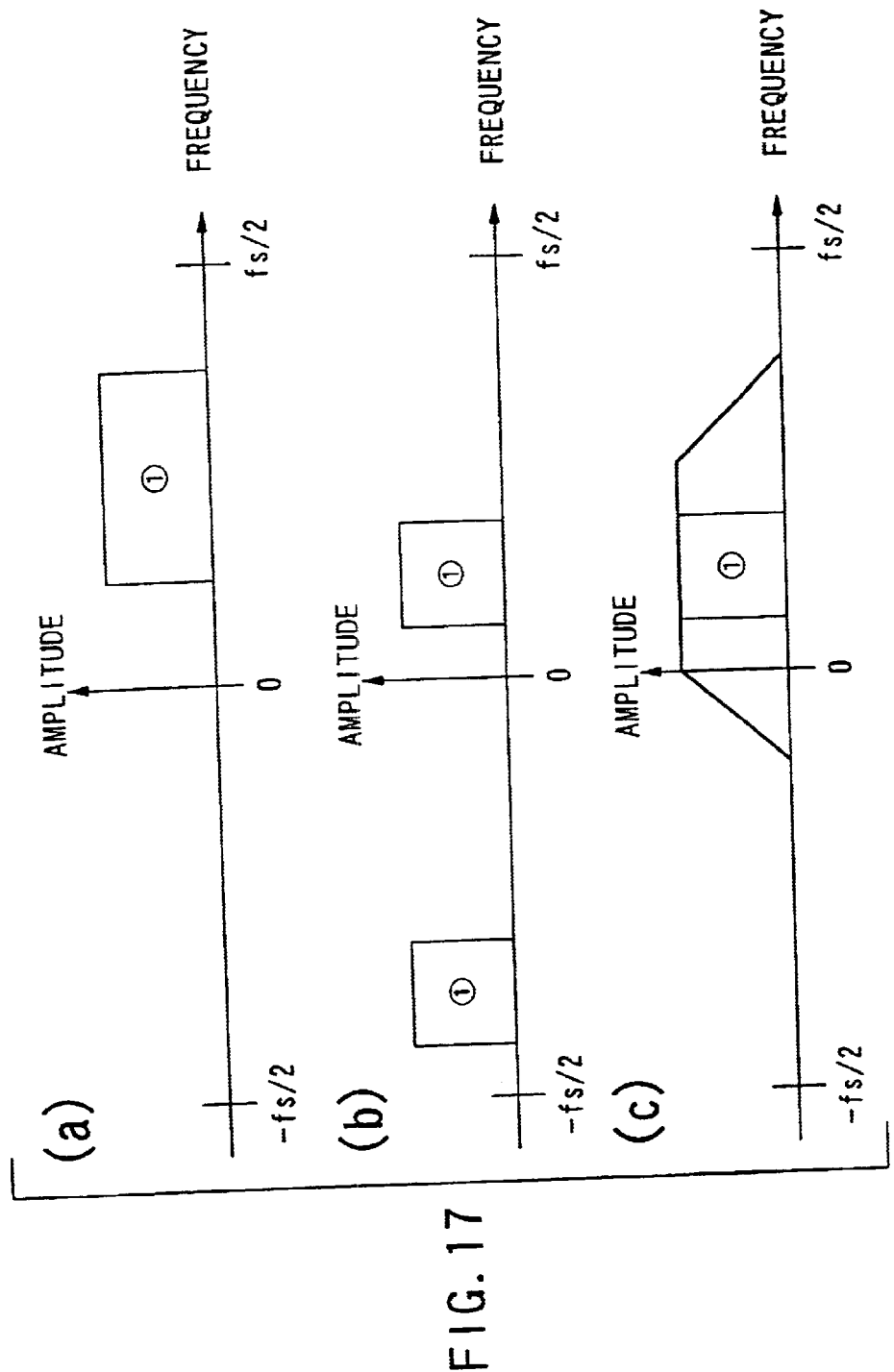
FIG. 17 illustrates part 1 of a series of signal spectra in the various stages shown in FIG. 4.
Figure 18:
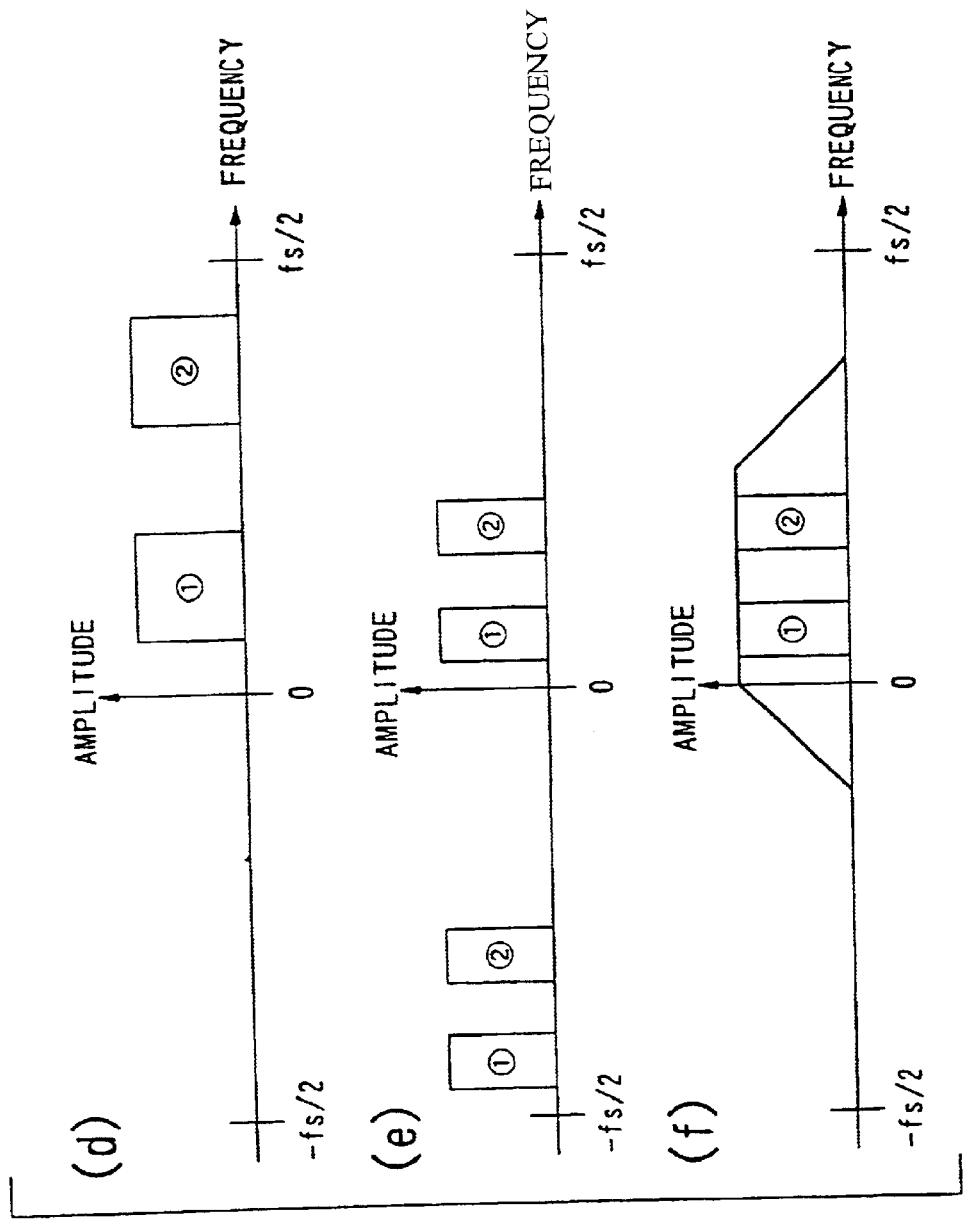
FIG. 18 illustrates part 2 of a series of signal spectra in the various stages shown in FIG. 4.
Figure 19:
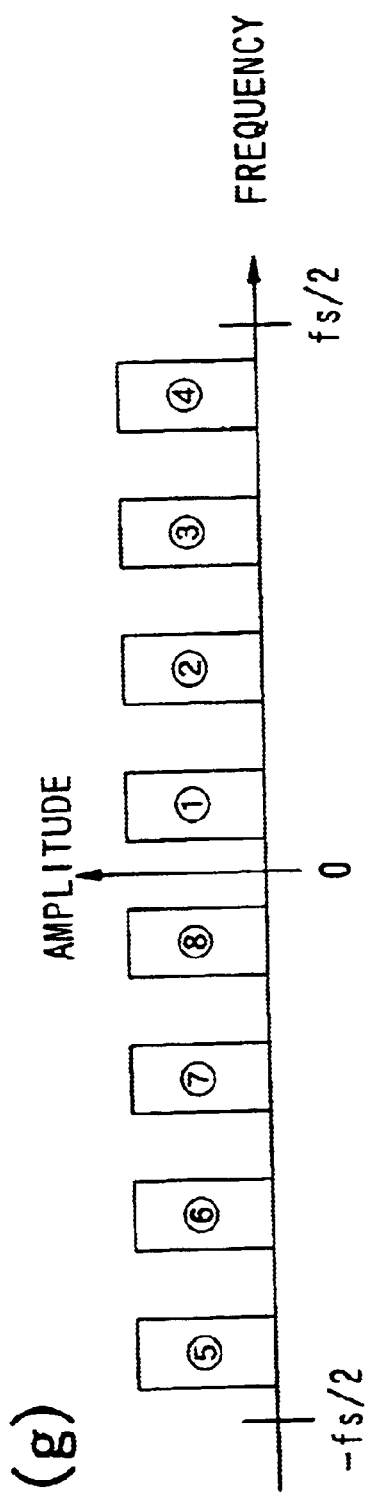
FIG. 19 illustrates part 3 of a series of signal spectra in the various stages shown in FIG. 4.
Figure 25:
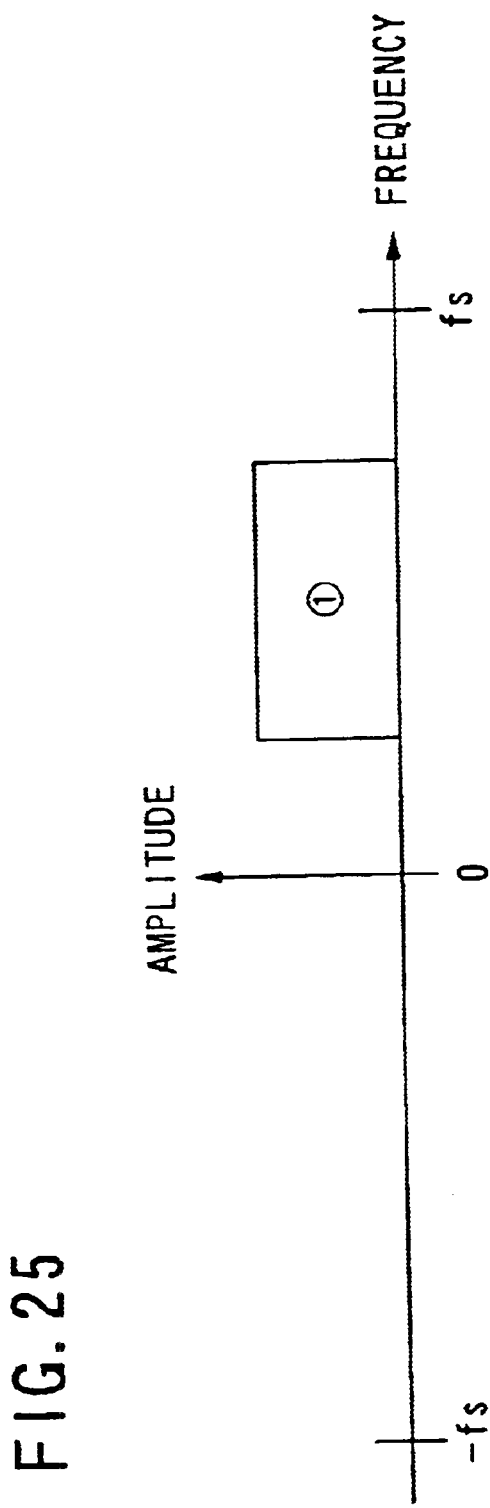
FIG. 25 is an example of input signal.
Figure 26:
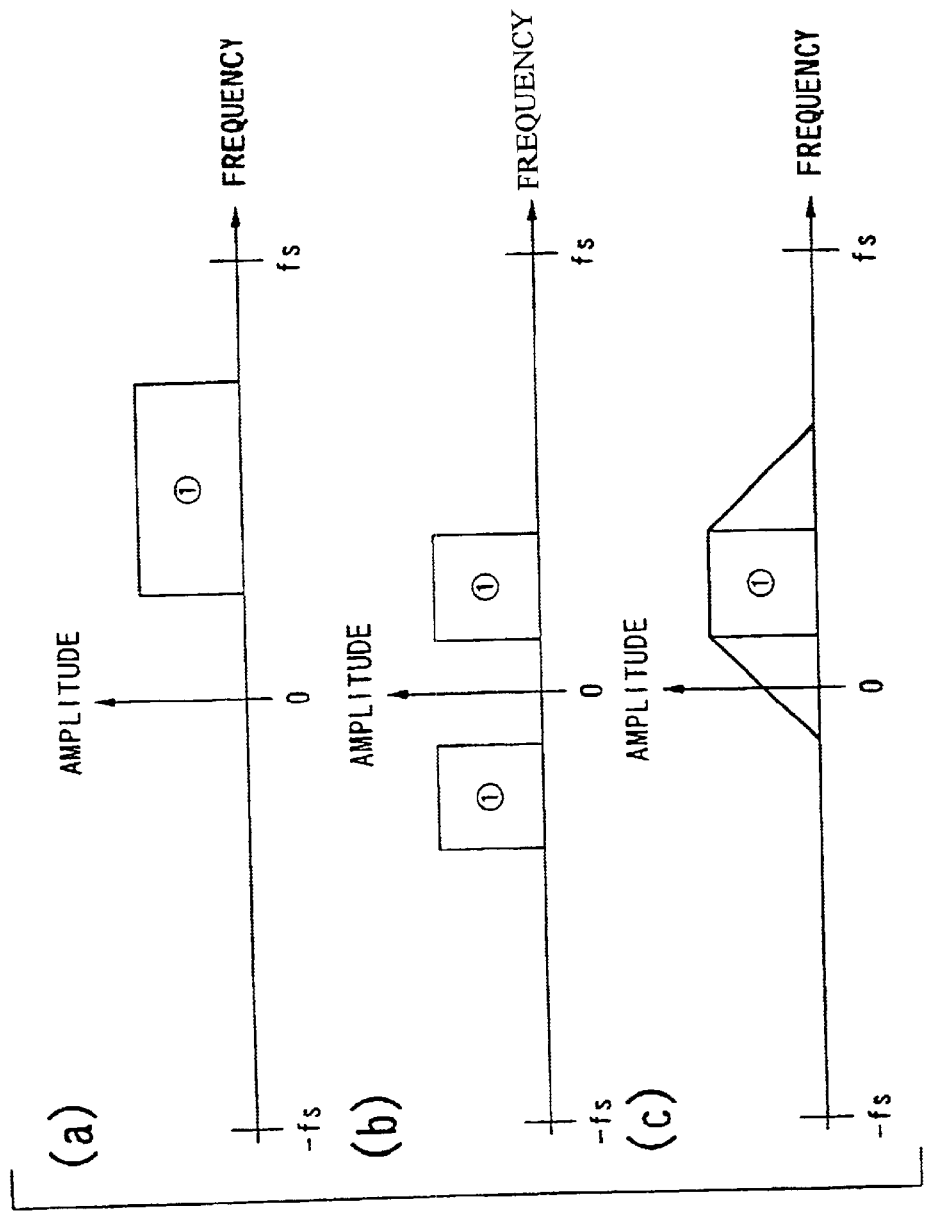
FIG. 26 is an illustration of part 1 of a series of signal spectra in the various stages shown in FIG. 21.
Figure 29:
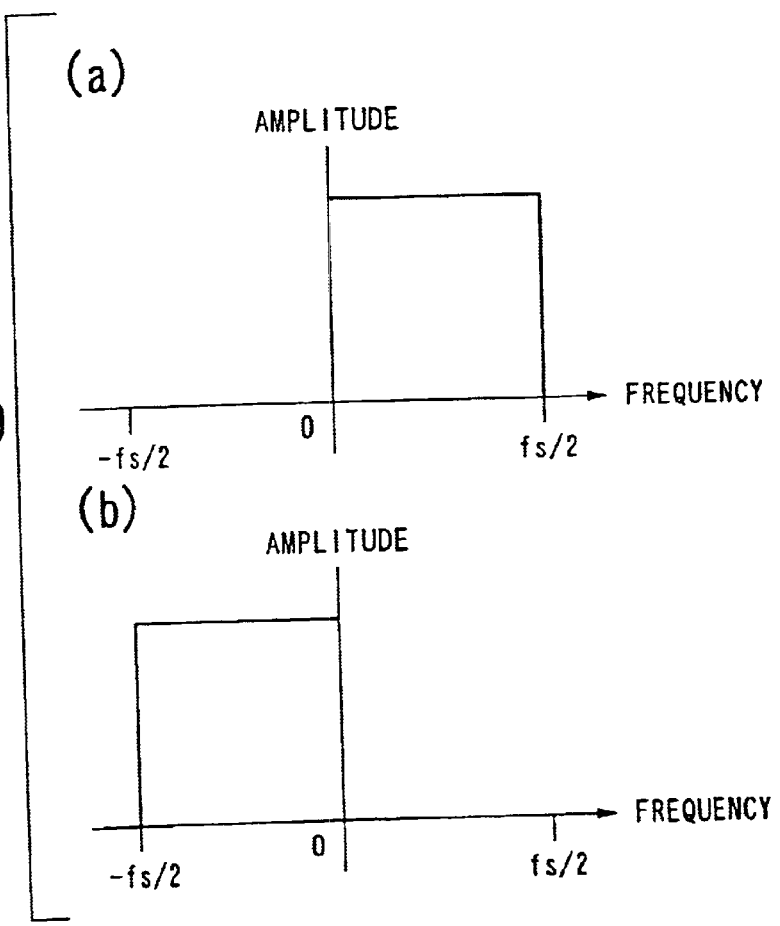
FIG. 29 is an illustration of ideal square waves.
Figure 30:
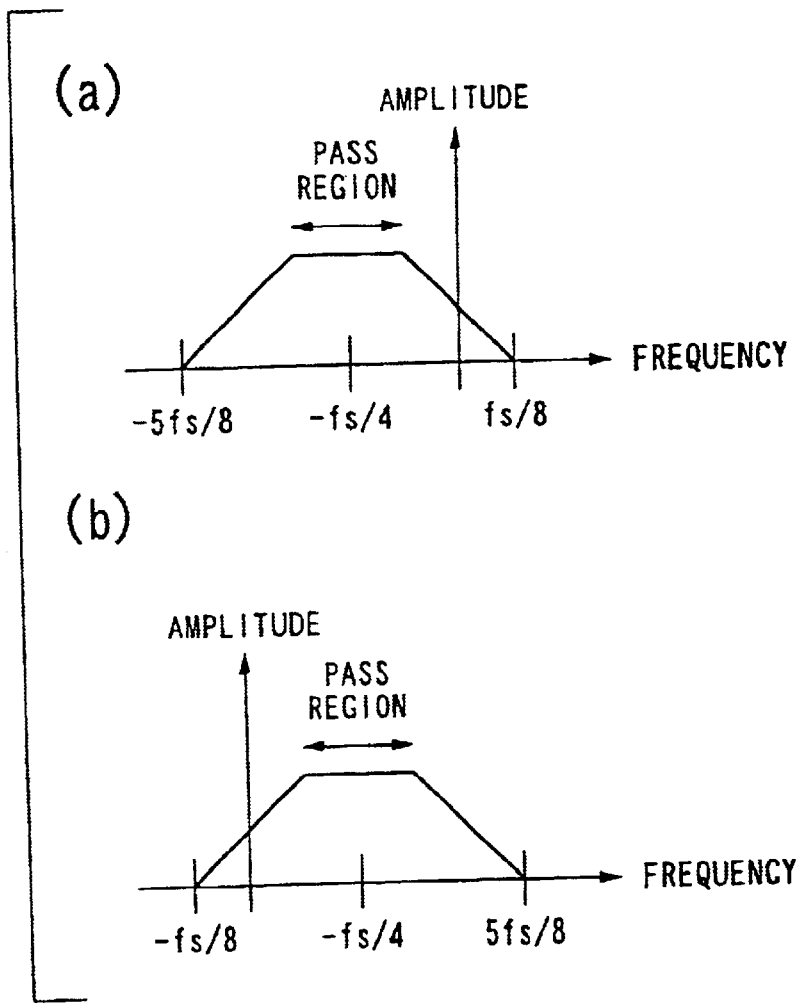
FIG. 30 is an illustration of the performance characteristics of a conventional high pass filter and a low pass filter.

Signal spectra at the points A, B, C, D, E, F, G of the signals process through the components 4011, 4013, 4015, 4051, 4054, 4059 indicated in FIG. 4 are shown, respectively, in parts the (a)~(g) in FIGS. 17~19.

In the examples presented in Embodiments 1-1 to 1-4, eight carrier waves for processing the signals are provided, but by altering the number of stages of serially-connected 2-demultiplexing filter banks, any number of carrier waves can be introduced.

In the examples presented in Embodiments 1-1 to 1-4, each 2-demultiplexing filter bank and 2-multiplexing filter bank are provided with two filters, but a system may constructed so that all or part of the devices may contain only one filter.

Here, when each 2-demultiplexing filter bank or 2-multiplexing filter bank contains only one filter, it means that a part of the carrier wave is not used so that a filter and sampler for that carrier wave is not included.

Therefore, when considering only the filter function, 2-demultiplexing filter bank in the digital signal demultiplexer will be one in which:

2-demultiplexing filter bank contains first and second filters, 2-demultiplexing filter bank contains only first filter, 2-demultiplexing filter bank contains only second filter 2-demultiplexing filter bank contains third and fourth filters, 2-demultiplexing filter bank contains only third filter, or 2-demultiplexing filter bank contains only fourth filter.

Also, each 2-demultiplexing filter bank will be connected so that, as can be seen from FIGS. 1 and 2, a 2-demultiplexing filter bank in the next-stage for processing the signals output from the first filter will be a 2-demultiplexing filter bank containing at least one of either the first or second filter.

Similarly, a 2-demultiplexing filter bank in the next-stage for processing the signals output from the second filter will be a 2-demultiplexing filter bank containing at least one of either the third or fourth filter. And, a 2-demultiplexing filter bank in the next-stage for processing the signals output from the third filter will be a 2-demultiplexing filter bank containing at least one of either the first or second filter. And, a 2-demultiplexing filter bank in the next-stage for processing the signals output from the fourth filter will be a 2-demultiplexing filter bank containing at least one of either the third or fourth filter.

Similarly, when considering only the filter function, 2-multiplexing filter bank in the digital signal multiplexer will be one in which:

2-multiplexing filter bank contains first and second filters, 2-multiplexing filter bank contains only first filter, 2-multiplexing filter bank contains only second filter 2-multiplexing filter bank contains third and fourth filters, 2-multiplexing filter bank contains only third filter, or 2-multiplexing filter bank contains only fourth filter.

When considering the connection of the 2-multiplexing filter bank, it can be seen from FIGS. 3 and 4 that connections should be made such that output signals from a 2-multiplexing filter bank having at least one of first or second filters are input in a 2-multiplexing filter bank that has first or third filter. And, connections should be made such that output signals from a 2-multiplexing filter bank having at least one of third or fourth filters are input in a 2-multiplexing filter bank that has second or fourth filter.

Also, when it is required to frequency multiplex signals (i.e. data) with different speeds using the digital multiplexing devices presented in Embodiments 1-1 to 1-4, configuration of the serial connection of the 2-multiplexing filter bank can be modified to meet the requirements.

Figure 54:
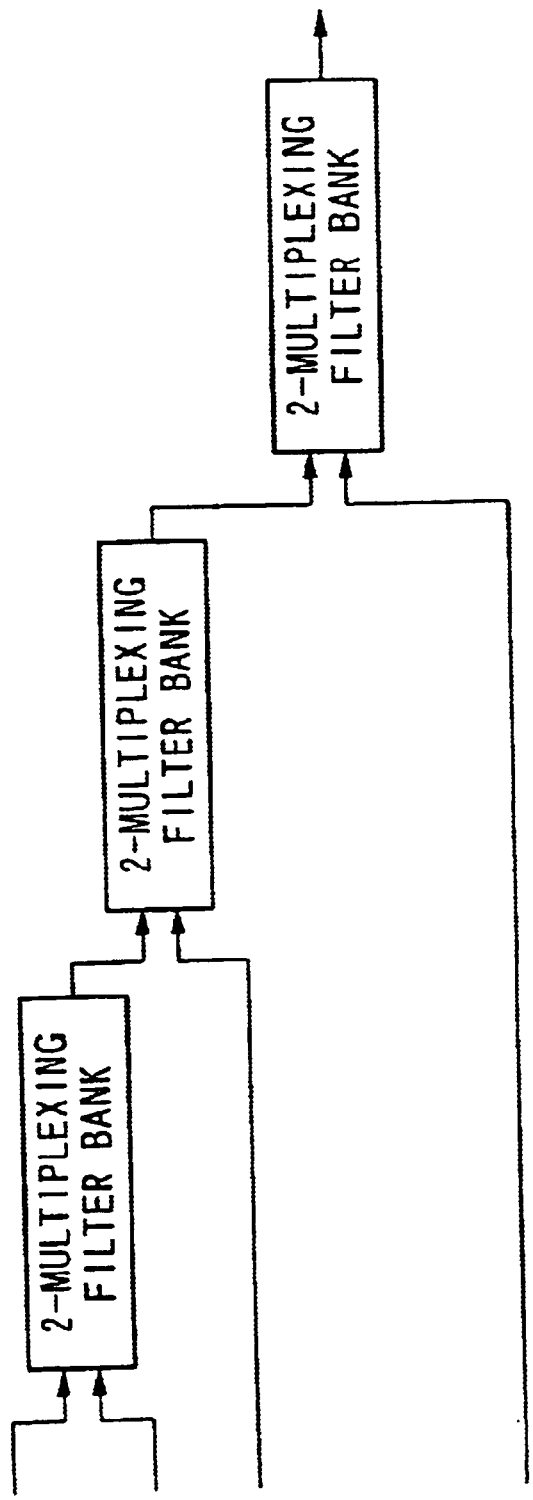
FIG. 54 an illustration of an example of serial connection of 2-multiplexing filter banks.

For example, when it is required to multiplex four signals consisting of two groups of signals of speed $\alpha$, one signal of speed $2\alpha$, one signal of speed $4\alpha$, circuit connection should be made as shown in FIG. 54.

Figure 55:
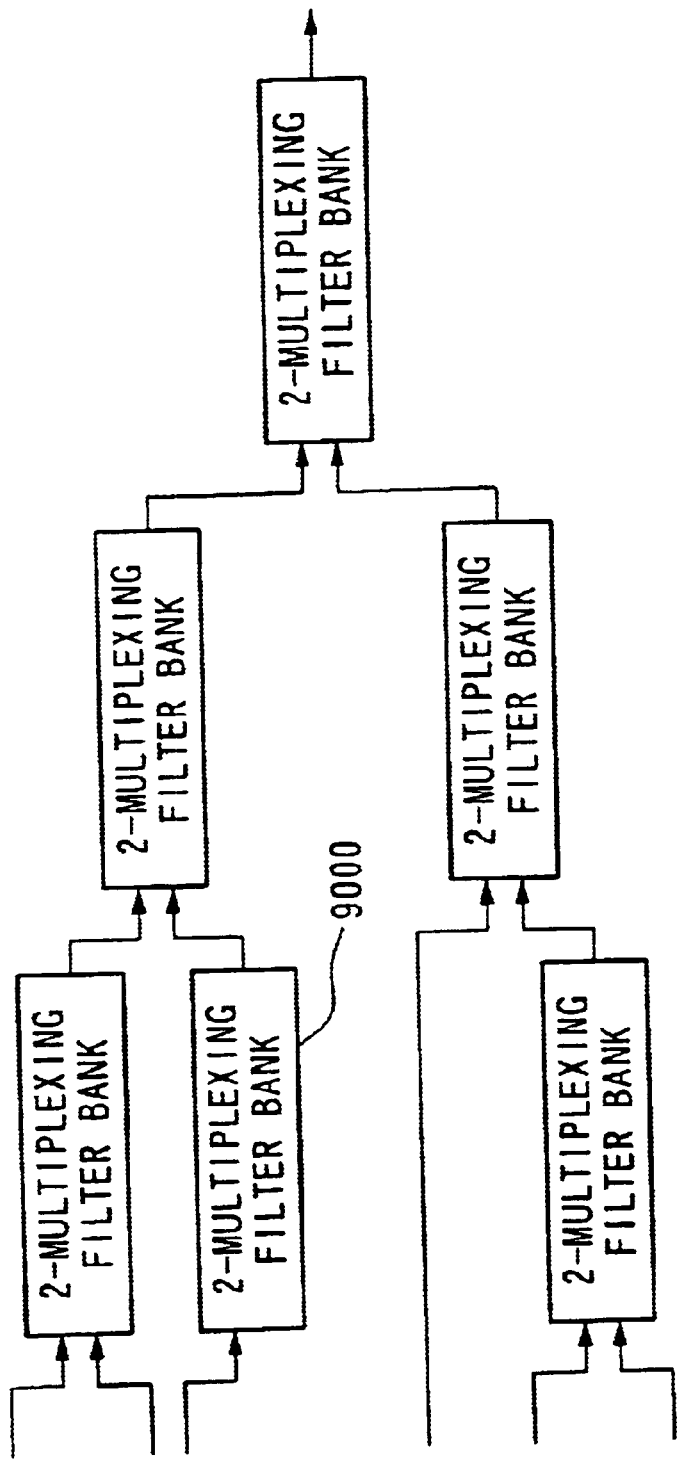
FIG. 55 an illustration of an example of serial connection of 2-multiplexing filter banks.

When it is required to multiplex six signals consisting of five signals of speed α, one signal of speed 2α, circuit connection should be made as shown in FIG. 55. In FIG. 55, 2-demultiplexing filter bank 9000 may contain one each of filter and down-sampler.

Figure 57:
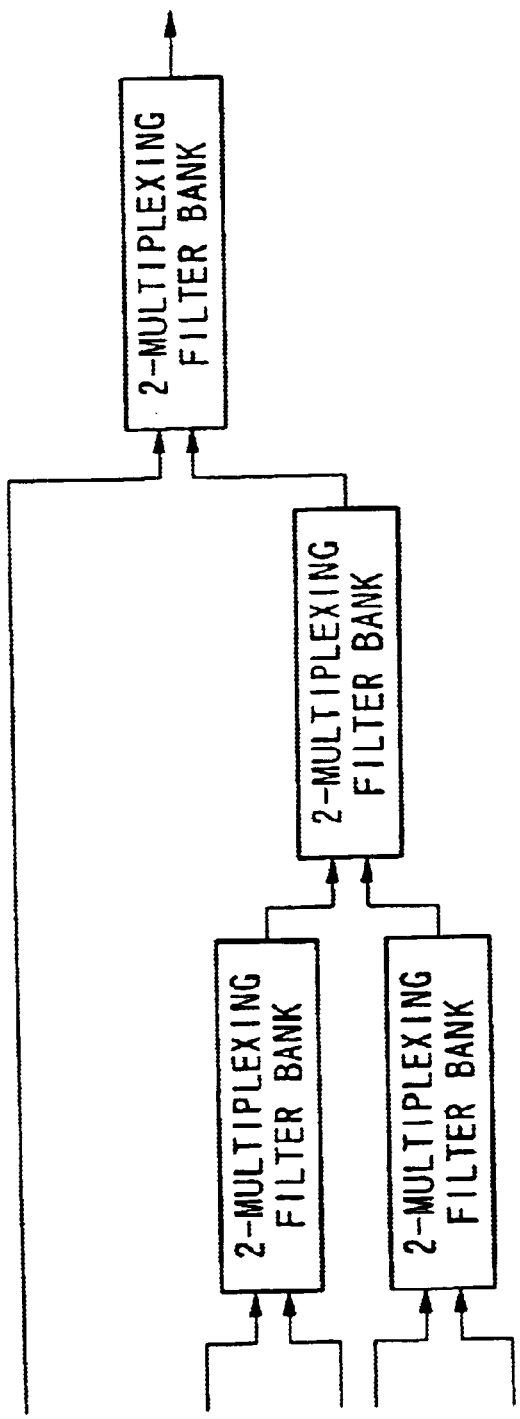
FIG. 57 is an illustration of an example of serial connection of 2-multiplexing filter banks.
Figure 58:
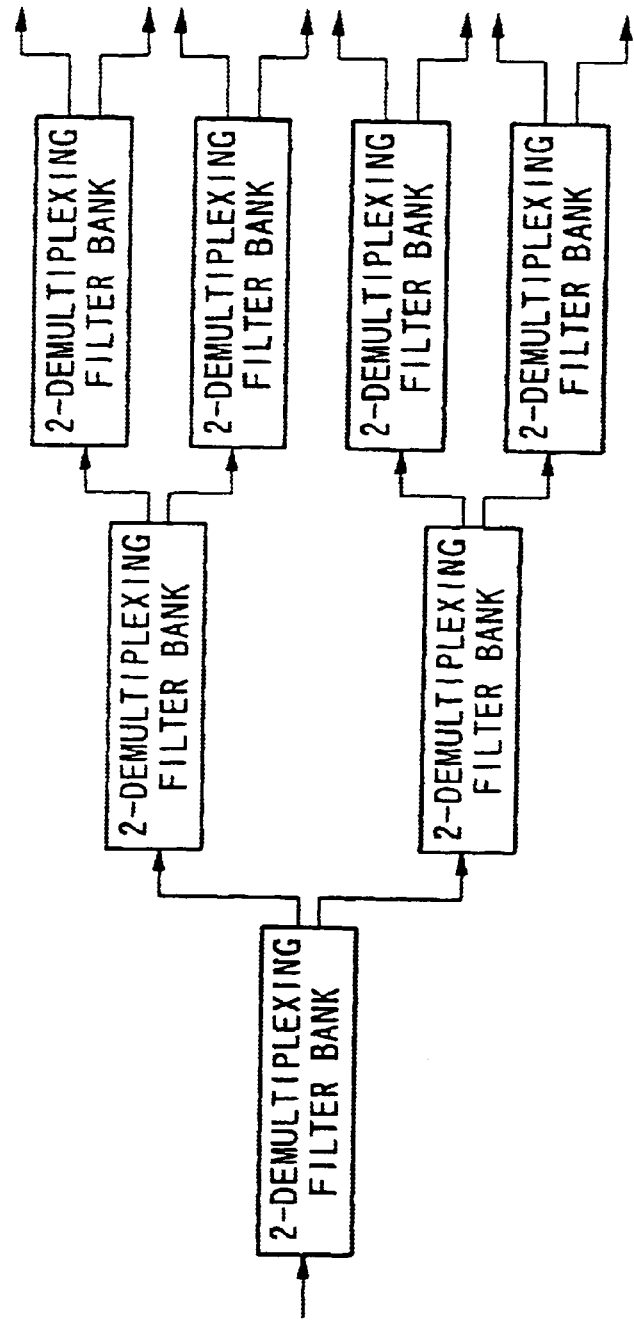
FIG. 58 is an illustration of an example of serial connection of 2-demultiplexing filter banks.

Similarly, depending on the speed and the number of target signal to be multiplexed, circuits such as those shown in FIGS. 66, 57 may be constructed to enable to multiplex signals of different transmission speeds.

Even when target signals are multiplexed with signals of different speeds in the digital signal demultiplexers shown in Embodiments 1-1 to 1-2, the serial connection of the 2-demultiplexing filter banks may be modified so that different signal speeds and bandwidths can be accommodated.

Figure 59:
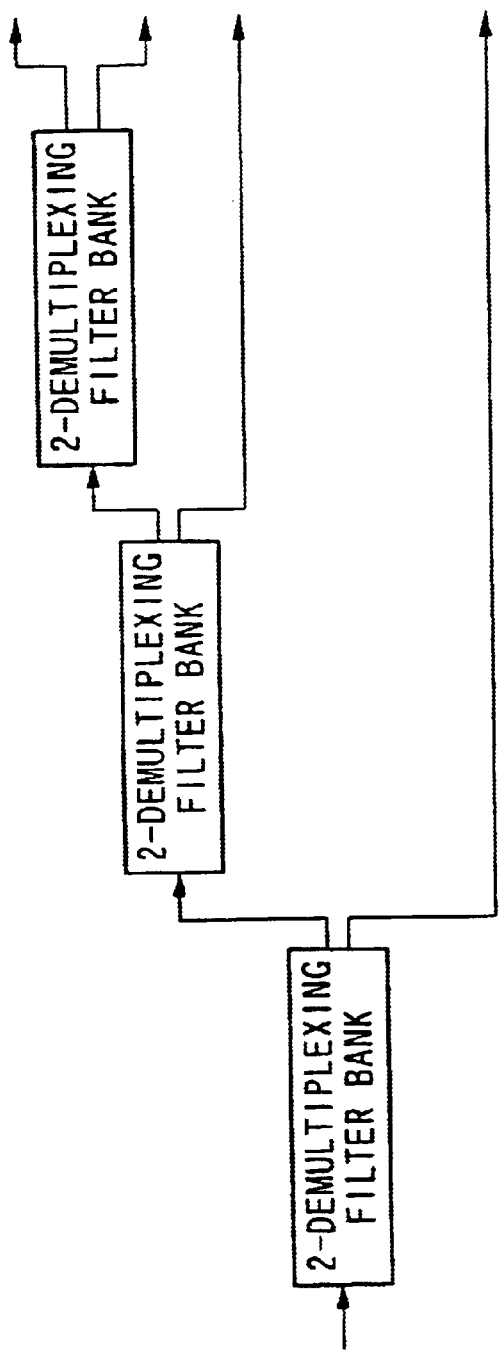
FIG. 59 is an illustration of an example of serial connection of 2-demultiplexing filter banks.

For example, when demultiplexing the signals output from the multiplexer having the serial connection configuration shown in FIG. 54, the filter bank connections may be modified to that shown in FIG. 59 to meet the requirement.

Figure 56:
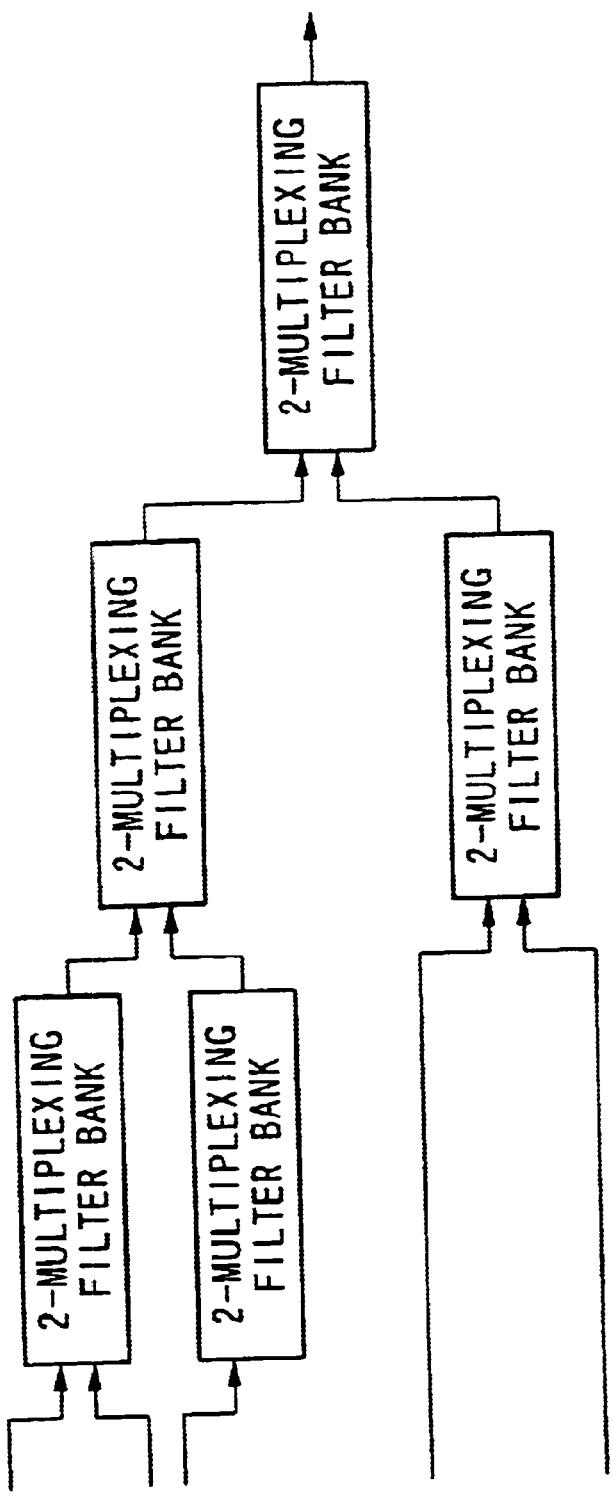
FIG. 56 an illustration of an example of serial connection of 2-multiplexing filter banks.
Figure 60:
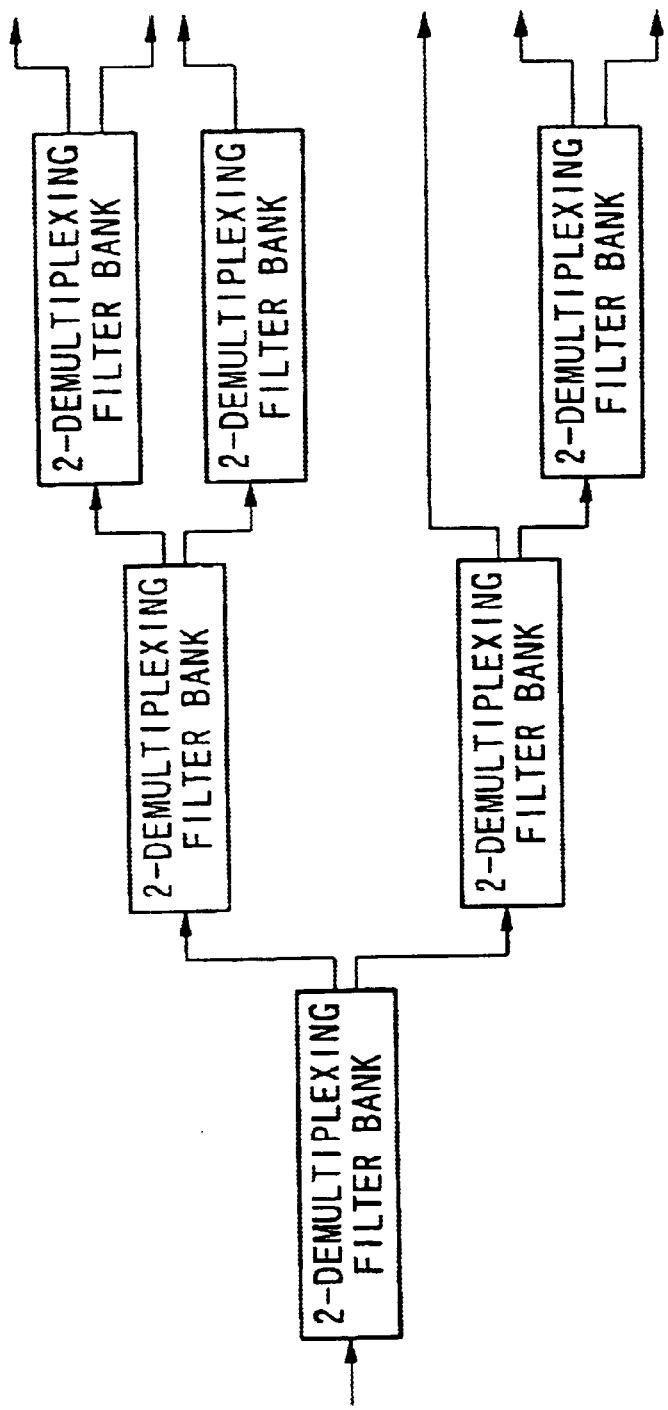
FIG. 60 is an illustration of an example of serial connection of 2-demultiplexing filter banks.
Figure 61:
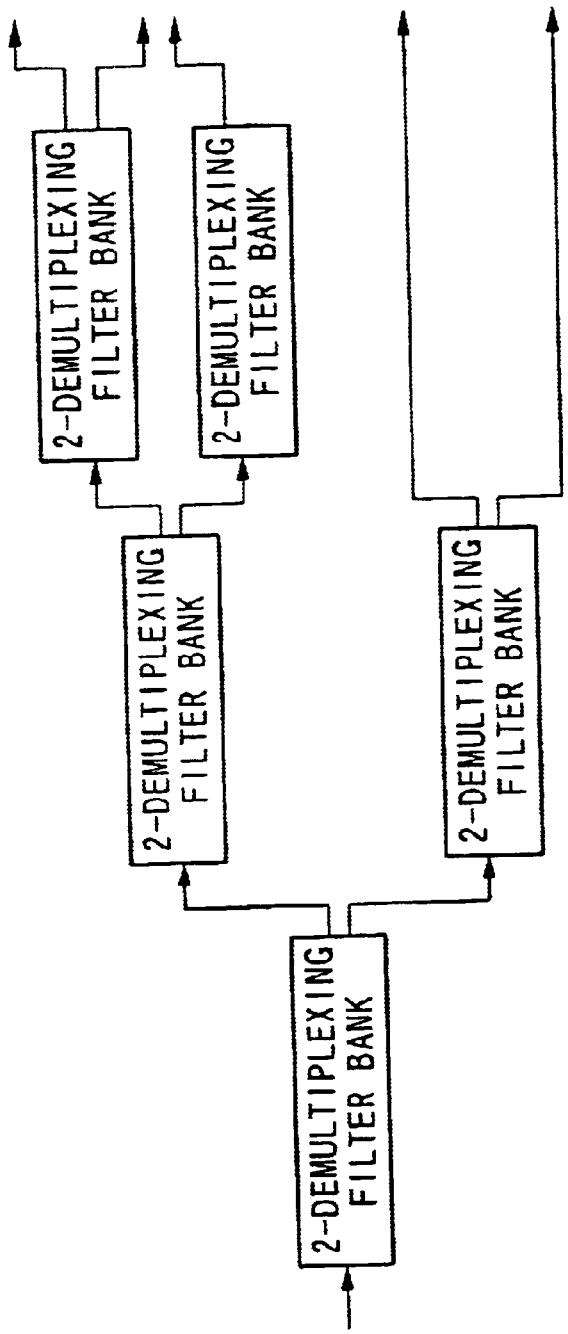
FIG. 61 is an illustration of an example of serial connection of 2-demultiplexing filter banks.
Figure 62:
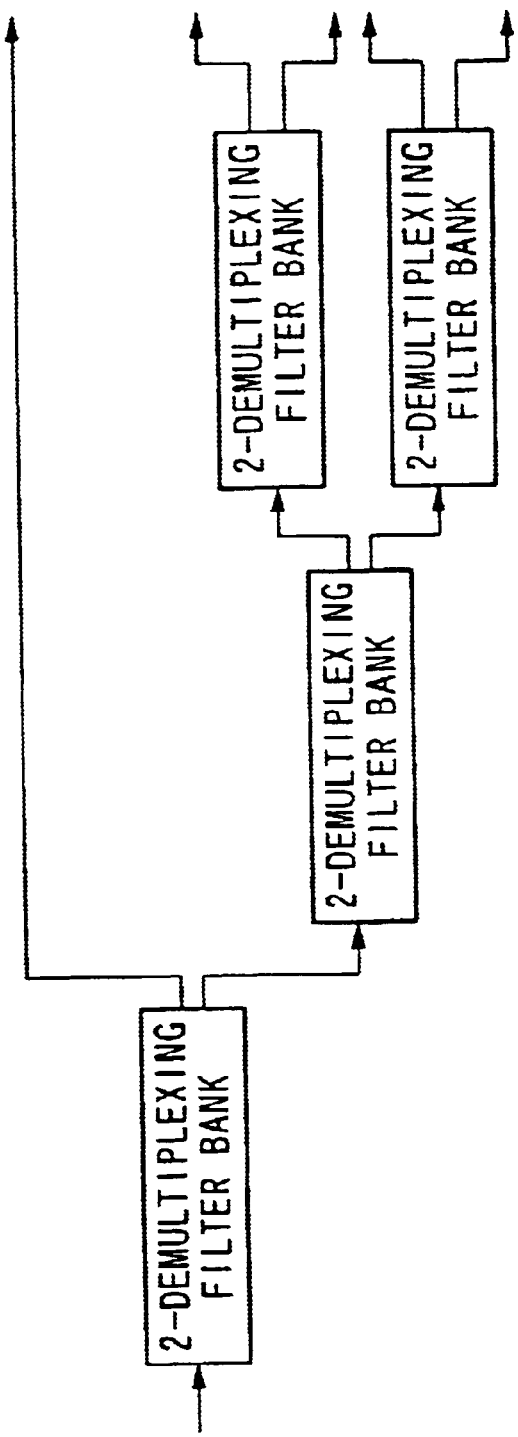
FIG. 62 is an illustration of an example of serial connection of 2-demultiplexing filter banks.

Similarly, when demultiplexing the signals output from the multiplexers having the serial connection configuration shown in FIGS. 55~57, the filter bank connections may be modified to those shown in FIG. 60~62 to meet the requirement.

In the multiplexers shown in Embodiment 1-2, the first-stage filter bank contains all of the first to fourth filters. However, it is not necessary to limit to this configuration, so that, depending on the number and operational band of the signals to be frequency multiplexed, the first-stage filter bank may contain at least one of the first to fourth filters.

Similarly, in the multiplexers shown in Embodiment 1-4, the last-stage filter bank contains all of the first to fourth filters. However, it is not necessary to limit to this configuration, so that, depending on the number and operational band of the signals to be frequency multiplexed, the last-stage filter bank may contain at least one of the first to fourth filters.

Embodiment 2-1

Figure 31:
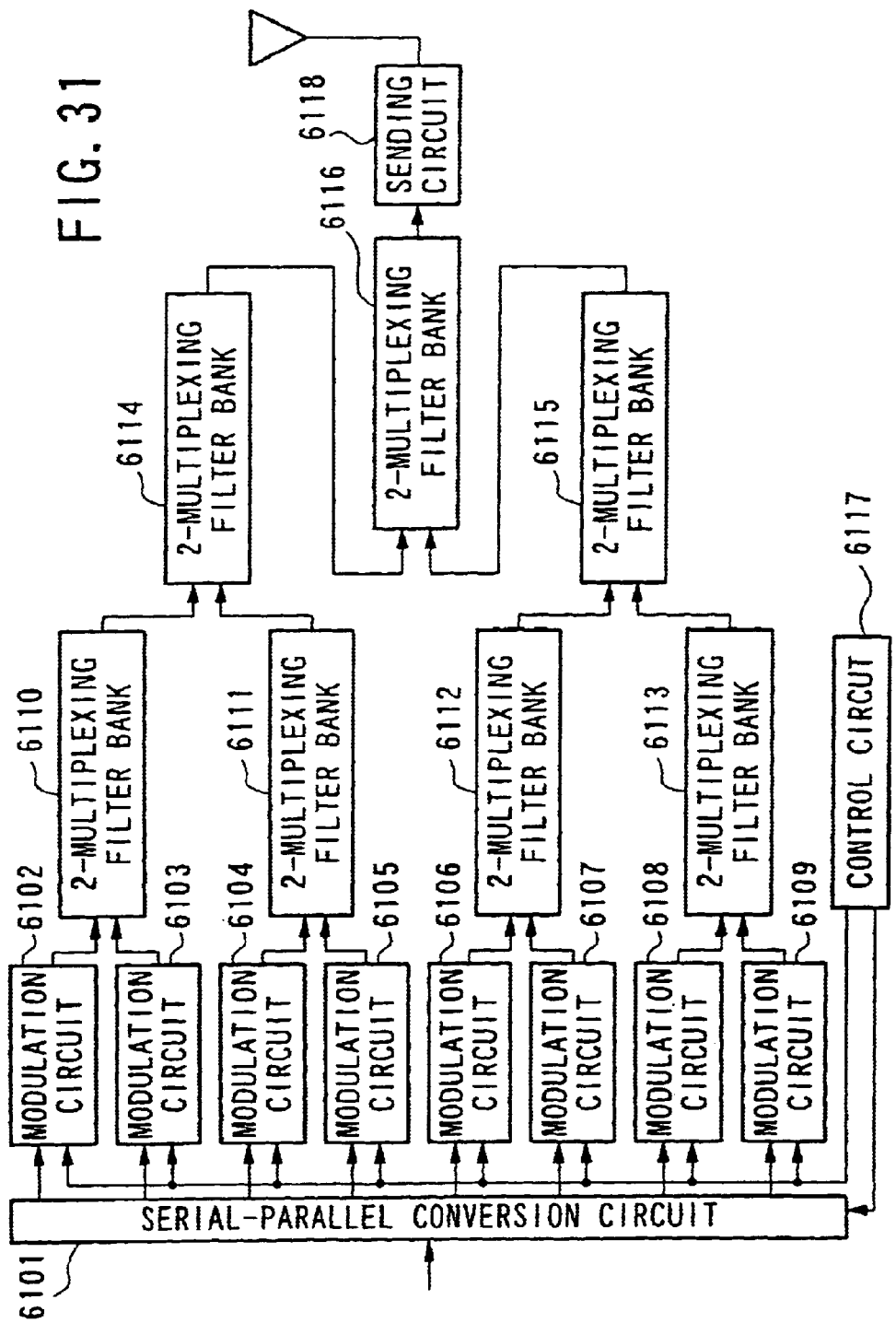
FIG. 31 is a block diagram of a signal transmitter in Embodiment 1-1.
Figure 32:
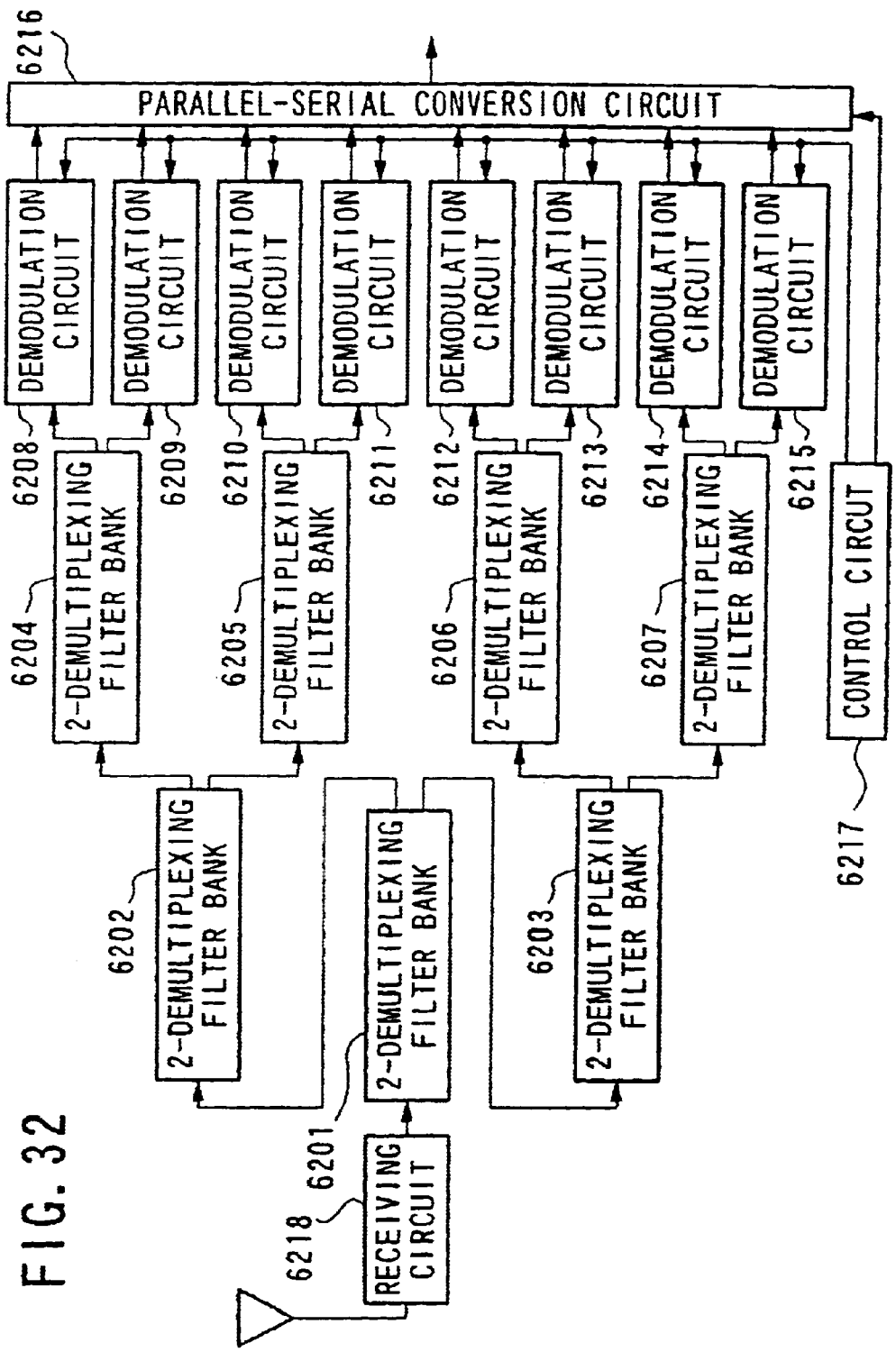
FIG. 32 is a block diagram of a signal receiver in Embodiment 2-1.

The digital modem in Embodiment 2-1 are shown in FIGS. 31 and 32.

FIG. 31 is a block diagram of the sending section of the digital modem, and FIG. 32 is a block diagram of the receiving section of the digital modem.

The modem is comprised by at least one transmitter and one receiver. The modem shown in FIGS. 31, 32 is an example of eight groups of carrier waves. The device shown in FIG. 31 is comprised by: series-parallel conversion circuit 610; modulation circuits 6102~6109; 2-multiplexing filter banks 6110~6116; control circuit 6117; sending circuit 6118.

Here, the control circuit 6117 converts input signals (data) to eight low-speed signals (data), and controls allocation of each low-speed signal to various modulation circuits as well as its output timing. Also the control circuit 6117 controls the start/stop operations of each of the modulation circuits 60102~6215. Here, "low-speed" relates to output signals, in the case of a digital modem, from either series-parallel conversion circuit or time-division modulation circuit, and, in the case of a digital signal receiver, relates to input signals to be input to either serial-parallel conversion circuit or time-division modulation circuit.

Figure 38:
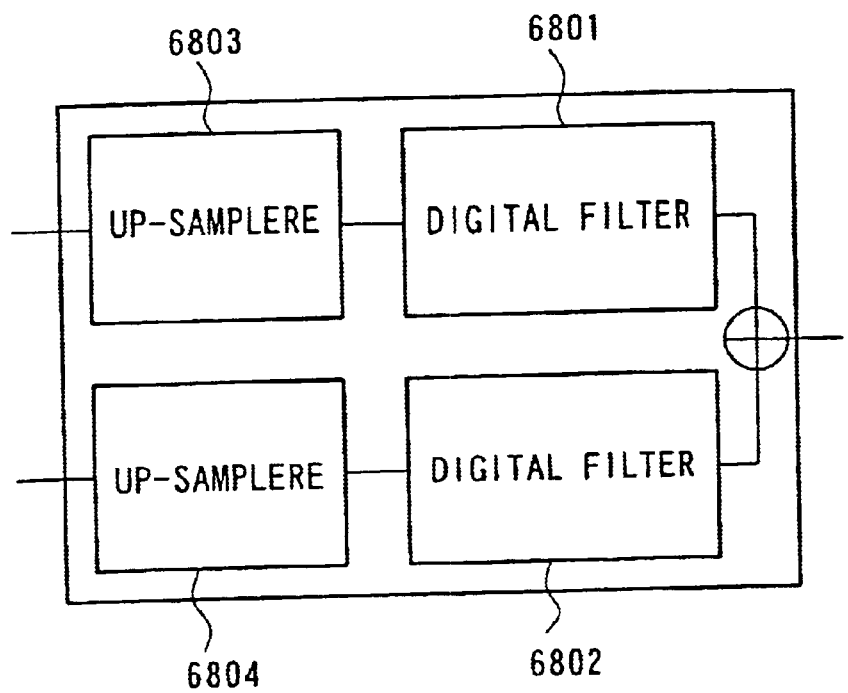
FIG. 38 is an example of the structure of 2-demultiplexing filter banks.
Figure 47:
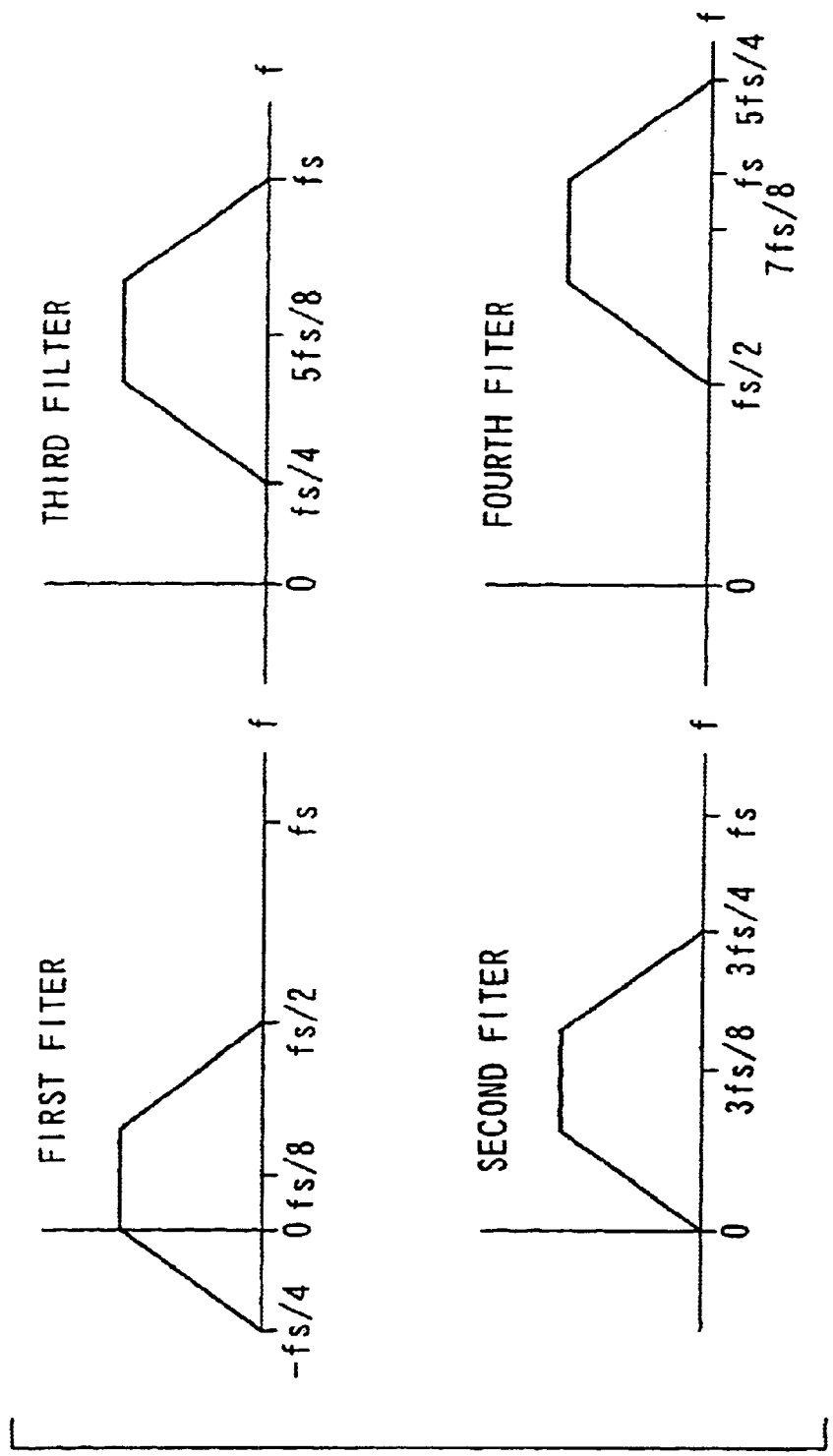
FIG. 47 is an illustration of a series of performance curves of filters.

The structure of the 2-multiplexing filter bank is shown in FIG. 38. The structure includes: digital filters 6801, 6802; and up-samplers 6803, 6804. Digital filters 6801, 6802 are constructed by filters having different pass-bands, and the properties of the filters are shown in FIG. 47. The structures of filter bank and filters are the same as those in Embodiments 1-1~1-4, or those reported in a reference by, H. Tanabe, "Seamless Multirate Filter Bank", Technical Report of IEICE, SAT99-14.

The properties shown in FIG. 47 are obtained at the sampling rate of filter banks in a frequency range of 0~fs. As can be seen in FIG. 47, the filters rank as first filter, second filter, third filter and fourth filter in the ascending order of frequencies.

Chronological input data are converted to parallel data in the serial-parallel conversion circuit 6101 to a maximum of eight groups. The speed of the parallel data is Fb and is equal for all the data. A maximum of eight groups of data output from the serial-parallel conversion circuit are input to be modulated in the operating modulation circuits 6102~6109 by selecting a maximum of eight modulation circuits, according to the control signals from the control circuit 6117.

Output signals from the modulation circuits 6102, 6103 are input in the 2-multiplexing filter bank 6110, so that each input signal is up-sampled and band-limited in each filter of different pass-bands, and are multiplexed in the multiplexer. Output signals from the modulation circuits 6104, 6105 are input in the 2-multiplexing filter bank 6111, so that each input signal is up-sampled and band-limited in each filter of different pass-bands, and are multiplexed in the multiplexer.

Output signals from the modulation circuits 6106, 6107 are input in the 2-multiplexing filter bank 6112, so that each input signal is up-sampled and band-limited in each filter of different pass-bands, and are multiplexed in the multiplexer. Output signals from the modulation circuits 6108, 6109 are input in the 2-multiplexing filter bank 6113, so that each input signal is up-sampled and band-limited in each filter of different pass-bands, and are multiplexed in the multiplexer.

Output signals from the 2-multiplexing filter banks 6110, 6111 are input in the 2-multiplexing filter bank 6114, so that each input signal is up-sampled and band-limited in each filter of different pass-bands, and are multiplexed in the multiplexer. Output signals from the 2-multiplexing filter banks 6112, 6113 are input in the 2-multiplexing filter bank 6115, so that each input signal is up-sampled and band-limited in each filter of different pass-bands, and are multiplexed in the multiplexer.

Output signals from the 2-multiplexing filter banks 6114, 6115 are input in the 2-multiplexing filter bank 6116, so that each input signal is up-sampled and band-limited in each filter of different pass-bands, and are multiplexed in the multiplexer.

Figure 39:
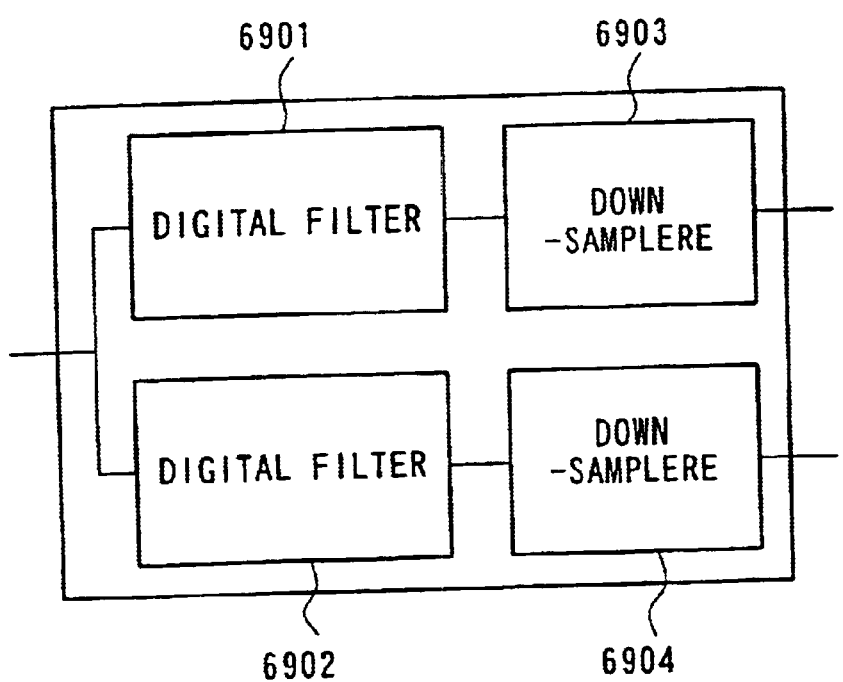
FIG. 39 is an example of the structure of 2-demultiplexing filter banks.
Figure 40:
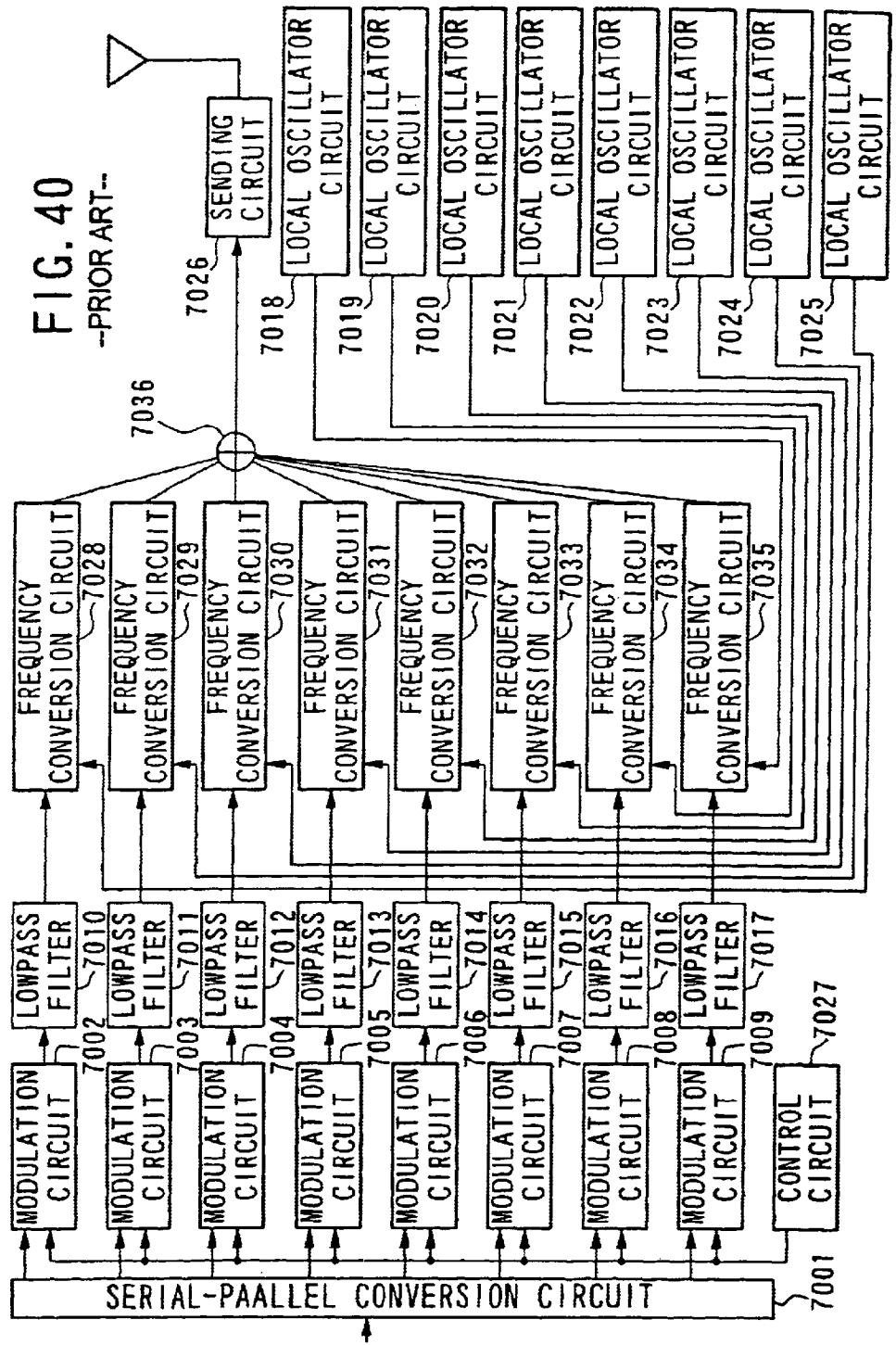
FIG. 40 is an example of the conventional signal transmitter.
Figure 41:
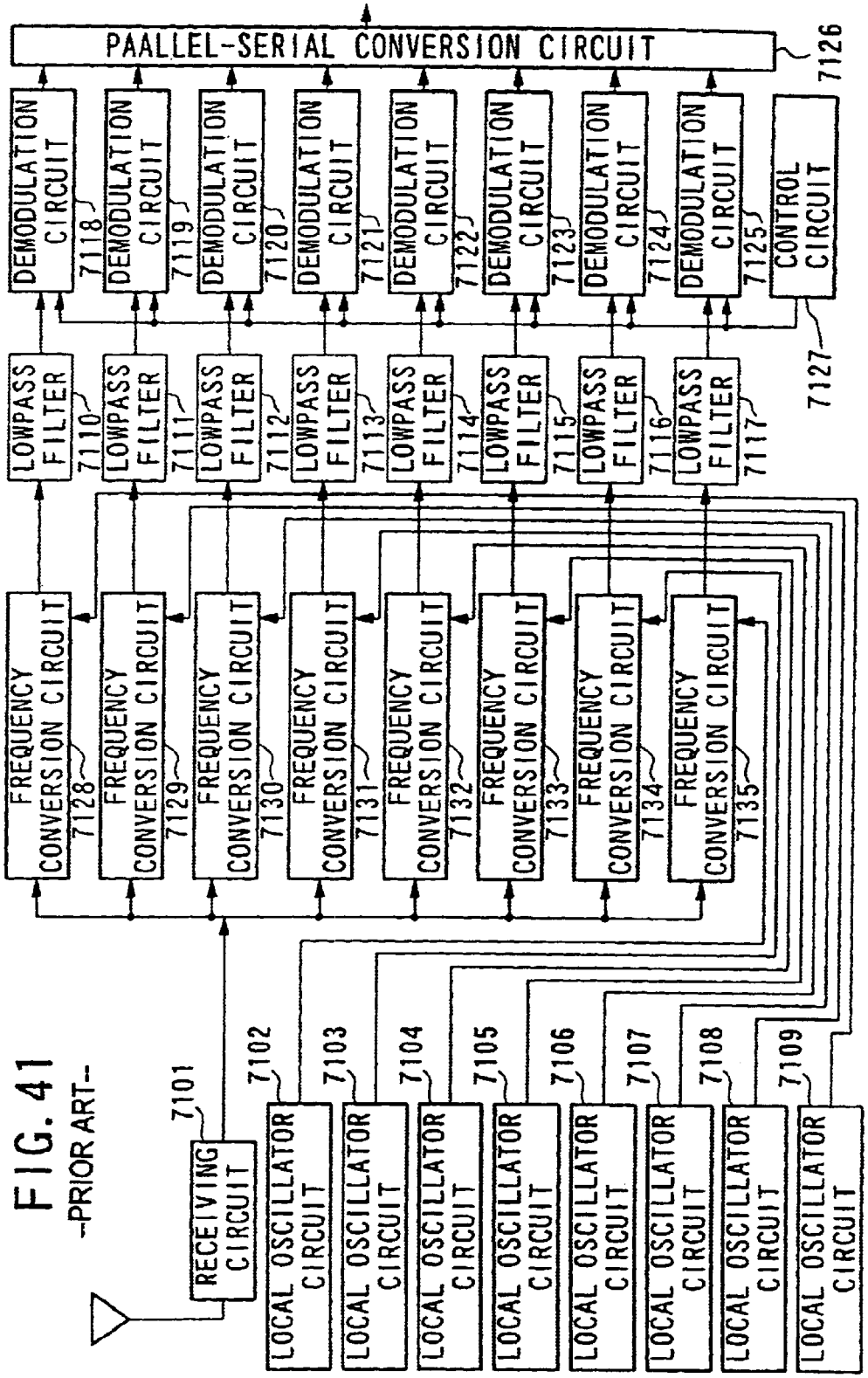
FIG. 41 is an example of the conventional signal receiver.

The operation of the receiver will be explained next with reference to FIG. 32. The device is comprised by: 2-demultiplexing filter banks 6201~6207; demodulation circuits 6208~6215; parallel-serial conversion circuit 6216; control circuit 6217; and receiving circuit 6218. A structure of a 2-demultiplexing filter bank is shown in FIG. 39. The structure includes: digital filters 6901, 6902, and down-samplers 6903, 6904.

Digital filters 6901, 6902 have different pass-bands, and the structures are the same as those in Embodiments 1-1~1-4, or those reported in a reference by, H. Tanabe, "Seamless Multirate Filter Bank", Technical Report of IEICE, SAT99-14.

In FIG. 32, signals received in the antennae are input in the receiving circuit 6218. Output signals from the receiving circuit 6218 are input in the 2-demultiplexing filter bank 6201.

Signals input in the 2-demultiplexing filter bank 6201 are split into two groups, and are band-limited in the filters having different pass-bands, and are down-sampled to be output. One group of output signals from the 2-demultiplexing filter bank 6201 are input in the 2-demultiplexing filter bank 6202, whose output signals are split into two groups, and the signals in each group are band limited in the filters having different pass-bands, down-sampled and output.

Other group of signal's output from the 2-demultiplexing filter bank 6201 are input in the 2-demultiplexing filter bank 6203. Signals input in the 2-demultiplexing filter bank 6203 are split into two groups and are down-sampled to be output. Other group of signals output from the 2-demultiplexing filter bank 6202 are input in the 2-demultiplexing filter bank 6204.

Signals input in the 2-demultiplexing filter bank 6204 are split into two groups, and are band-limited in the filters having different pass-bands, and are down-sampled to be output. Other group of output signals from the 2-demultiplexing filter bank 6202 are input in the 2-demultiplexing filter bank 6205, whose output signals are split into two groups, and the signals in each group are band limited in the filters having different pass-bands, down-sampled and output.

Other group of signals output from the 2-demultiplexing filter bank 6203 are input in the 2-demultiplexing filter bank 6206. Signals input in the 2-demultiplexing filter bank 6206 are split into two groups and are down-sampled to be output. Other group of signals output from the 2-demultiplexing filter bank 6203 are input in the 2-demultiplexing filter bank 6207.

Signals input in the 2-demultiplexing filter bank 6207 are split into two groups, and are band-limited in the filters having different pass-bands, and are down-sampled to be output. Other group of output signals from the 2-demultiplexing filter bank 6204 are input in the demodulation circuit 6208 and demodulated, the signals in the other group- are input in the demodulation circuit 6209 and demodulated. Output signals in one group from the 2-demultiplexing filter bank 6205 are input in the demodulation circuit 6210 and demodulated, and other signals are input in the demodulation circuit 6211 and demodulated.

One group of signals output from the 2-demultiplexing filter bank 6206 are input in the modulation circuit 6212 and demodulated, and other group of signals are input in the demodulation circuit 6213 are demodulated. One group of signals output from the 2-demultiplexing filter bank 6207 are input in the demodulation circuit 6214 and demodulated, and other signals are input in the demodulation circuit 6215 and demodulated. A maximum of eight groups of output signals can be output from the demodulation circuits 6208~6215 controlled by the control circuit 6217, and output signals therefrom are input in the parallel-serial conversion circuit 6216. Parallel data input in the parallel-serial conversion circuit 6216 to a maximum of eight groups are converted to serial data of one group and are output therefrom.

In the above operation, the control circuit 6217 controls start/stop operation of each of the demodulation circuits 6208~6215. Also, the control circuit 6217 controls conversion of eight slow speed parallel signals/data input in each of the demodulation circuits 6208~6215 to one group of serial signals.

Figure 42:
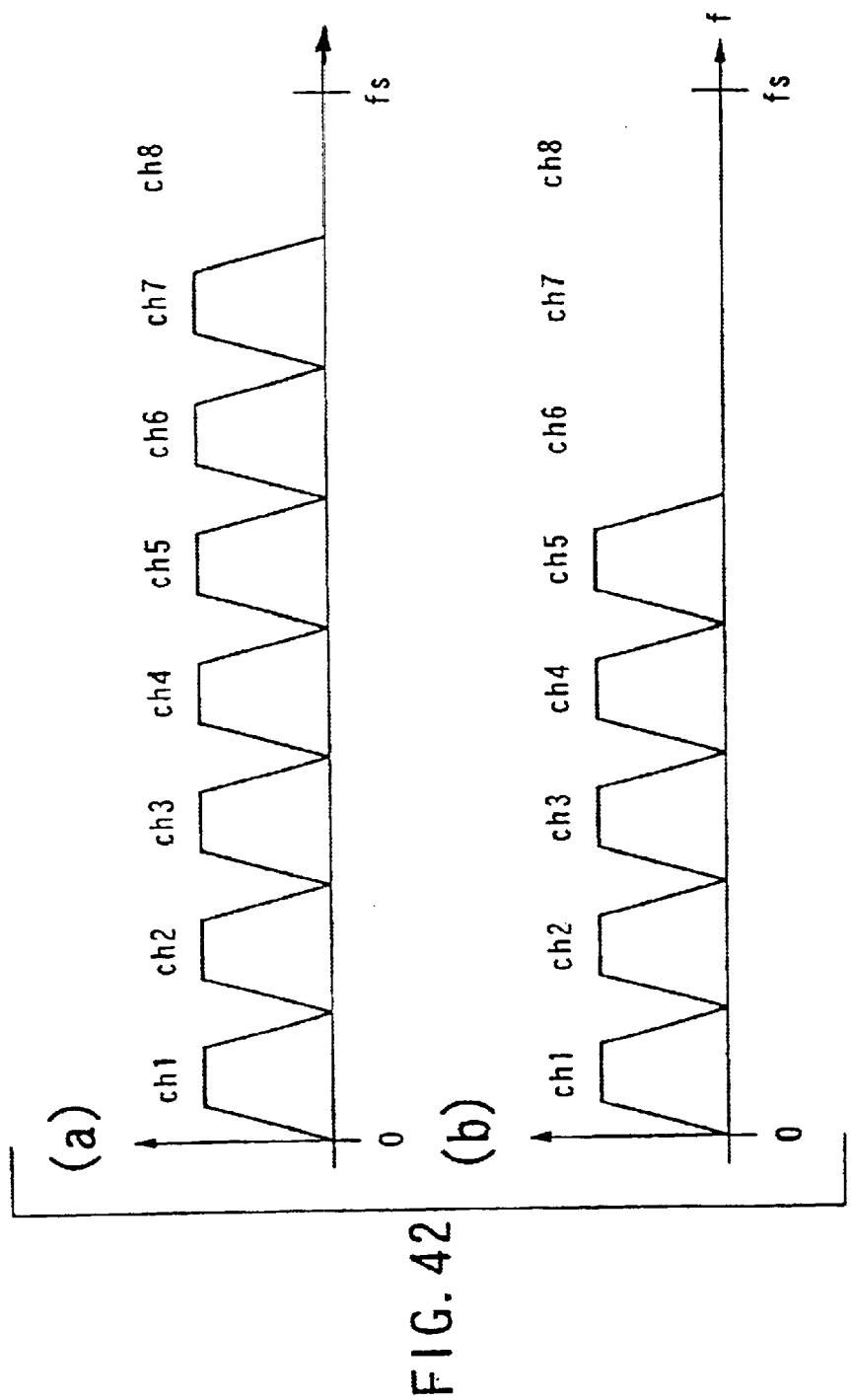
FIG. 42 is an illustration of the output frequency spectra in Embodiment 2-1.

Examples of output frequency spectrum are shown in the parts (a) and (b) in FIG. 42 when signals having ×7 Fb and ×5 Fb transmission speeds are input in the device described. The parts (a) and (b) in FIG. 42 show Ch1 that has passed through the modulation circuit 6102; Ch2 through the modulation circuit 6103, Ch3 through the modulation circuit 6104; Ch4 through the modulation circuit 6105; Ch5 through the modulation circuit 6106; Ch7 through the modulation circuit 6108; and Ch8 through the modulation circuit 6109.

As shown in the part (a) and (b) in FIG. 42, the device in this embodiment uses a number of low speed modulators, which is proportional to the transmission speeds, to enable variable transmission rates to be achieved. Also, by choosing the 2-demultiplexing filter banks, their frequency characteristics and connection configuration to follow the examples shown in FIG. 47, mutual interference among the multiple of slow speed signals can be avoided.

This is reported in a reference by, H. Tanabe, "Seamless Multirate Filter Bank", Technical Report of IEICE, SAT99-14. For this reason, slow speed signals in the channels that are not used, Ch6~Ch8, can be used to transmit signals from other stations, thus providing high utilization efficiency of available frequencies. Embodiment 2-2

Figure 33:
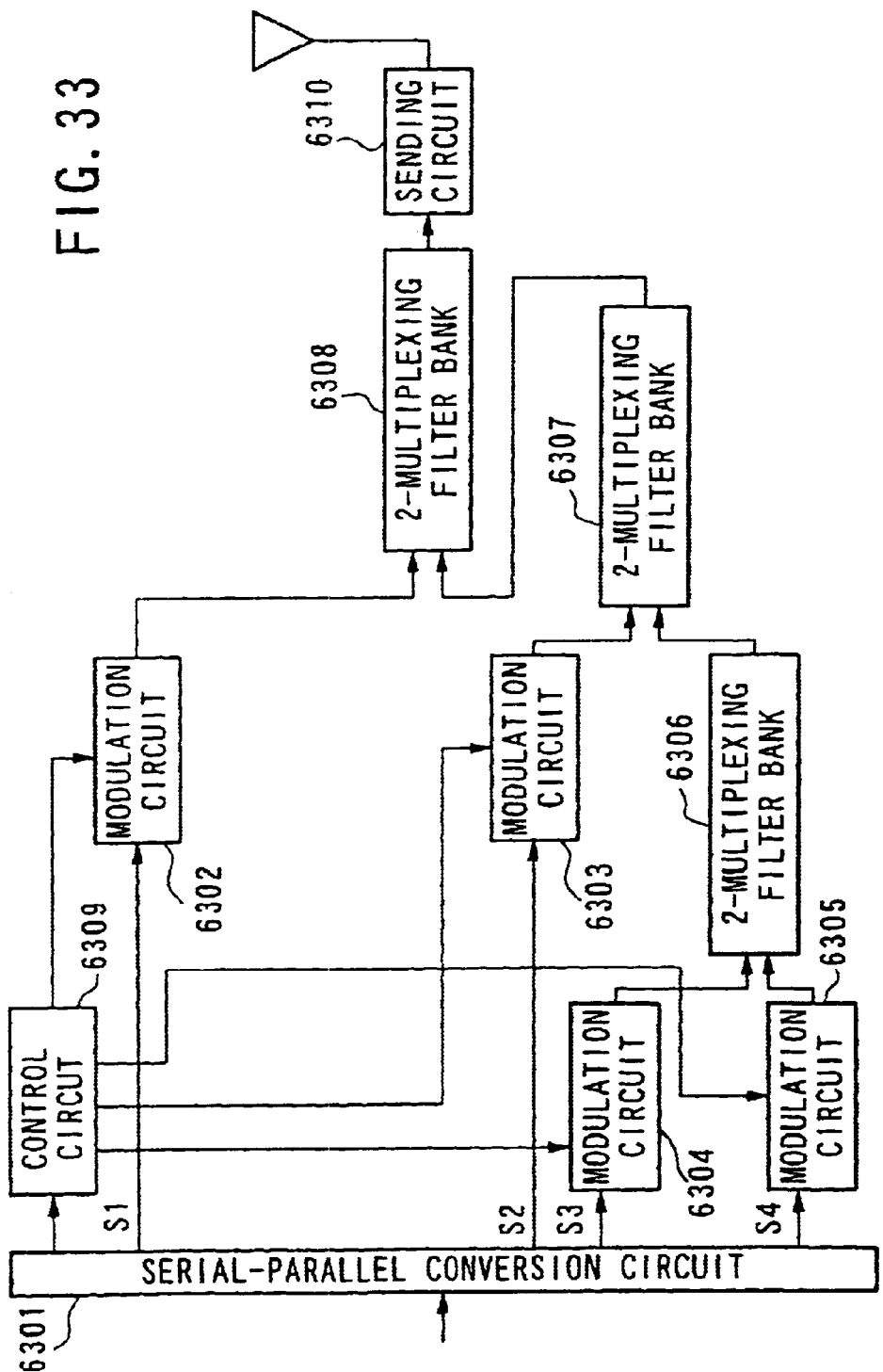
FIG. 33 is a block diagram of a signal transmitter in Embodiment 2-2.
Figure 34:
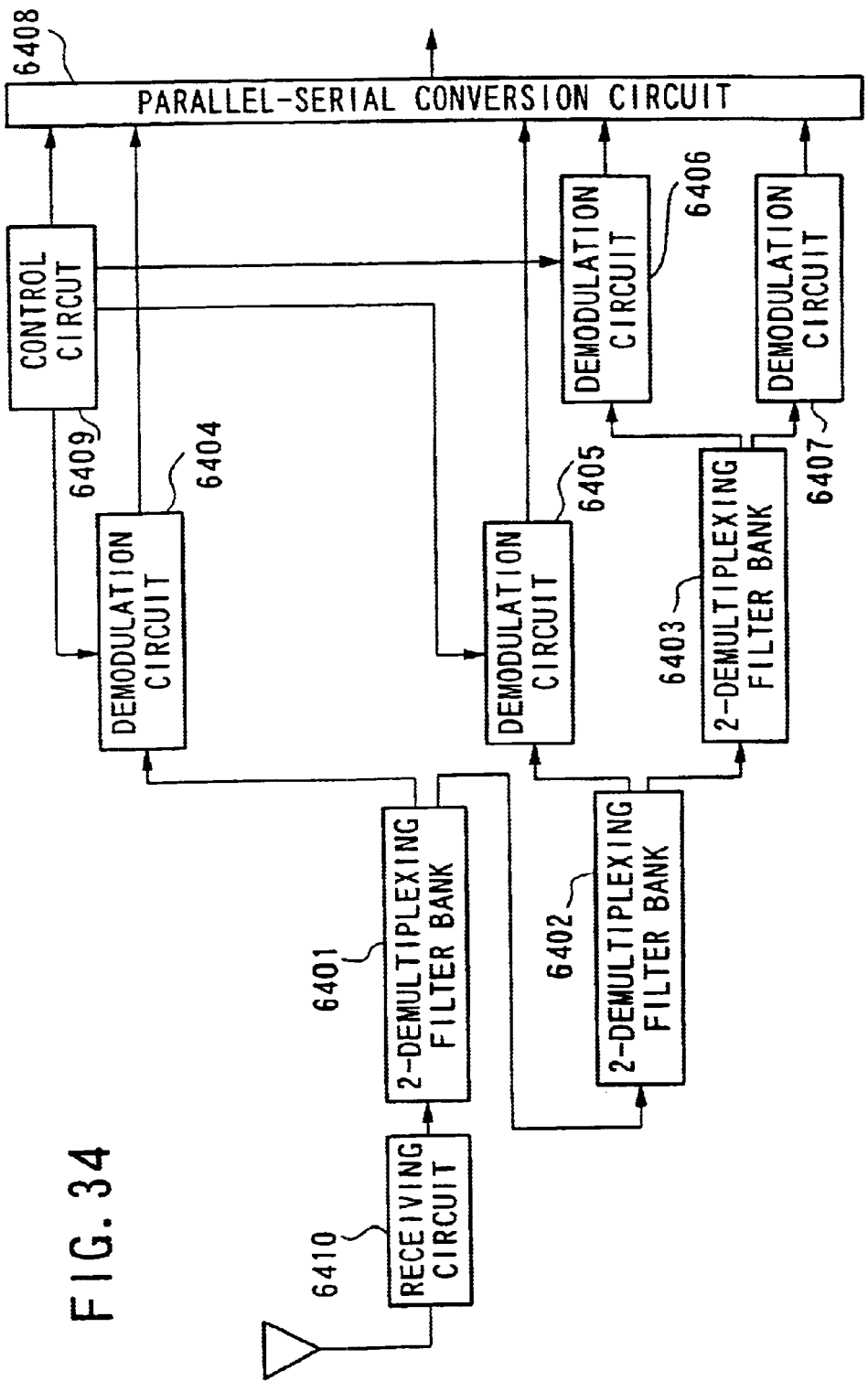
FIG. 34 is a block diagram of a signal receiver in Embodiment 2-2.

The digital modem in Embodiment 2-2 are shown in FIGS. 33 and 34.

FIG. 33 shows a block diagram of an example of the digital modem, and FIG. 34 shows a block diagram of an example of the digital signal receiver. The digital modem is comprised by at least one transmitter and one receiver. A maximum of four carrier waves are used in the devices shown in FIGS. 33, 34.

FIG. 33 shows a device including: serial-parallel conversion circuit 6301; modulation circuits 6302~6305; 2-multiplexing filter banks 6306~6308; control circuit 6309; sending circuit 6310. The 2-multiplexing filter banks are the same as those used in Embodiment 1. Input data are converted to a maximum of four groups of parallel data S1, S2, S3, S4 in the serial-parallel conversion circuit 6301 under the control of the control circuit 6309.

Parallel data S1 propagates at ×4 Fb; S2 at ×2 Fb; S3 and S4 at Fb. Parallel converted data S1, S2, S3, S4 operate under the control of the control circuit 6309, and are modulated such that S1 is modulated in the modulation circuit 6302; S2 in the modulation circuit 6303; S3 in the modulation circuit 6304; S4 in the modulation circuit 6305. However, the control circuit 6309 operates in such a way that the modulation circuit 6302 operates at ×4 speed of the modulators 6304, 6305, and the modulation circuit 6303 operates at ×2 speed of the modulators 6304, 6305.

In the operation described above, the control circuit 6309 converts input signals to the speeds of the respective signals S1 to S4, and controls the allocation of signals to various modulators as well as output timing of the modulated signals. The control circuit 6309 controls start/stop operation of each of the modulation circuits 6302~6305.

Output signals from the modulation circuits 6304, 6305 are input in the 2-multiplexing filter bank 6306. Input data are subjected to ×2 up-sampling and are band limited in the filters having different pass-bands and output therefrom. Output signals from the modulation circuit 6303 and the 2-multiplexing filter bank 6306 are input in the 2-multiplexing filter bank 6307 and are subjected to ×2 up-sampling and after being band limited by passing through filters having different pass-bands, they are multiplexed and output therefrom.

Output signals from the modulation circuits 6302 and the 2-multiplexing filter bank 6307 are input in the 2-multiplexing filter bank 6308. Input data are subjected to ×2 up-sampling and are band limited in the filters having different pass-bands and are multiplexed and output therefrom. Output signals from the 2-multiplexing filter bank 6308 are input in the sending circuit and are output from the antennae.

Next, the receiver shown in FIG. 34 will be explained. FIG. 34 shows a device including: 2-demultiplexing filter banks 6401~6403; demodulation circuits 6404~6407;

parallel-serial conversion circuit 6408; control circuit 6309; receiving circuit 6410. Demodulation circuits 6404~6407 and parallel-serial conversion circuit 6408 are controlled by the control circuit 6409. The 2-demultiplexing filter banks are the same as those explained in Embodiment 2-1. Signals received in the antennae are input in the receiving circuit 6410.

Output signals from the receiving circuit 6410 are input in the 2-demultiplexing filter bank 6401. Signals input in the 2-demultiplexing filter bank 6401 are split into two groups, and are band-limited in the filters having different pass-bands, and are down-sampled to be output. One group of output signals from the 2-demultiplexing filter bank 6401 are input in the 2-demultiplexing filter bank 6402.

Signals input in the 2-demultiplexing filter bank 6402 are split into two groups, and the signals in each group are band limited in the filters having different pass-bands, down-sampled and output. Other group of signals output from the 2-demultiplexing filter bank 6401 are input in the demodulation circuit 6404, and demodulated to produce demodulated signals, which are input in the parallel-serial conversion circuit 6408. Here, demodulation circuit 6404 operates at ×4 speed of the demodulation circuit 6406.

One group of signals output from the 2-demultiplexing filter bank 6402 are input in the demodulation circuit 6405. Signals input in the demodulation circuit 6405 are modulated to produced demodulated signals and are input in the parallel-serial conversion circuit 6408. Other group of signals from the 2-demultiplexing filter bank 6402 are input in the 2-demultiplexing filter bank 6403. Signals input in the 2-demultiplexing filter bank 6403 are split into two groups, and each group is input in the filters having different pass-bands to limit bandwidth, and are down-sampled and output.

One group of signals output from the 2-demultiplexing filter bank 6403 are input in the demodulation circuit 6406, and after demodulation, output signals are input in the parallel-serial conversion circuit 6408. Other group of signals are input in the demodulator 6407 and demodulated and demodulated signals are input in the parallel-serial conversion circuit 6408. Parallel data input in the parallel-serial conversion circuit 6408 are converted to serial data in one signal group and out therefrom.

In the above operation, the control circuit 6407 controls start/stop operation of each of the modulation circuits 6404~6406. Also, the control circuit 6407 controls conversion of three slow speed parallel signals propagating at speeds, Fb, ×2 Fb and ×4 Fb, to one group of serial signals.

Examples of output frequency spectrum are shown in the parts (a) and (b) in FIG. 42 when signals having ×7 Fb and ×5 Fb transmission speeds are input in the device described.

Figure 43:
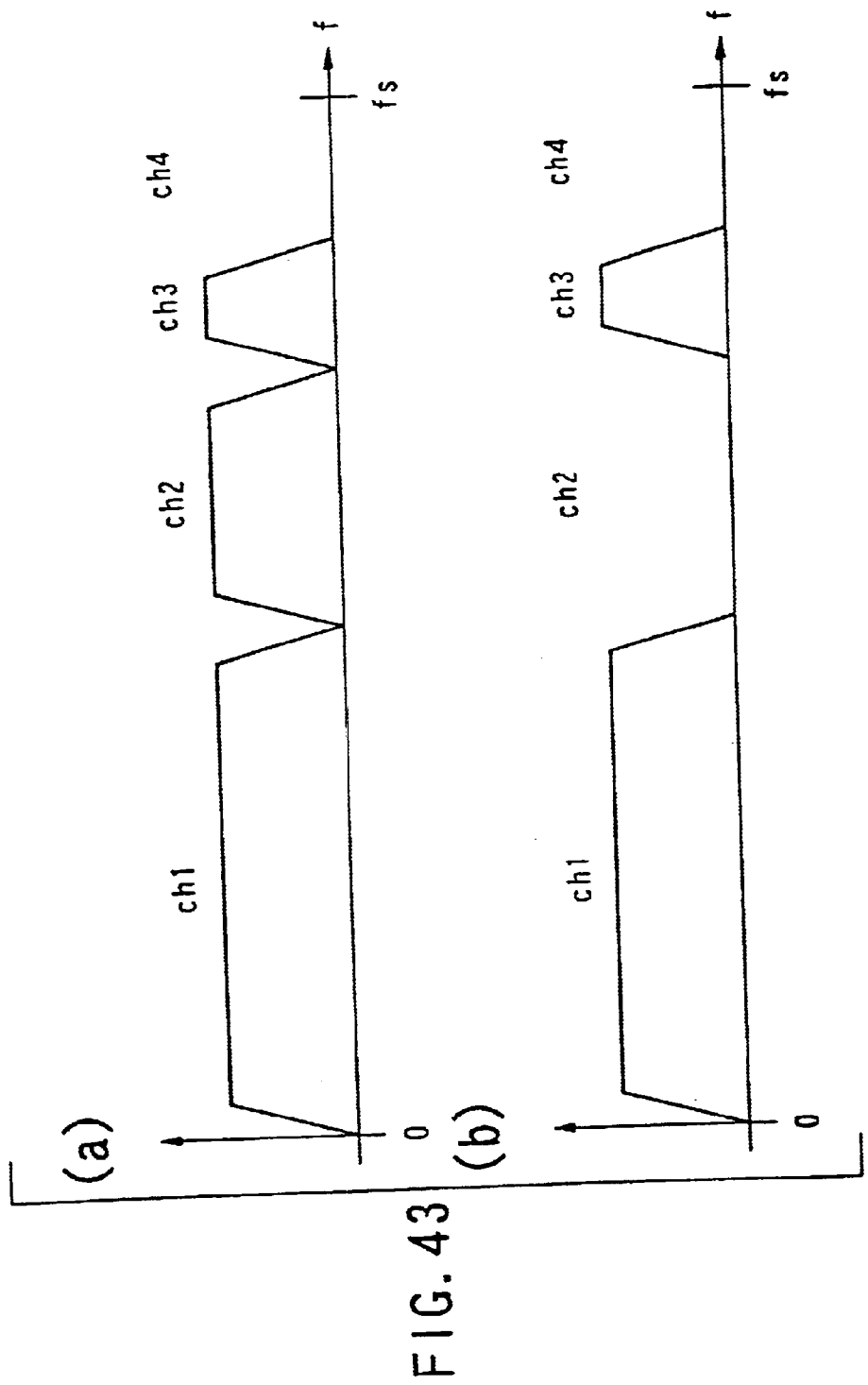
FIG. 43 is an illustration of the output frequency spectra in Embodiment 2-2.

The parts (a) and (b) in FIG. 43 show Ch1 that has been processed through the modulation circuit 6302; Ch2 through the modulation circuit 6303, Ch3 through the modulation circuit 6304; Ch4 through the modulation circuit 6305. As shown in the parts (a) and (b) in FIG. 43, transmission speed can be varied by choosing appropriate channels, Ch1, Ch2, Ch3 and Ch4, depending on the input transmission speeds.

The example shown in the parts (a) and (b) in FIG. 43 is a case in which all the input speeds of the slow speed signals are different. Therefore, the digital signal transmitters and receivers shown, respectively, in FIGS. 33, 34 are examples of the devices that can process input signal when all the input slow speed signals have different speeds.

Also, the digital signal transmitters and receivers shown, respectively, in FIGS. 33, 34 are examples of the device that can process input signals when some of the signals have different slow speeds such as Fs, ×2 Fs and ×4 Fs.

The serial connection configuration for the 2-multiplexing filter banks in the digital modem shown in FIG. 33 is not limited to the configuration shown. For example, when considering only the serial connection of the 2-multiplexing filter banks, the configuration may be any one of the examples shown in FIGS. 54~57. Similarly, serial connection configuration for the 2-multiplexing filter banks in the digital signal receiver shown in FIG. 34 is not limited to the configuration shown. For example, when considering only the serial connection of the 2-multiplexing filter banks, the configuration may be any one of the examples shown in FIGS. 59~62.

Embodiment 2-3

Figure 35:
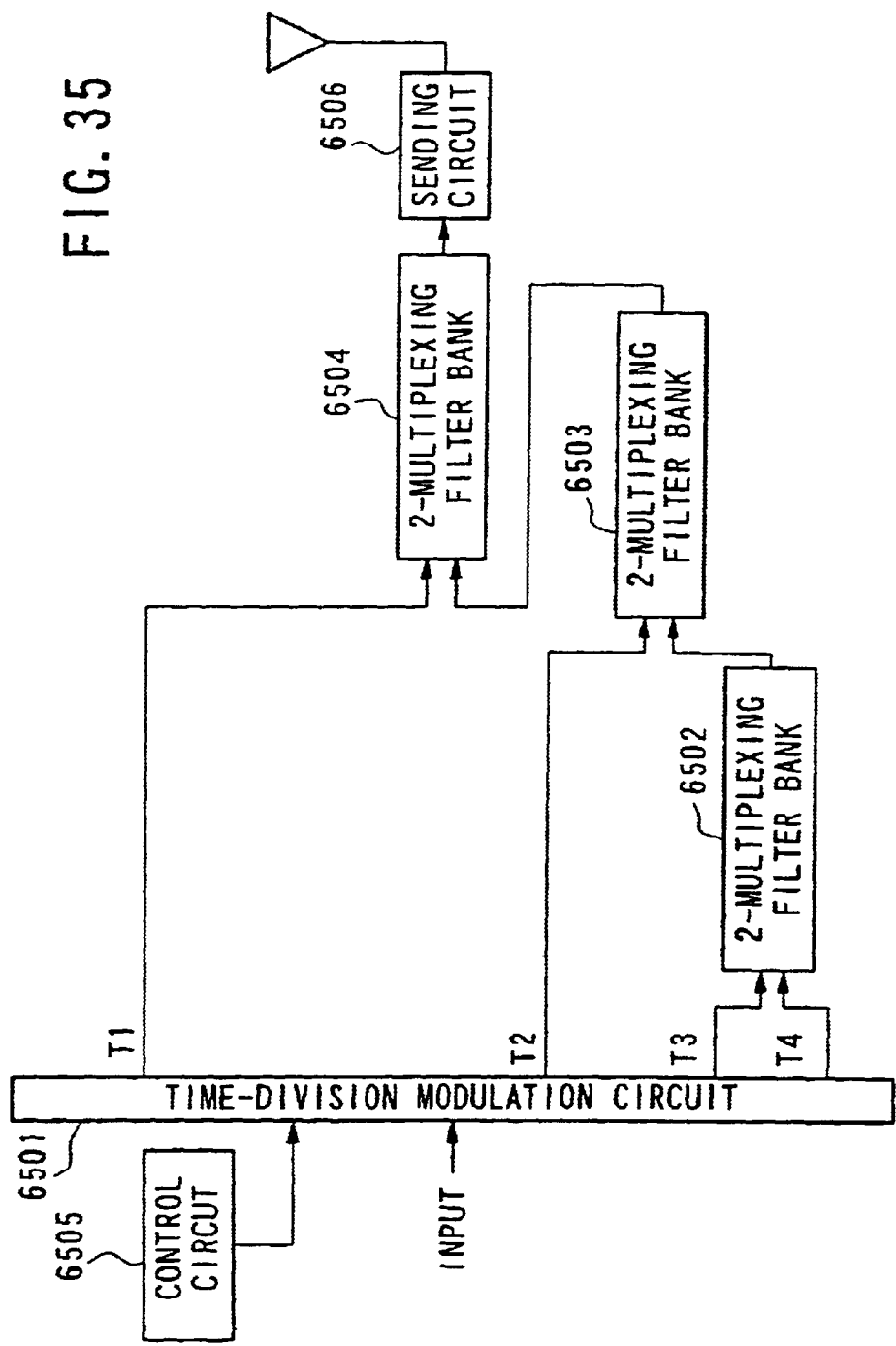
FIG. 35 is a block diagram of a signal transmitter in Embodiment 2-3.
Figure 36:
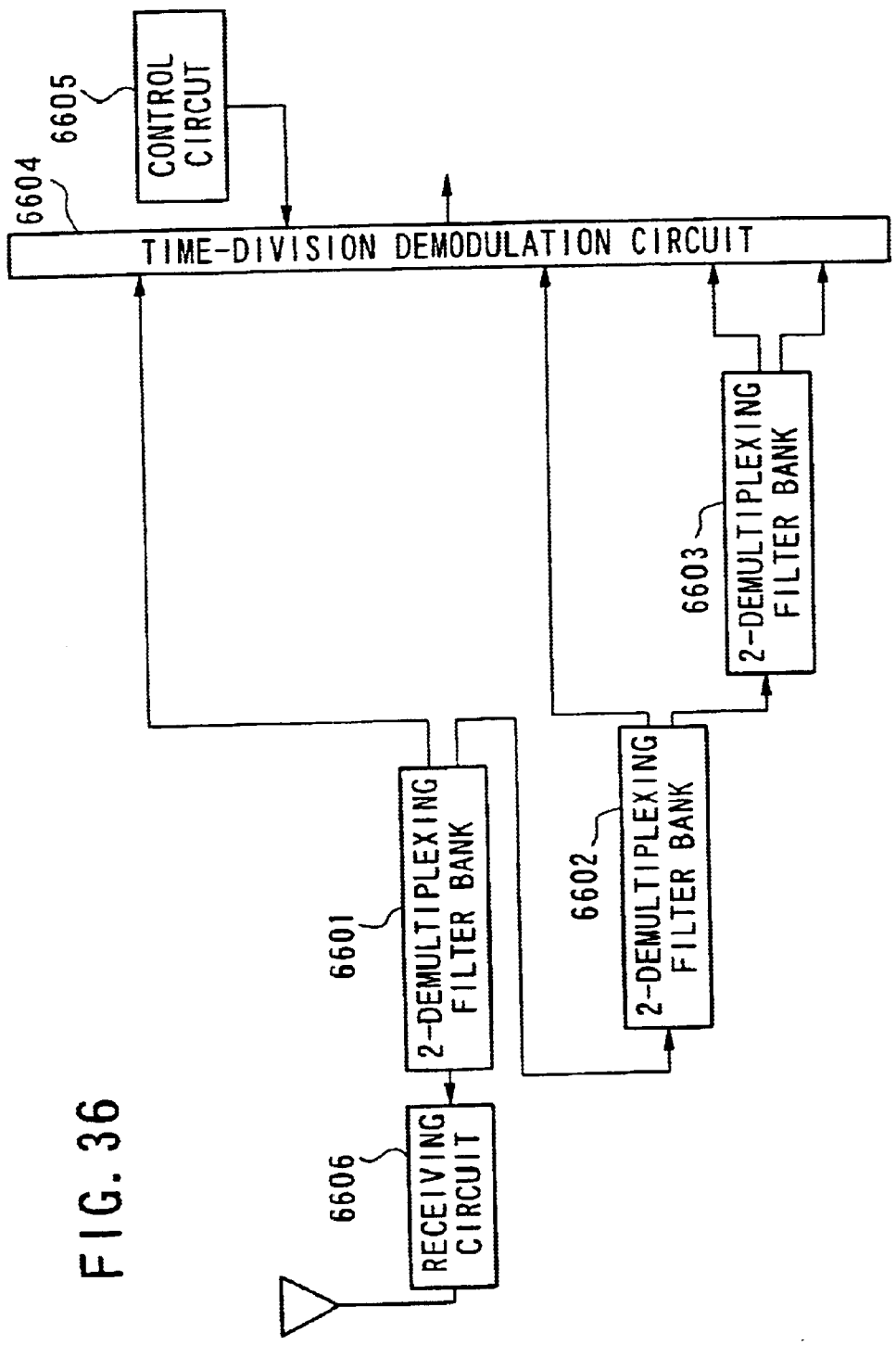
FIG. 36 is a block diagram of a signal receiver in Embodiment 2-3.

The digital modem in Embodiment 2-3 are shown in FIGS. 35 and 36.

FIG. 35 shows a block diagram of an example of the digital signal transmitter in the digital modem, and FIG. 36 shows a block diagram of an example of the digital signal receiver in the digital modem. The digital modem is comprised by at least one transmitter and one receiver. A maximum of four carrier waves are used in the transmission devices shown in FIGS. 33, 34. A maximum of four carrier waves are used in the devices shown in FIGS. 35, 36.

Figure 45:
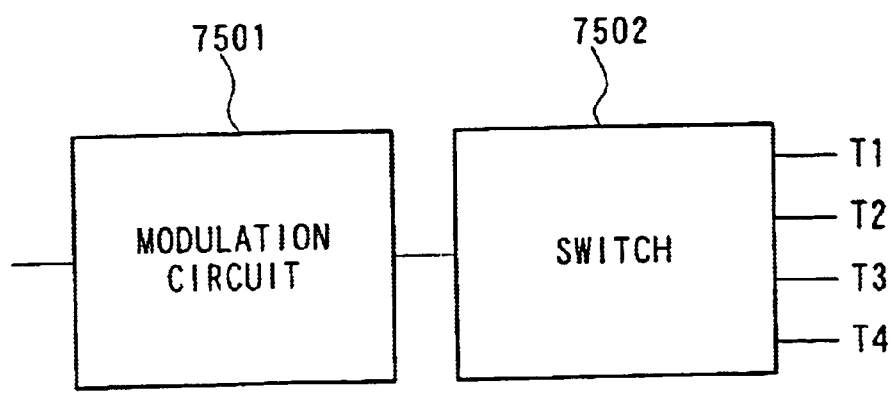
FIG. 45 is an example of the time-division modulation circuit.

The device shown in FIG. 35 includes: time-division modulation circuit 6501; 2-multiplexing filter banks 6502~6504; and control circuit 6505. The structure of the time-division modulation circuit is shown in FIG. 45. The device includes: modulation circuit 7501, and switch 7502. The 2-multiplexing filter banks are the same as those explained in Embodiment 1. Input data are modulated in the time-division modulation circuit 6501 under the control of the control circuit 6505.

Here, the control circuit 6505 control operations of the time-division modulation circuit 6501 in converting serial input data to parallel data, the processing sequence, number of operations and destination of the parallel data.

Figure 37:
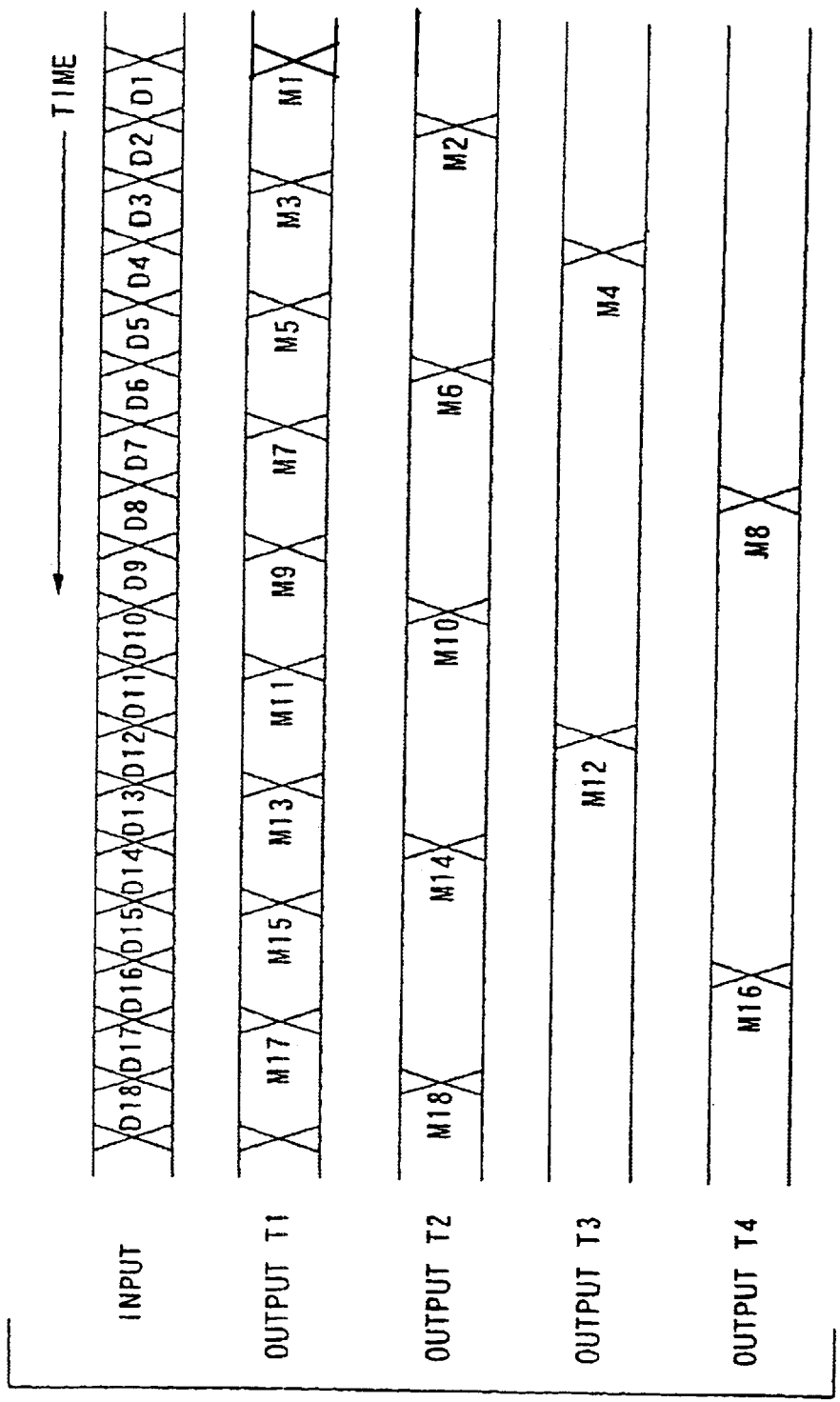
FIG. 37 is a timing chart for output signals.

In this case, the time-division modulator 6501 uses the switch 7502 shown in FIG. 45, and outputs a maximum of four groups of signals, T1, T2, T3, T4 under the control of the control circuit 6505 at the timing shown in FIG. 37. In FIG. 37, D1~D8 relate to data input in the order indicated in the diagram, and M1~M18 relate to modulated signals obtained by modulation of D1~D8. Because the modulated signals are output at the timing shown in FIG. 37, signal T1 is output at ×4 Fb, T2 at ×2 Fb, T3, T4 are at ×4 Fb.

Output signals T3 and T4 are input in the 2-multiplexing filter bank 6502 and after being subjected to ×2 up-sampling, and band limited by passing through filters of different pass-bands, are multiplexed in the multiplexing circuit and output. Output signals T2 and output signals from the 2-multiplexing filter bank 6502 are input in the 2-multiplexing filter bank 6503 and after being subjected to ×2 up-sampling, and band limited by passing through filters of different pass-bands, are multiplexed in the multiplexing circuit and output.

Output signals T1 and output signals from the 2-multiplexing filter bank 6503 are input in the 2-multiplexing filter bank 6504 and after being subjected to ×2 up-sampling, and band limited by passing through filters of different pass-bands, are multiplexed in the multiplexing circuit and output. Output signals from the 2-multiplexing filter bank 6504 are input in the sending circuit 6506 and are transmitted from the antennae.

Figure 46:
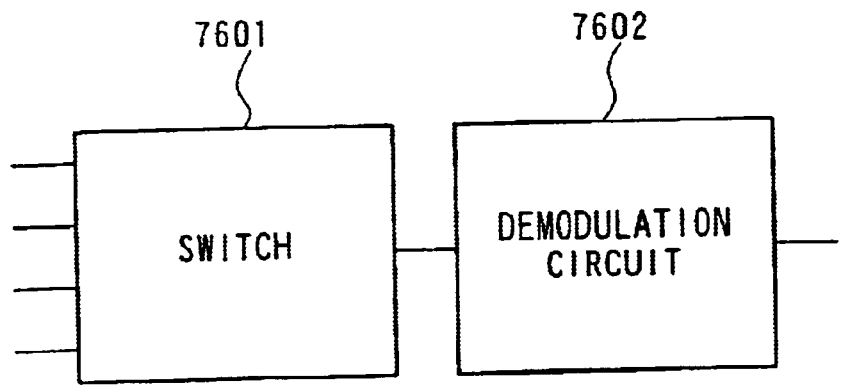
FIG. 46 is an example of the time-division modulation circuit.

Next, the receiver shown in FIG. 36 will be explained. FIG. 36 shows a device including: 2-demultiplexing filter banks 6601~6603; time-division demodulation circuit 6604; and control circuit 6305. The structure of the time-division circuit 6404 is shown in FIG. 46, including switch 7601, demodulation circuit 7602. The 2-demultiplexing filter banks are the same as those explained earlier in Embodiment 1. Signals received from the antennae are input in the receiving circuit 6606.

Output signals from the receiving circuit 6606 are input in the 2-demultiplexing filter bank 6601. Signals input in the 2-demultiplexing filter bank 6601 are split into two groups, and are band-limited in the filters having different passbands, and are down-sampled to be output. One group of output signals from the 2-demultiplexing filter bank 6601 are input in the 2-demultiplexing filter bank 6602. Signals in other group output from the 2-demultiplexing filter bank 6601 are input in the time-division demodulator 6604.

Signals input in the 2-demultiplexing filter bank 6602 are split into two groups, and the signals in each group are band limited in the filters having different pass-bands, downsampled and output. Other group of signals output from the 2-demultiplexing filter bank 6602 are input in the demodulation circuit 6603, other group of signals output from the 2-demultiplexing filter bank 6602 are input in the time-division demodulator 6604.

Signals input in the 2-demultiplexing filter bank 6603 are split into two groups, and the signals in each group are band limited in the filters having different pass-bands, downsampled and output. One group and other group of signals output from the 2-demultiplexing filter bank 6603 are input in the time-division demodulation circuit 6604. The signals input in the time-division demodulation circuit 6604 are demodulated according to the control signals output from the control circuit 6605.

In the above operation, the control circuit 6605 controls start/stop operation of each of the demodulation circuits 6601~6603. Also, the control circuit 6605 controls conversion of three slow speed parallel signals propagating at speeds, Fb, ×2 Fb and ×4 Fb, demodulates the parallel-converted signals and converts the demodulated parallel signals to one group of serial signals in the chronological order.

Figure 44:
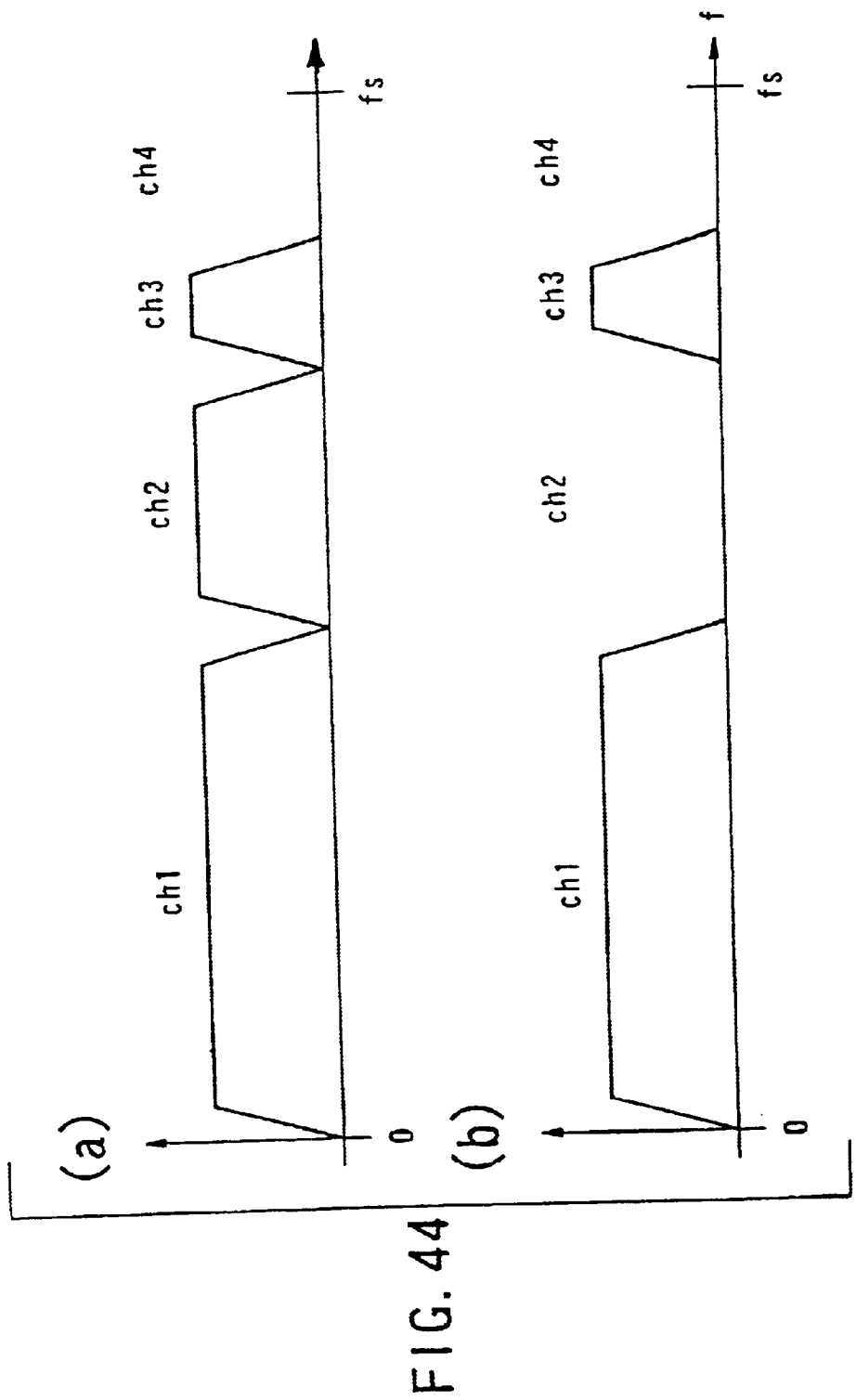
FIG. 44 is an illustration of the output frequency spectra in Embodiment 2-3.

Examples of output frequency spectrum are shown in the parts (a) and (b) in FIG. 44 when signals having ×7 Fb and ×5 Fb transmission speeds are input in the device described. Ch1 shown in the parts (a) and (b) in FIG. 44 corresponds to output signal T1 from time-division modulation circuit 6502; Ch2 to T2 from time-division modulation circuit 6502; Ch3 to T3 from time-division modulation circuit 6502; and Ch4 to T4 from time-division modulation circuit 6502. As shown in the parts (a) and (b) in FIG. 44, transmission speed can be varied by choosing appropriate channels, Ch1, Ch2, Ch3, Ch4 depending on the transmission speed of input signals.

The example shown in the parts (a) and (b) in FIG. 44 is a case in which all the input speeds of the slow speed signals are different. Therefore, the digital signal transmitters and receivers shown, respectively, in FIGS. 35, 36 are examples of the devices that can process input signal when all the input slow speed signals have different slow speeds.

Also, the digital signal transmitters and receivers shown, respectively, in FIGS. 35, 36 are examples of the device that can process input signals when some of the signals have different slow speeds such as Fs, ×2 Fs and ×4 Fs.

The serial connection configuration for the 2-multiplexing filter banks in the digital signal transmitter shown in FIG. 35 is not limited to the configuration shown. For example, when considering only the serial connection of the 2-multiplexing filter banks, the configuration may be any one of the examples shown in FIGS. 53~57. Similarly, serial connection configuration for the 2-multiplexing filter banks in the digital signal receiver is not limited to the configuration shown in FIG. 36. For example, when considering only the serial connection of the 2-multiplexing filter banks, the configuration may be any one of the examples shown in FIGS. 58~62. In other words, by controlling the signal speed, destination, processing of slow speed signals input in the time-division modulator and modulation speed of the low speed signals output from the time-division modulation circuit 6501 appropriately, various serial configuration may be adopted.

Embodiment 3-4

A digital modem in Embodiment 3-4 is a modification of the device presented in Embodiment 3-3 so that a plurality of serial signals can be processed. In the following, only the differences will be explained.

Figure 48:
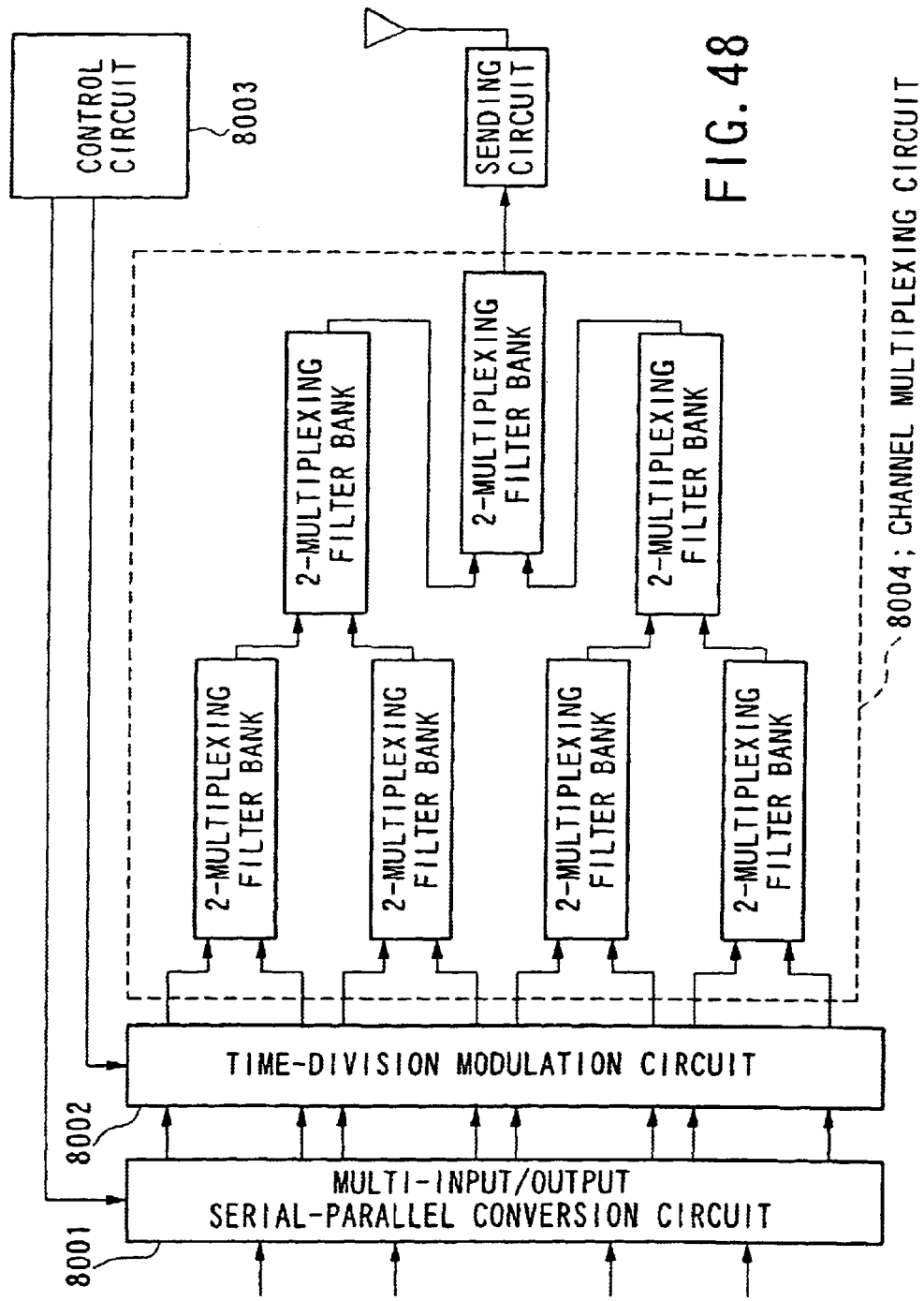
FIG. 48 is a block diagram of a signal transmitter in Embodiment 2-4.

FIG. 48 shows a block diagram of the transmitter. The transmitter differs from the device shown in FIG. 35 in that a single-input multi-output type time-division modulation circuit 6501 is replaced with a multi-input/output serial-parallel conversion circuit 8001 and a multi-input/output time-division modulation circuit 8002. Accordingly, the device shown in FIG. 48 is able to process a series of serial data (chronological data).

In the operation described above, the control circuit 8003 control the multi-input/output serial-parallel conversion circuit 8001 so as to convert a plurality of input serial signals to a plurality of slow speed signals, and control the destination of the converted low speed signals. Also, the control circuit 8003 control the time-division modulation circuit 8002 so as to control modulation of the target slow speed signals and modulation timing.

Figure 49:
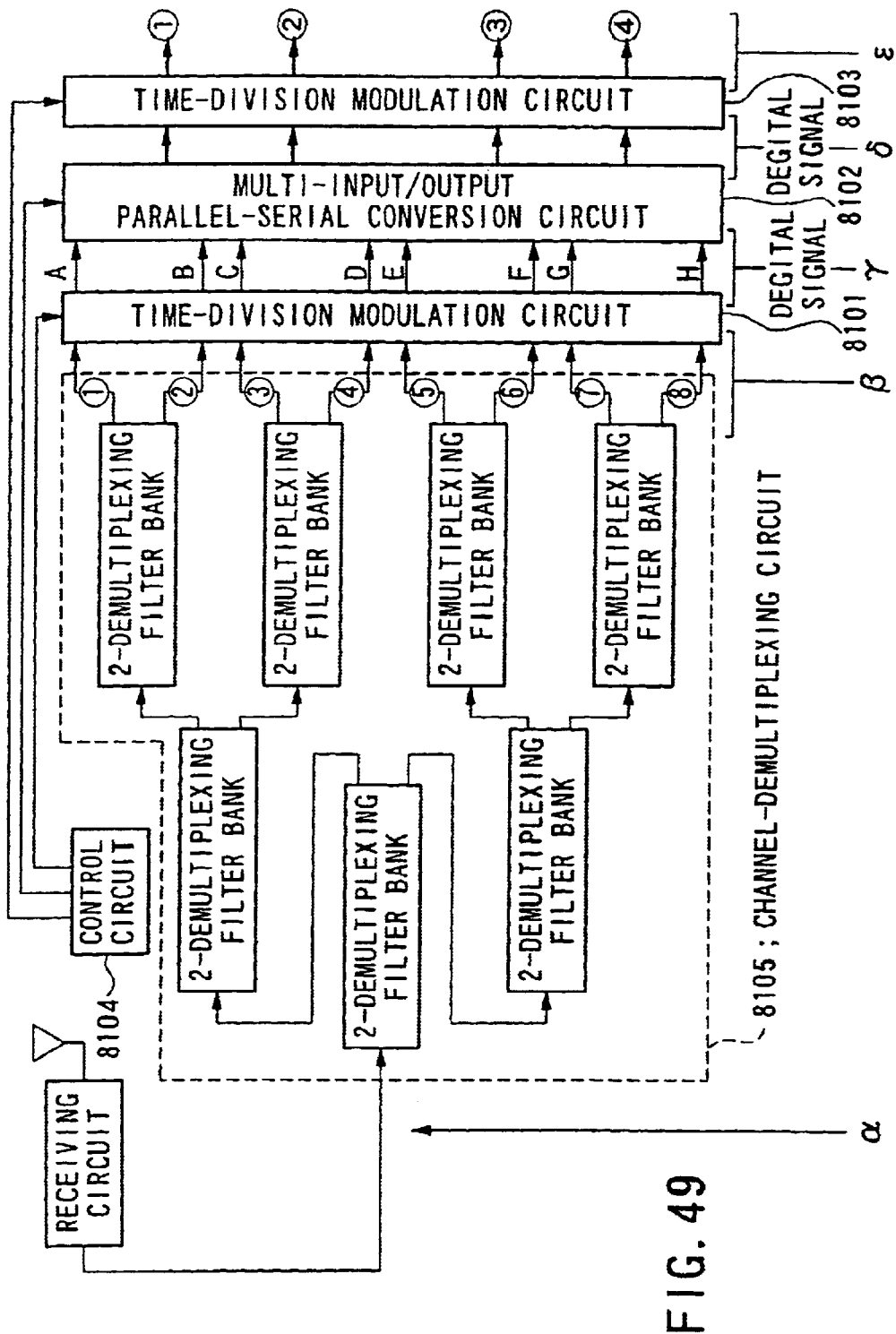
FIG. 49 is a block diagram of a signal receiver in Embodiment 2-4.

FIG. 49 shows a block diagram of the receiver. The receiver differs from the device shown in FIG. 36 in that a multi-input single-output type time-division demodulation circuit 6604 is replaced with a multi-input/output time-division demodulation circuit 8101 and a multi-input/output type parallel-serial conversion circuit 8102. Accordingly, the device shown in FIG. 48 is able to process a series of serial data (chronological data). Accordingly, the digital signal receiver shown in FIG. 49 can demodulate to a plurality of serial signals (chronological data). Further, the digital signal receiver shown in FIG. 49 has a multi-input/output time-division modulator 8103 in the back-stage of the multi-input/output type parallel-serial conversion circuit 8102. Accordingly, demodulated signals output from the multi-input/output type parallel-serial conversion circuit 8102 can be output as modulated signals compatible with the intended applications in the receiving station. For example, if an example of application is digital video broadcasting (DVB), the time-division modulation circuit 8103 can serve as the modulation circuit for DVB.

Further, the time-division modulation circuit 8104 controls the multi-input/output parallel-serial conversion circuit 8102 so as to process a plurality of input slow speed signals to produce one group of serial digital signals in the correct combination, and controls outputting operation of a plurality of chronological digital signals. Also, the control circuit 8104 controls target serial signals and modulation timing by operating the time-division demodulation circuit 8101. The control circuit 8104 controls timing and target signals for modulation by operating the time-division modulation circuit 8103.

Next, the operation of the digital signal receiver shown in FIG. 49 will be explained. The difference in the operational steps of the receiver to the time-division demodulation circuit 8101 is whether the output signals from the time-division demodulation circuit 8101 is one channel or many channels, therefore, the following explanation will be focused on the subsequent steps.

Output signals from the time-division demodulation circuit are all input in the multi-input/output parallel-serial conversion circuit 8102 as a multiple constant slow speed signals (A~H). The multi-input/output parallel-serial conversion circuit 8102 converts the multiple slow speed input signals to the original group series signals and output the converted group signals. For example, the multi-input/output parallel-serial conversion circuit 8102 outputs signals A, C, E and G as one group, signals B and D as one group and signal F as one group and signal H as one group of digital signals. A plurality of signals output from the multi-input/output parallel-serial conversion circuit 8102 input in the time-division modulation circuit 8103. The time-division modulation circuit 8103 modulates these signals and the output signals are four groups of modulated signals of different bandwidths.

Figure 50:
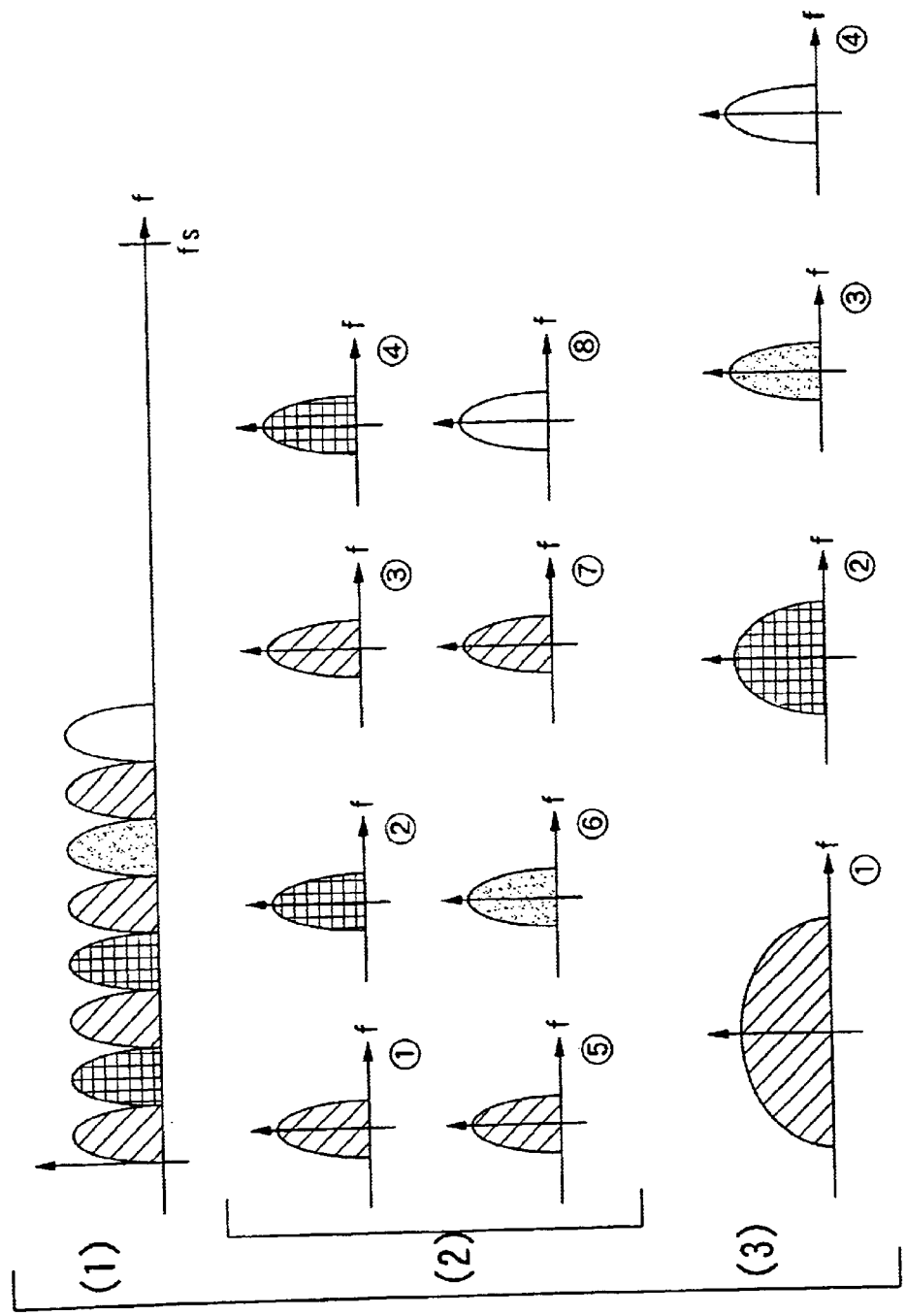
FIG. 50 is an illustration of the performance curves in the various sections in Embodiment 2-4.

FIG. 50 shows an example of three signals (1), (2), (3) which are observed at respective positions α, β, ε shown in FIG. 49. Signal (1) corresponds to input signals to the first-stage in the 2-demultiplexing filter bank, signal (2) corresponds to signals after channel demultiplexing, and signal (3) corresponds to four groups of modulated signals of different bandwidths.

Regarding the serial connection configuration for the 2-multiplexing filter banks in the channel multiplexing circuit 8004 shown in FIG. 48, it is not limited to this configuration shown. For example, when considering only the serial connection of the 2-multiplexing filter banks, the configuration may be any one of the examples shown in FIGS. 54~57. Similarly, serial connection configuration for the 2-multiplexing filter banks in the channel demultiplexing circuit 8105 it is not limited to the configuration shown in FIG. 49. For example, when considering only the serial connection of the 2-multiplexing filter banks, it may be any one of the examples shown in FIGS. 59~62.

Next, an application of the digital modem in Embodiment 2-4 will be explained with reference to FIGS. 51 and 52. In this application example, a digital signal transmitter having transmitters 8201~8203 transmits input signals having different groups of bandwidths, and a digital signal transmitter having a receiver 8204 outputs modulated signals to different groups of bandwidths.

Figure 51:
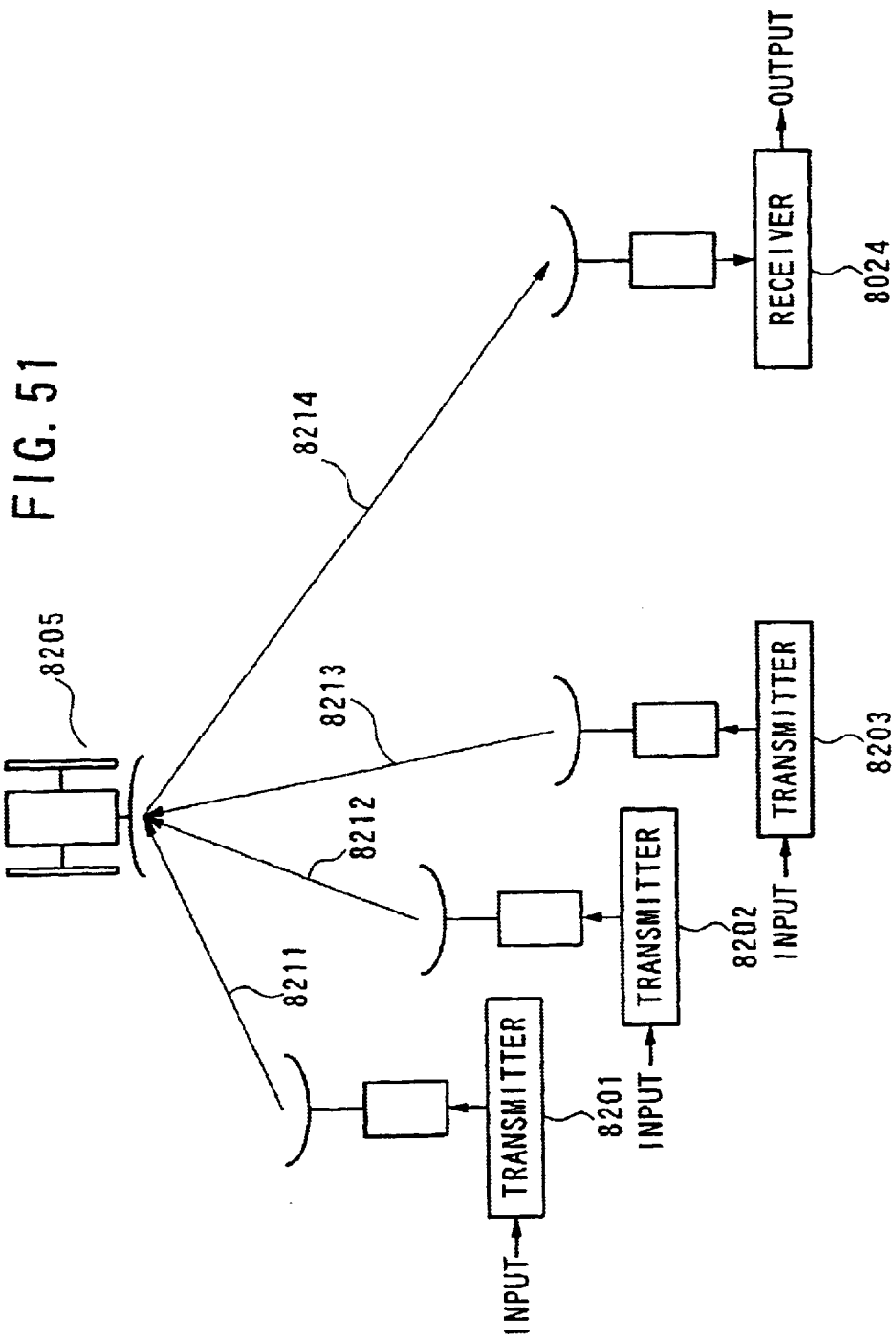
FIG. 51 is an application of the digital modem in Embodiment 2-4.
Figure 52:
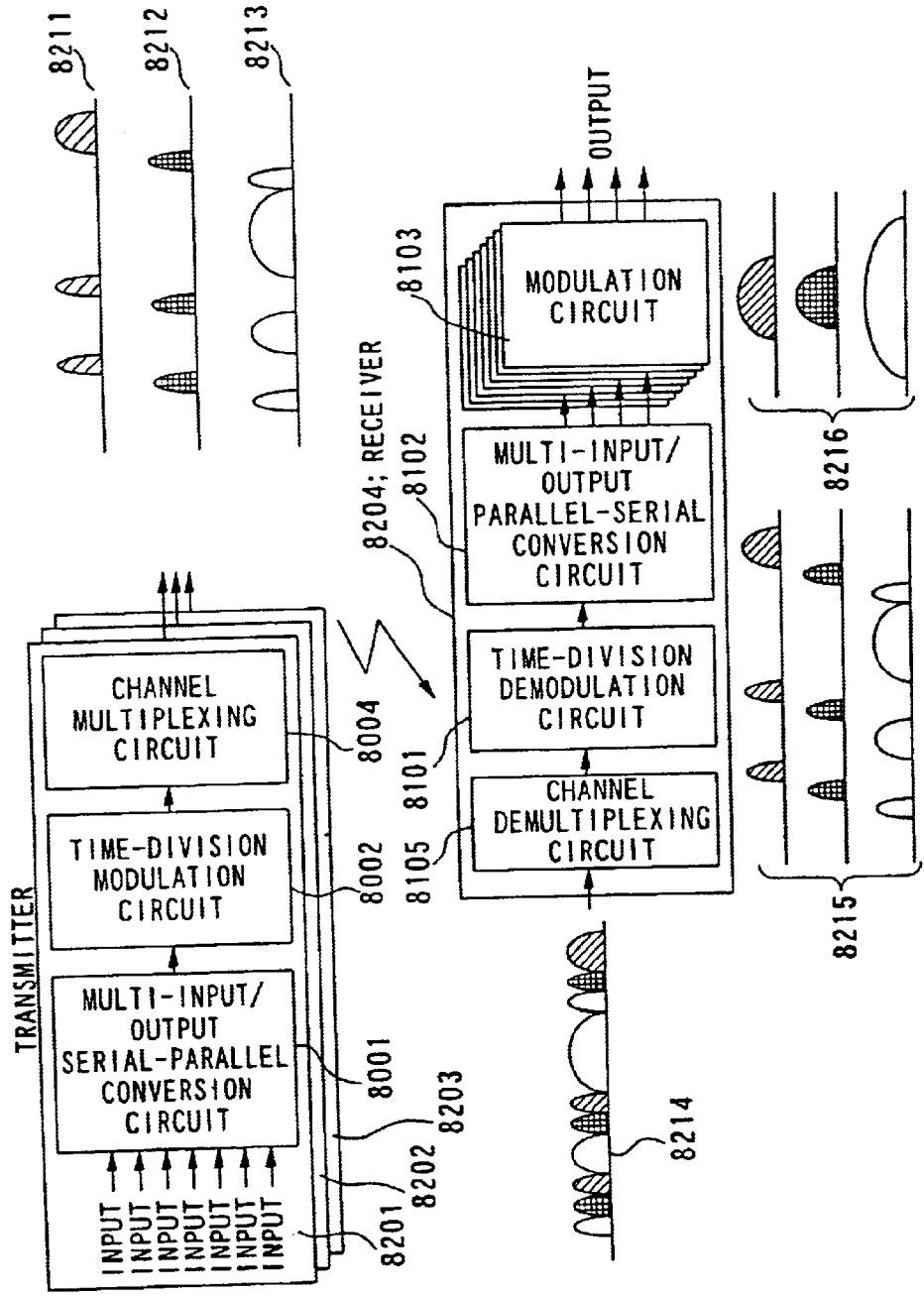
FIG. 52 is an application of the digital modem in Embodiment 2-4.
Figure 53:
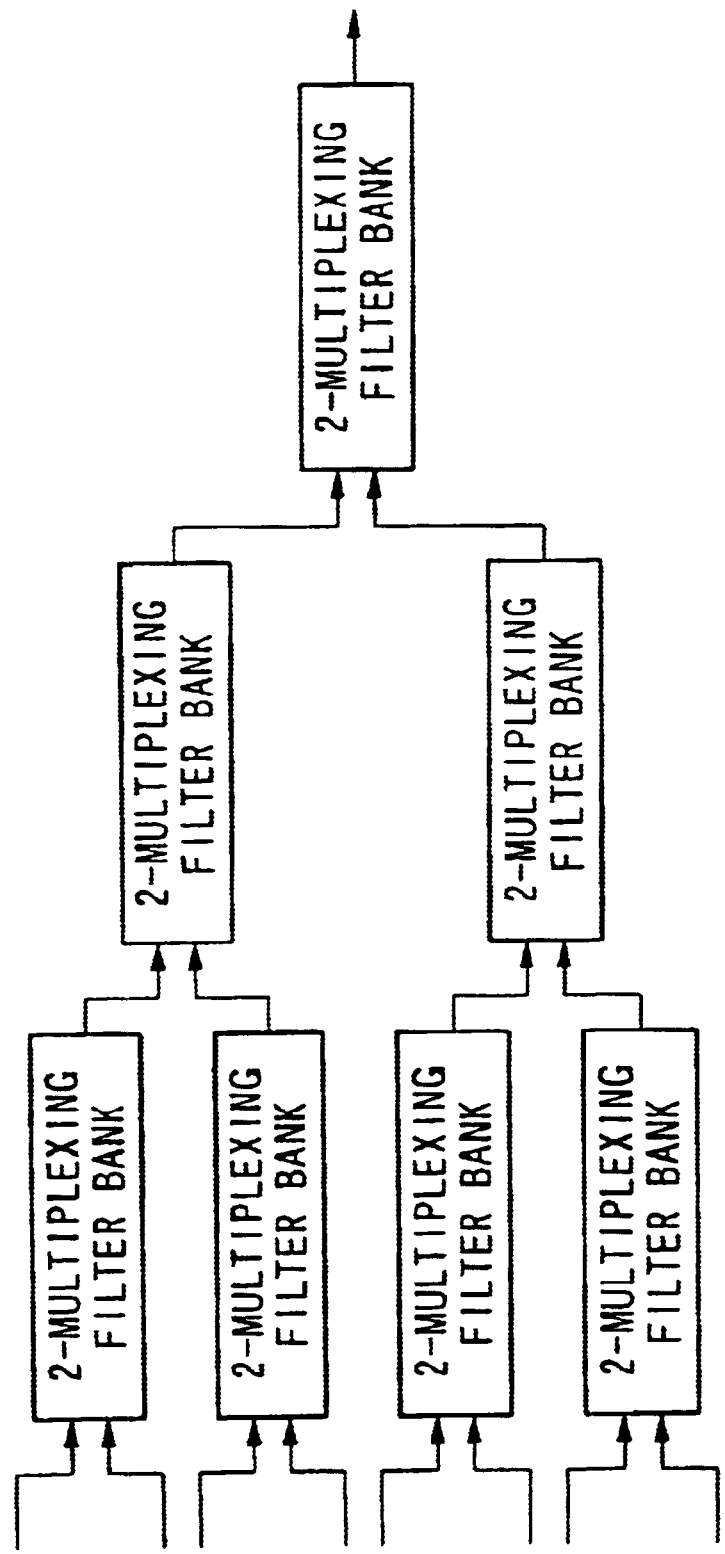
FIG. 53 an illustration of an example of serial connection of 2-multiplexing filter banks.

In FIGS. 51, 52, digital signals 8211~8213 are output from a digital signal transmitter having respective transmitters 8201~8203, and are transmitted to a satellite 8205, which broadcasts the transmitted signals as broadcast signals 8214. Digital signal transmitter having a receiver 8204 receives broadcast signals 8214 converts these signals to serial signals of respective groups, and outputs modulated signals 8216 of three different bandwidths groups.

In Embodiments 2-1 to 2-4, the digital modem is presented as having at least one digital signal transmitter and at least one digital signal receiver. However, it is not limited to such a configuration, and the modem may have either digital signal transmitter or digital signal receiver.

Also, in Embodiments 1-1~1-4 and 2-1~2-4, filter banks, wave shaping filters, modulation circuits, and demodulation circuits may be all or partly based on time-division operation.

For example, the digital signal demultiplexer shown in FIG. 1 may used as an example. Designating the operational frequency of the first-stage 2-demultiplexing filter bank 102 by α, the operational frequency of the second-stage 2-demultiplexing filter banks 103, 104 is α/2; the operational frequency of the third-stage 2-demultiplexing filter banks 105~108 is α/8; and the operational frequency of the wave shaping filters 2091~2098 is α/8.

And, the second-stage 2-demultiplexing filter banks 103, 104 may be grouped to form one 2-demultiplexing filter bank A, and a new memory source may be provided for storing the results of processing by the filter bank A operating at an operational speed α. In such a configuration, the 2-demultiplexing filter bank A can be controlled by a control circuit to switch memory addresses to process 2-demultiplexing filter banks 103, 104 in the time-division mode.

Similarly, the third-stage filter banks 105~108 may be replaced with one filter bank B operating at a speed α and a memory space. In this case, the filter bank B may be operated in the time-division mode to process the tasks required for the filter banks 105~6108.

Also, the wave shaping filters 2091~2098 may be replaced with one wave shaping~filter C operating at a speed a and with a memory space. In this case, the wave shaping filter C may be operated in the time-division mode to performs the tasks required for the wave shaping filters 2091~2098.

For other devices used in the previous embodiments, the number of circuit may be reduced at each stage, similarly and increase the operating speed to process the tasks in the time-division mode.

Also, in Embodiments 1-1~1-4 and 2-1~2-4, the serial connection of multiplexing and demultiplexing filter banks are provided in three-stages, but it is not necessary to limit to this configuration.

Also, in Embodiments 1-1~1-4 and 2-1~2-4, for the filter banks operating at a sampling speed fs for sampling each filter contained in filter banks, four types of filters each containing a pass band in the range of fs are used. It s not necessary to be limited to the type of filters containing the fs pass-band, such that eight, sixteen or more types may be included in the filter banks. The structure of the filter bank and serial connections are easily derived from the case of four filter groups, so that explanations will not be provided.

In Embodiments 1-1~1-4 and 2-1~2-4, digital signal processing for post-A/D conversion signals or pre-D/A conversion signals are all process by digital signal processing circuits. However, it is not necessary to limit digital signal processing to such methods, so that such processing may be performed by softwares based on CPU or DSP (Digital Signal Processor). In such a case, application programs for performing digital processing may be stored in a memory medium such as ROM as a part of digital signal demultiplexers, digital signal multiplexers, digital modems, digital signal transmitters, or digital signal revivers.

The invention has been explained in terms of examples embodied in various cases, but specific structures are not limited to those described, and it is obvious that various other designs may be developed within the principle outlined in this invention.

As explained above, the present digital signal demultiplexer is able to process frequency multiplexed signals without being affected by interferences caused by aliasing components and distortions caused by signal attenuation in the filter joints, by using four kinds of filters having different pass-bands.

Also, the present digital signal multiplexers and digital signal demultiplexers are able to compute the impulse response properties of each filter A, B, C and D by satisfying given computational requirements, so that the multi/demultiplexing filter banks can be calculated within a relatively small volume of computations, which is about equivalent to computations required for far-infrared (FIR) filters.

Also, as explained above, the present digital modem provides high frequency utilization in a convenient design, and offers variable-speed digital signal transmission, depending on the input signal speed.

Also, the present digital modem provides variable-speed digital signal transmission by adopting to the input transmission speed and selecting appropriate modulation circuitry.

Also, the present digital modem is able to frequency multiplex signals without being affected by interference by aliasing components and amplitude distortions, by using four filters having different pass-bands.

Also, the present digital modem is able to demultiplex frequency multiplexed signals into individual channels, without being affected by interference by aliasing components and amplitude distortions, by using four filters having different pass-bands.

Also, the present digital modem enables to reduce the number of mod/demodulation circuits required by processing a plurality of different low speed signals, compared with the device that used a constant speed mod/demodulation circuitry.

Also, the present digital modem offers an advantage that the number of modulation circuits for producing a constant transmission speed can be minimized by constructing the circuitry so that it can process mixed output signals that contains a plurality of different slow speed signals in the output signals from the channel demultiplexing circuits.

Also, the present digital modem is able to reduce the scale of the device significantly by utilizing time-division mode of processing signals based on the fact that sampling speeds are different for modulation circuit, 2-multiplexing filter banks, 2-demultiplexing filter banks, and demodulation circuit and that the signal groups are increased for low sampling speeds, so that one high processing speed circuitry for one group of signals has been developed to process to replace low speed processing of a large number of signals.

What is claimed is:

1. A digital signal demultiplexer having a band-separation filter bank comprising serially-connected 2-demultiplexing filter banks; wherein
    a 2-demultiplexing filter bank comprises band-pass filters and down-samplers for culling sampling frequencies of filter output signals to 1/2; and
    when said 2-demultiplexing filter bank includes four types of filters designated as A, B, C and D in an ascending order in band-pass frequency fs, where fs is a sampling frequency of input signals into each 2-demultiplexing filter bank; then
        said 2-demultiplexing filter bank is either
        a first 2-demultiplexing filter bank containing at least filter A or filter B, or
        a second 2-demultiplexing filter bank containing at least filter C or filter D; and
        is connected to a next 2-demultiplexing filter bank such that
            signals processed through said filter A are processed in a next-stage by a first 2-demultiplexing filter bank in said next-stage;
            signals processed through said filter B are processed in said next-stage by a second 2-demultiplexing filter bank in said next-stage;
            signals processed through said filter C are processed in said next-stage by another first 2-demultiplexing filter bank in said next-stage; and
            signals processed through said filter D are processed in said next-stage by another second 2-demultiplexing filter bank in said next-stage.

2. A digital signal demultiplexer according to claim 1, wherein
    signals processed through a filter A are input into a first 2-demultiplexing filter bank or output as signals having a sampling frequency dependent on a number of serially-connected stages in a 2-demultiplexing filter bank containing said filter A;
    signals processed through a filter B are input into a second 2-demultiplexing filter bank or output as signals having a sampling frequency dependent on a number of serially-connected stages in a 2-demultiplexing filter bank containing said filter B;
    signals processed through a filter C are input in a first 2-demultiplexing filter bank or output as signals having a sampling speed dependent on a number of serially-connected stages in a 2-demultiplexing filter bank containing said filter C; and
    signals processed through a filter D are input in a second 2-demultiplexing filter bank or output as signals having a sampling frequency dependent on a number of serially-connected stages in a 2-demultiplexing filter bank containing said filter D.

3. A digital sender multiplexer having a band-multiplexing filter bank comprising serially-connected 2-multiplexing filter banks; wherein
    a 2-multiplexing filter bank comprises up-samplers for doubling sampling frequencies of each input signal and
    filters for filtering output signals from said up-samplers; and
    adders for multiplexing output signals from each filter when there are two types of said filters; and
    when said 2-multiplexing filter bank includes four types of filters designated as E, F, G and H in an ascending order in band-pass frequency fs, where fs is a sampling frequency of output signals from each 2-multiplexing filter bank, then
        2-multiplexing filter banks are connected such that;
        signals output from one 2-multiplexing filter bank having at least a filter E or a filter F are input in another 2-multiplexing filter bank having at least a filter E and a filter G; and
        signals output from one 2-multiplexing filter bank having at least a filter G or a filter H are input into another 2-multiplexing filter bank having at least a filter F or filter H.

4. A digital signal multiplexer according to claim 3, wherein
    signals input in a 2-multiplexing filter bank comprising either a filter E or a filter G are signals output to another 2-multiplexing filter bank comprised at least by either a filter E or a filter F, or signals having sampling speed dependent on a number of serially-connected stages of 2-multiplexing filter banks comprising either a filter E or a filter G; and
    input signals to a 2-multiplexing filter bank comprising either a filter F or a filter H are signals output to another 2-multiplexing filter bank comprised at least by either a filter G or a filter H, or signals having sampling speed dependent on a number of serially-connected stages of 2-multiplexing filter banks comprising either a filter F or a filter H.

5. A digital signal demultiplexer according to claim 1, wherein a fist-stage of said band-separation filter bank comprises not less than one filter selected from filter A, filter B, filter C and filter D.

6. A digital signal multiplexer according to claim 3, wherein a last-stage of said band-multiplexing filter bank comprises not less than one filter selected from filter E, filter F, filter G and filter H.

7. A digital signal demultiplexer according to claim 1, wherein
said filter A has a lower limit of band-pass frequency of not less than −fs/4 and an upper limit of band-pass frequency of not more than fs/2;
said filter B has a lower limit of band-pass frequency of not less than 0 and an upper limit of band-pass frequency of not more than 3fs/4;
said filter C has a lower limit of band-pass frequency of not less than −3fs/4 and an upper limit of band-pass frequency of not more than 0; and
said filter D has a lower limit of band-pass frequency of not less than −fs/2 and an upper limit of band-pass frequency of not more than fs/4.

8. A digital signal multiplexer according to claim 3, wherein
said filter E has a lower limit of band-pass frequency of not less than −fs/4 and an upper limit of band-pass frequency of not more than fs/2;
said filter F has a lower limit of band-pass frequency of not less than 0 and an upper limit of band-pass frequency of not more than 3fs/4;
said filter G has a lower limit of band-pass frequency of not less than −3fs/4 and an upper limit of band-pass frequency of not more than 0; and
said filter H has a lower limit of band-pass frequency of not less than −fs/2 and an upper limit of band-pass frequency of not more than fs/4.

9. A digital signal demultiplexer according to claim 1, wherein impulse responses A(n), B(n), C(n), D(n) of said filter A, filter B, filter C, filter D, respectively, satisfy equations:

$$I(n) \times e^{-j\frac{k}{4}\pi n}, \quad (k = 1, 3, 5, 7)$$

$$I(n) = 0 \left(n \neq \frac{N}{2} \text{ and } n \text{ is an odd number}\right)$$

where n is an integer and $1 \leq n \leq N$ and I(n) represents an impulse response of a source filter having a tap length N.

10. A digital signal multiplexer according to claim 3, wherein impulse responses E(n), F(n), G(n), H(n) of said filter E, filter F, filter G, filter H, respectively, satisfy equations:

$$I(n) \times e^{-j\frac{k}{4}\pi n}, \quad (k = 1, 3, 5, 7)$$

$$I(n) = 0 \left(n \neq \frac{N}{2} \text{ and } n \text{ is an odd number}\right)$$

where n is an integer and $1 \leq n \leq N$, and I(n) represents an impulse response of a source filter having a tap length N.

11. A digital signal transmitter comprising:
a serial-parallel conversion circuit for converting serial signals into a plurality of parallel slow speed signals;
a plurality of modulation circuits for modulating each signal in a plurality of parallel converted signals;
a channel multiplexing circuit for frequency multiplexing the modulated signals; where said channel multiplexing circuit comprises not less than one 2-multiplexing filter bank containing:
up-samplers for doubling sampling frequencies of each signal in two groups of input signals;
two types of filters having different pass-bands for filtering output signals from said up-sampler; and
an adder for multiplexing output signals from said two types of filters; and when two or more 2-multiplexing filter banks are required,
said channel multiplexing circuit is constructed by serially connecting a plurality of 2-multiplexing filter banks in a multi-stage configuration such that:
said plurality of modulation circuits are grouped into groups so that each group contains two modulation circuits, and each two output signals from two modulation circuits of the groups are input into one 2-multiplexing filter bank, respectively;
the 2-multiplexing filter banks are grouped into groups so that each group contains two 2-multiplexing filter banks, and each two output signals from the 2-multiplexing filter banks of the groups are further input into another 2-multiplexing filter bank in a next-stage;
output signals from two preceding 2-multiplexing filter banks are input into another 2-multiplexing filter bank in a next-stage so that
signals from the 2-multiplexing filter bank in a final-stage are produced as output signals from said digital signal transmitter.

12. A digital signal transmitter according to claim 11, wherein said channel multiplexing circuit is constructed so that:
output signals from one modulation circuit or two modulation circuits are frequency multiplexed by using one of 2-multiplexing filter banks;
output signals from said 2-multiplexing filter bank and output signals from one of a plurality of other modulation circuits or output signals fm another 2-multiplexing filter bank having a common sampling rate are frequency multiplexed by using a 2-multiplexing filter bank in a next-stage; and repeating circuit connections further so that
signals from a 2-multiplexing filter bank in a final-stage are produced as output signals from said digital signal transmitter.

13. A digital signal receiver comprising:
a plurality of channel demultiplexing circuits for separating frequency multiplexed signals into two groups of signals;
a plurality of demodulation circuits for demodulating output signals from said channel demultiplexing circuits;
a parallel-serial conversion circuit for receiving output signals from each demodulation circuit; wherein
a channel demultiplexing circuit comprises not less than one 2-demultiplexing filter bank having:
a circuit for separating input signals into two groups of signals by using two types of filters having different pass-bands; and
a down-sampler for culling sampling frequencies of two separated signals to 1/2; and
channel demultiplexing circuits are connected such that when there are two or more 2-demultiplexing filter banks, 2-demultiplexing filter banks are connected serially so that
output signals from a receiving circuit are input into a 2-demultiplexing filter bank;

two groups of signals output from the 2-demultiplexing filter bank are input respectively into 2-demultiplexing filter banks in a next-stage, two groups of signals output from the 2-demultiplexing filter bank are input respectively into 2-demultiplexing filter banks in a next-stage, and ultimately, output signals from the 2-demultiplexing filter banks in a last-stage are input into respective demodulation circuits; and output signals from demodulation circuits are input into said parallel-serial conversion circuit; so that signals output from said parallel-serial conversion circuit are produced as digital receiver output signals.

14. A digital signal receiver according to claim 13, wherein said channel demultiplexing circuit is comprised by a serially-connected 2-demultiplexing filter banks, in a multi-stage configuration, and is connected successively so that:

input digital signals are input into a 2-demultiplexing filter bank to output two groups of signals, and one group of signals output from the 2-demultiplexing filter bank are input into a 2-demultiplexing filter bank in a next-stage or a demodulation circuit;

other group of signals are input into another 2-demultiplexing filter bank in a next-stage or a demodulation circuit; and output signals from a 2-demultiplexing filter bank in a final-stage are input into a final demodulation circuit; so that signals output from said demodulation circuit are input into a parallel-serial conversion circuit.

15. A digital signal transmitter according to one of claim 11, wherein said serial-parallel conversion circuit is a multi-input/output serial-parallel conversion circuit for converting input signals into a plurality of slow speed signals.

16. A digital signal transmitter according to claim 12, wherein said serial-parallel conversion circuit is a multi-input/output serial-parallel conversion circuit for converting input signals into a plurality of slow speed signals.

17. A digital signal receiver according to claim 13, wherein said parallel-serial conversion circuit is a multi-input/output parallel-serial conversion circuit for receiving output signals from each demodulation circuit.

18. A digital signal receiver according to claim 14, wherein said parallel-serial conversion circuit is a multi-input/output parallel-serial conversion circuit for receiving output signals from each demodulation circuit.

19. A digital signal receiver according to claim 17, wherein said receiver is further provided with a modulation circuit for modulating a plurality of output signals from said multi-input/output parallel-serial conversion circuit.

20. A digital signal receiver according to claim 18, wherein said receiver is further provided with a modulation circuit for modulating a plurality of output signals from said multi-input/output parallel-serial conversion circuit.

21. A digital signal transmitter according to claim 11, wherein said modulation circuit and at least a part of said channel multiplexing circuit are operated in a time-division mode.

22. A digital signal transmitter according to claim 12, wherein said modulation circuit and at least a part of said channel multiplexing circuit are operated in a time-division mode.

23. A digital signal transmitter according to claim 15, wherein said modulation circuit and at least a part of said channel multiplexing circuit are operated in a time-division mode.

24. A digital signal receiver according to claim 13, wherein said demodulation circuit and at least a part of said channel demultiplexing circuit are operated in a time-division mode.

25. A digital signal receiver according to claim 14, wherein said demodulation circuit and at least a part of said channel demultiplexing circuit are operated in a time-division mode.

26. A digital signal receiver according to claim 17, wherein said demodulation circuit and at least a part of said channel demultiplexing circuit are operated in a time-division mode.

27. A digital signal receiver according to claim 19, wherein said demodulation circuit and at least a part of said channel demultiplexing circuit are operated in a time-division mode.

28. A digital signal transmitter according to claim 12, wherein a plurality of slow speed signals has different speeds.

29. A digital signal receiver according to claim 14, wherein a plurality of slow speed signals has different speeds.

30. A digital signal transmitter according to claim 12, wherein 2-multiplexing filter banks in a channel multiplexing circuit are connected so as to enable to operate when signal speeds of slow speed signal input in said channel multiplexing circuit are all different.

31. A digital signal receiver according to claim 14, wherein 2-demultiplexing filter banks in a channel demultiplexing circuit are connected so as to enable to operate when signal speeds of slow speed signal input in said channel demultiplexing circuit are all different.

32. A digital modem comprising a digital signal transmitter according to claim 11 and a digital signal receiver according to claim 13.

33. A digital modem comprising a digital signal receiver according to claim 13.

* * * * *